United States Patent
Iwashita

(10) Patent No.: US 9,841,919 B2
(45) Date of Patent: Dec. 12, 2017

(54) INFORMATION PROCESSING APPARATUS, COMMUNICATION METHOD AND INFORMATION PROCESSING SYSTEM FOR COMMUNICATION OF GLOBAL DATA SHARED BY INFORMATION PROCESSING APPARATUSES

(71) Applicant: FUJITSU LIMITED, Kawasaki-shi, Kanagawa (JP)

(72) Inventor: Hidetoshi Iwashita, Mishima (JP)

(73) Assignee: FUJITSU LIMITED, Kawasaki (JP)

( * ) Notice: Subject to any disclaimer, the term of this patent is extended or adjusted under 35 U.S.C. 154(b) by 119 days.

(21) Appl. No.: 14/887,382

(22) Filed: Oct. 20, 2015

(65) Prior Publication Data
US 2016/0132272 A1  May 12, 2016

(30) Foreign Application Priority Data
Nov. 12, 2014 (JP) ................ 2014-230227

(51) Int. Cl.
*G06F 13/00* (2006.01)
*G06F 3/06* (2006.01)
(Continued)

(52) U.S. Cl.
CPC .......... *G06F 3/0644* (2013.01); *G06F 3/0604* (2013.01); *G06F 3/0683* (2013.01);
(Continued)

(58) Field of Classification Search
CPC .... G06F 3/0644; G06F 3/0604; G06F 3/0683; G06F 3/0689; G06F 8/453;
(Continued)

(56) References Cited

U.S. PATENT DOCUMENTS 6,438,562 B1    8/2002  Gupta et al.
8,285,670 B2 *  10/2012 Chen .................. G06F 8/4442
                                              707/609
(Continued)

FOREIGN PATENT DOCUMENTS

JP      9-34855        2/1997
JP      2005-84939     3/2005
(Continued)

OTHER PUBLICATIONS

Extended European Search Report dated Apr. 18, 2016 for corresponding European Patent Application No. 15190676.5, 10 pages.

*Primary Examiner* — Reba I Elmore
(74) *Attorney, Agent, or Firm* — Fujitsu Patent Center

(57) ABSTRACT

An information processing apparatus, among a plurality of information processing apparatuses, to which one of pieces of local data is assigned, the pieces of local data having been obtained by dividing global data shared by the plurality of information processing apparatuses, includes: a storage unit that includes a first storage area sectioned into prescribed units, and stores local data; a processor that executes a process including: detecting a plurality of continuous sections to which the target local data is to be written in a second storage area that is sectioned into the prescribed units in the different information processing apparatus, on the basis of storage area information that identifies data to which the target local data corresponds in the global data; and extracting as many pieces of local data as specified by the number of the continuous sections and transmitting the data to the different information processing apparatus.

14 Claims, 84 Drawing Sheets

(51) Int. Cl.
  *G06F 12/0802* (2016.01)
  *G06F 9/45* (2006.01)
  *G06F 13/42* (2006.01)
  *G06F 13/38* (2006.01)
(52) U.S. Cl.
  CPC ............ *G06F 3/0689* (2013.01); *G06F 8/453* (2013.01); *G06F 12/0802* (2013.01); *G06F 13/385* (2013.01); *G06F 13/387* (2013.01); *G06F 13/4221* (2013.01); *G06F 13/4234* (2013.01); *G06F 2212/1016* (2013.01); *G06F 2212/60* (2013.01)
(58) Field of Classification Search
  CPC ............. G06F 12/0623; G06F 12/0802; G06F 12/0692; G06F 13/4221; G06F 13/4234; G06F 13/385; G06F 13/387
  USPC ........ 711/114, 148, 152, 165; 707/641, 651, 707/812; 710/33, 52, 56, 74; 712/13, 712/225
  See application file for complete search history.

(56) References Cited

U.S. PATENT DOCUMENTS

| | | | |
|---|---|---|---|
| 2004/0205729 | A1 | 10/2004 | Iwashita |
| 2005/0010588 | A1 | 1/2005 | Zalewski et al. |
| 2005/0283658 | A1 | 12/2005 | Clark et al. |
| 2006/0047918 | A1* | 3/2006 | Sugizaki ............. G06F 12/0833 711/146 |
| 2007/0226423 | A1* | 9/2007 | Arimilli ................ G06F 12/084 711/141 |
| 2009/0083528 | A1* | 3/2009 | Li .......................... G06F 15/177 713/1 |
| 2010/0023700 | A1* | 1/2010 | Chen .................... G06F 8/4442 711/135 |
| 2011/0251997 | A1 | 10/2011 | Wang et al. |

FOREIGN PATENT DOCUMENTS

| | | |
|---|---|---|
| JP | 2005-285042 | 10/2005 |
| WO | 00/45260 | 8/2000 |

* cited by examiner

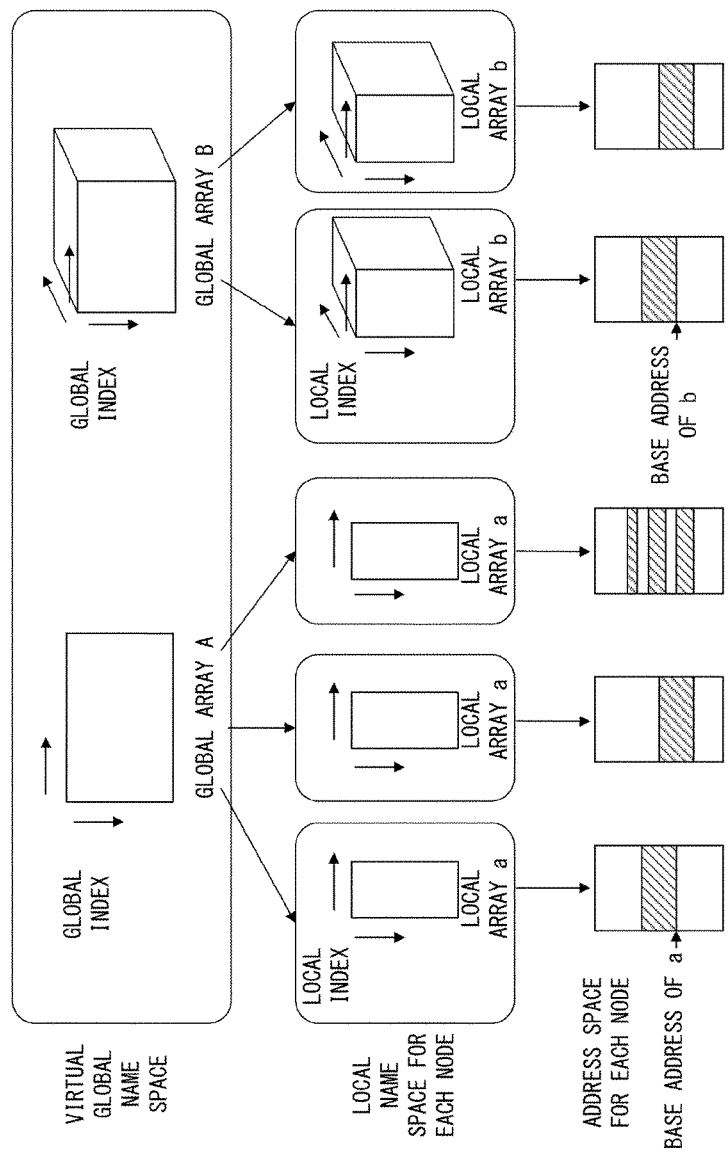
F I G. 1

| TYPE OF DISTRIBUTION | gtop(k) | gtol(k, p) | ltog(i, p) |
|---|---|---|---|
| block | $\lfloor k / w \rfloor$ | mod(k, w) | i + p w |
| cyclic | mod(k, P) | $\lfloor k / P \rfloor$ | P i + p |
| uneven block | p SATISFYING B(p) ≦ k<B(p+1) | k − B(p) | i + B(p) |
| block-cyclic | mod($\lfloor k / w \rfloor$, P) | w $\lfloor k / (P w) \rfloor$ + mod(k, w) | P w $\lfloor i / w \rfloor$ + p w + mod(i, w) |
| irregular distribution | M(k) | GTOL(k) | LTOG(i, p) |
| not distribution | 0 | k | i |

F I G. 4

(A)

| TYPE OF DISTRIBUTION | i1 | i2 |
|---|---|---|
| block | $\max(k1 - pw, 0)$ | $\min(k2 - pw, w - 1)$ |
| cyclic | $\lceil (k1 - p) / P \rceil$ | $\lfloor (k2 - p) / P \rfloor$ |
| uneven block | $\max(k1 - B(p), 0)$ | $\min(k2 - B(p), w - 1)$ |
| block-cyclic | FIG. 5(B) | FIG. 5(C) |
| irregular distribution | MINIMUM $k$ ($k1 \leq k$) SATISFYING GTOL$(k) = p$ | MAXIMUM $k$ ($k \leq k2$) SATISFYING GTOL$(k) = p$ |
| not distribution | k1 | k2 |

(B)

$$i1 = \begin{cases} w \lfloor \frac{k1}{Pw} \rfloor + w & \text{for } p < \text{mod}(\lfloor k1/w \rfloor, P) \\ w \lfloor \frac{k1}{Pw} \rfloor + \text{mod}(k1, w) & \text{for } p = \text{mod}(\lfloor k1/w \rfloor, P) \\ w \lfloor \frac{k1}{Pw} \rfloor & \text{for } p > \text{mod}(\lfloor k1/w \rfloor, P) \end{cases}$$

(C)

$$i2 = \begin{cases} w \lfloor \frac{k2}{Pw} \rfloor + w - 1 & \text{for } p < \text{mod}(\lfloor k2/w \rfloor, P) \\ w \lfloor \frac{k2}{Pw} \rfloor + \text{mod}(k2, w) & \text{for } p = \text{mod}(\lfloor k2/w \rfloor, P) \\ w \lfloor \frac{k2}{Pw} \rfloor - 1 & \text{for } p > \text{mod}(\lfloor k2/w \rfloor, P) \end{cases}$$

F I G. 5

| TYPE OF DISTRIBUTION | k1 | k2 | k3 |
|---|---|---|---|
| block | i1 + p w | i2 + p w | 1 |
| cyclic | P i1 + p | P i2 + p | p |
| uneven block | i1 + B(p) | i2 + B(p) | 1 |
| block-cyclic | IMPOSSIBLE | IMPOSSIBLE | |
| irregular distribution | | | |
| not distribution | i1 | i2 | 1 |

FIG. 6

| TYPE OF DISTRIBUTION | kx1 | kx2 | kx3 |
|---|---|---|---|
| block | max(k1, p w) | min(k2, p w + w − 1) | 1 |
| cyclic | p ⌈(k1 − p) / p⌉ + p | p ⌊(k2 − p) / p⌋ + p | p |
| uneven block | max(k1, B(p)) | min(k2, B(p) + w − 1) | 1 |
| block-cyclic | | IMPOSSIBLE | |
| irregular distribution | | IMPOSSIBLE | |
| not distribution | k1 | k2 | 1 |

F I G. 7

| TYPE OF DISTRIBUTION | i1, i2, i3 |
|---|---|
| block | FIG. 8B(a) |
| cyclic | FIG. 8B(c) |
| uneven block | FIG. 8B(b) |
| block-cyclic | IMPOSSIBLE |
| irregular distribution | IMPOSSIBLE |
| not distribution | k1, k2, k3 |

F I G. 8 A (a) block
- WHEN k3 > 0 IS SATISFIED $$i1 = \begin{cases} k1 - p\,w & \text{for } p\,w \leq k1 \\ \mathrm{mod}(k1 - p\,w, k3) & \text{for } p\,w > k1 \end{cases}$$

$$i2 = \begin{cases} w - 1 & \text{for } (p+1)\,w \leq k2 \\ k2 - p\,w & \text{for } (p+1)\,w > k2 \end{cases}$$

$$i3 = k3$$

- WHEN k3 < 0 IS SATISFIED $$i1 = \begin{cases} w - 1 - \mathrm{mod}((p+1)\,w - k1 - 1, -k3) & \text{for } (p+1)\,w \leq k1 \\ k1 - p\,w & \text{for } (p+1)\,w > k1 \end{cases}$$

$$i2 = \begin{cases} k2 - p\,w & \text{for } p\,w \leq k2 \\ 0 & \text{for } p\,w > k2 \end{cases}$$

$$i3 = k3$$

(b) uneven block
- WHEN k3 > 0 IS SATISFIED $$i1 = \begin{cases} k1 - B(p) & \text{for } B(p) \leq k1 \\ \mathrm{mod}(k1 - B(p), k3) & \text{for } B(p) > k1 \end{cases}$$

$$i2 = \begin{cases} W(p) - 1 & \text{for } B(p+1) \leq k2 \\ k2 - B(p) & \text{for } B(p+1) > k2 \end{cases}$$

$$i3 = k3$$

- WHEN k3 < 0 IS SATISFIED $$i1 = \begin{cases} W(p) - 1 - \mathrm{mod}(B(p+1) - 1 - k1, -k3) & \text{for } B(p+1) \leq k1 \\ k1 - B(p) & \text{for } B(p+1) > k1 \end{cases}$$

$$i2 = \begin{cases} k2 - B(p) & \text{for } B(p) \leq k2 \\ 0 & \text{for } B(p) > k2 \end{cases}$$

$$i3 = k3$$

(c) cyclic

DEFINE $t = \mathrm{GCD}(P, |k3|)$ AND ASSUME THAT $n$ IS INTEGER SATISFYING FOLLOWING CONDITIONS $$k1 + n\,k3 \equiv p \pmod{P}$$
$$0 \leq n < P/t$$

- WHEN k3 > 0 IS SATISFIED $$i1 = \begin{cases} (k1 + n\,k3 - p)/P & \text{for } p \equiv k1 \pmod{t} \text{ (WHEN } n \text{ EXIST)} \\ \text{MAXIMUM POSITIVE NUMBER } (*1) & \text{otherwise (WHEN } n \text{ DOES NOT EXIST)} \end{cases}$$

$$i2 = \lfloor (k2 - p)/P \rfloor$$

$$i3 = k3/t$$

- WHEN k3 < 0 IS SATISFIED $$i1 = \begin{cases} (k1 + n\,k3 - p)/P & \text{for } p \equiv k1 \pmod{t} \text{ (WHEN } n \text{ EXIST)} \\ -1 \;(*2) & \text{Otherwise (WHEN } n \text{ DOES NOT EXIST)} \end{cases}$$

$$i2 = \lfloor (k2 - p)/P \rfloor$$

$$i3 = k3/t$$

(*1) ARBITRARY VALUE THAT IS GREATER THAN i2 CAN BE USED
(*2) ARBITRARY VALUE THAT IS SMALLER THAN i2 MAY BE USED

F I G. 8 B

| TYPE OF DISTRIBUTION | k1 | k2 | k3 |
|---|---|---|---|
| block | i1 + p w | i2 + p w | i3 |
| cyclic | P i1 + p | P i2 + p | P i3 |
| uneven block | i1 + B(p) | i2 + B(p) | i3 |
| block-cyclic | IMPOSSIBLE | IMPOSSIBLE | |
| irregular distribution | | | |
| not distribution | i1 | i2 | i3 |

F I G. 9

| TYPE OF DISTRIBUTION | i1, i2, i3 |
|---|---|
| block | FIG. 10B(a) |
| cyclic | FIG. 10B(c) |
| uneven block | FIG. 10B(b) |
| block-cyclic | IMPOSSIBLE |
| irregular distribution | IMPOSSIBLE |
| not distribution | k1, k2, k3 |

FIG. 10A (a) block
- WHEN k3 > 0 IS SATISFIED $$kx1 = \begin{cases} k1 & \text{for } pw \leq k1 \\ \mod(k1 - pw, k3) + pw & \text{for } pw > k1 \end{cases}$$

$$kx2 = \begin{cases} w - 1 + pw & \text{for } (p+1)w \leq k2 \\ k2 & \text{for } (p+1)w > k2 \end{cases}$$

$$kx3 = k3$$

- WHEN k3 < 0 IS SATISFIED $$kx1 = \begin{cases} w - 1 - \mod((p+1)w - k1 - 1, -k3) + pw & \text{for } (p+1)w \leq k1 \\ k1 & \text{for } (p+1)w > k1 \end{cases}$$

$$kx2 = \begin{cases} k2 & \text{for } pw \leq k2 \\ pw & \text{for } pw > k2 \end{cases}$$

$$kx3 = k3$$

(b) uneven block
- WHEN k3 > 0 IS SATISFIED $$kx1 = \begin{cases} k1 & \text{for } B(p) \leq k1 \\ \mod(k1 - B(p), k3) + B(p) & \text{for } B(p) > k1 \end{cases}$$

$$kx2 = \begin{cases} W(p) + B(p) - 1 & \text{for } B(p+1) \leq k2 \\ K2 & \text{for } B(p+1) > k2 \end{cases}$$

$$kx3 = k3$$

- WHEN k3 < 0 IS SATISFIED $$kx1 = \begin{cases} W(p+1) - \mod(B(p+1) - k1 - 1, -k3) - 1 & \text{for } B(p+1) \leq k1 \\ k1 & \text{for } B(p+1) > k1 \end{cases}$$

$$kx2 = \begin{cases} k2 & \text{for } B(p) \leq k2 \\ B(p) & \text{for } B(p) > k2 \end{cases}$$

$$kx3 = k3$$

(c) cyclic

DEFINE $t = GCD(P, |k3|)$ AND ASSUME THAT $n$ IS INTEGER SATISFYING FOLLOWING CONDITIONS $$k1 + nk3 \equiv p \pmod{P}$$
$$0 \leq n < P/t$$

- WHEN k3 > 0 IS SATISFIED $$kx1 = \begin{cases} k1 + nk3 & \text{for } p \equiv k1 \pmod{t} \text{ (WHEN } n \text{ EXIST)} \\ \text{MAXIMUM POSITIVE NUMBER } (*1) & \text{otherwise (WHEN } n \text{ DOES NOT EXIST)} \end{cases}$$

$$kx2 = P \lfloor (k2 - p) / P \rfloor + p$$

$$kx3 = P k3 / t$$

- WHEN k3 < 0 IS SATISFIED $$kx1 = \begin{cases} k1 + nk3 & \text{for } p \equiv k1 \pmod{t} \text{ (WHEN } n \text{ EXIST)} \\ -1 \ (*2) & \text{otherwise (WHEN } n \text{ DOES NOT EXIST)} \end{cases}$$

$$kx2 = P \lfloor (k2 - p) / P \rfloor$$

$$kx3 = P k3 / t$$

(*1) ARBITRARY VALUE THAT IS GREATER THAN kx2 CAN BE USED
(*2) ARBITRARY VALUE THAT IS SMALLER THAN kx2 MAY BE USED

F I G. 1 0 B

TRANSMISSION AND RECEPTION OF CONTINUOUS DATA
(DIRECT COMMUNICATION)

TRANSMISSION AND RECEPTION OF NOT CONTINUOUS DATA
(BUFFERED COMMUNICATION)

WHEN DATA IS NOT CONTINUOUS ONLY ON TRANSMISSION SIDE

WHEN DATA IS NOT CONTINUOUS ONLY ON RECEPTION SIDE

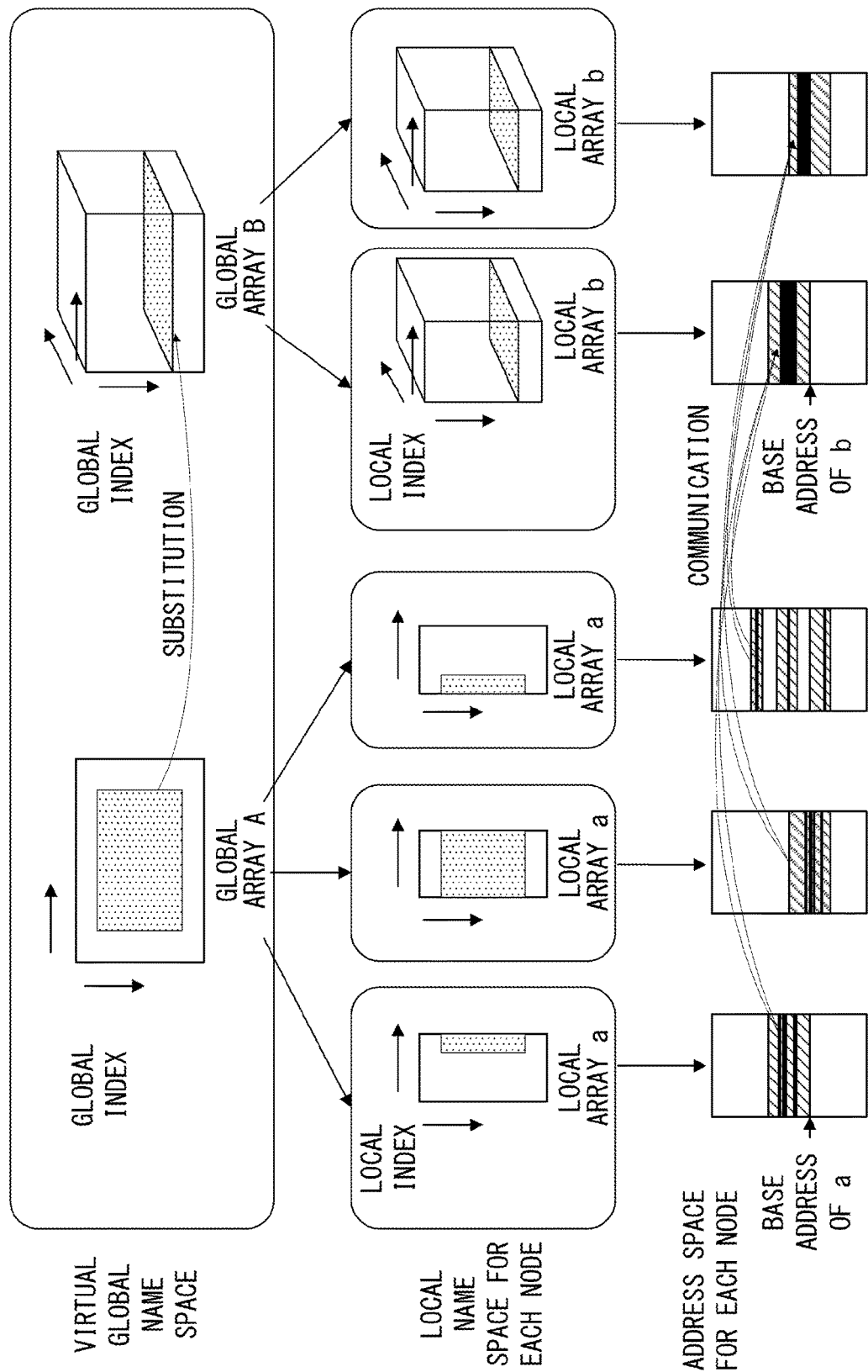
F I G. 13

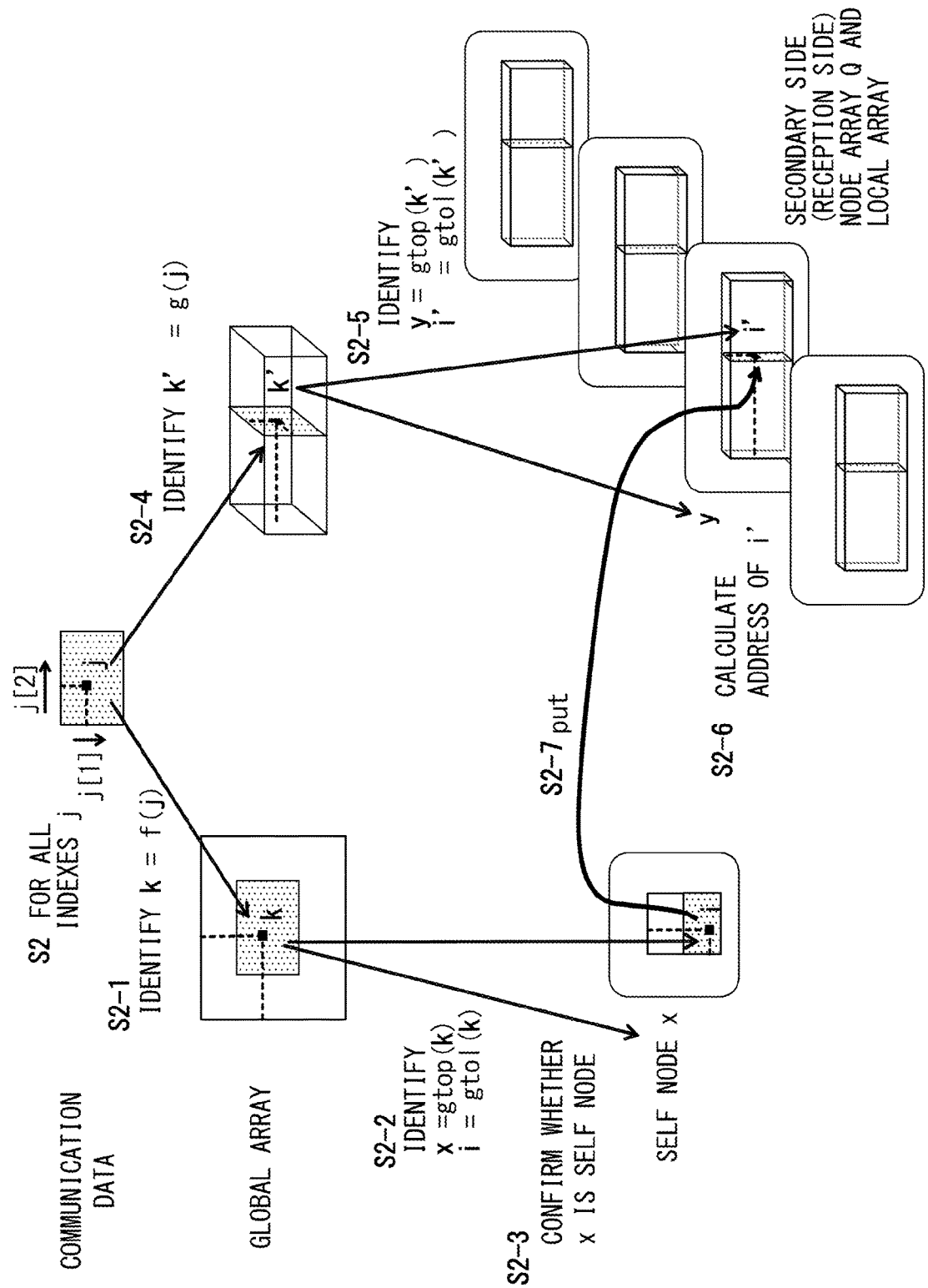
F I G. 14

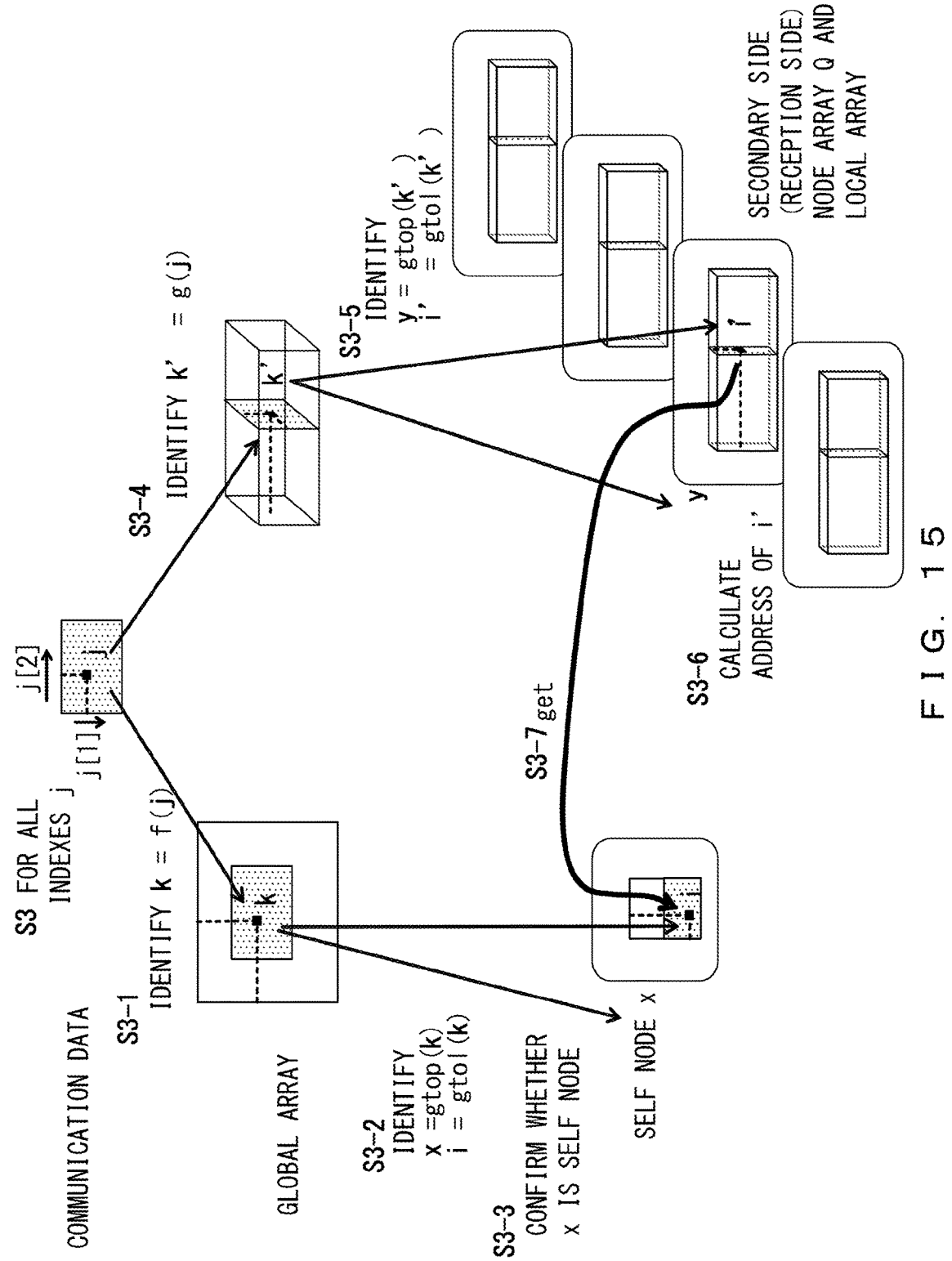
F I G. 15

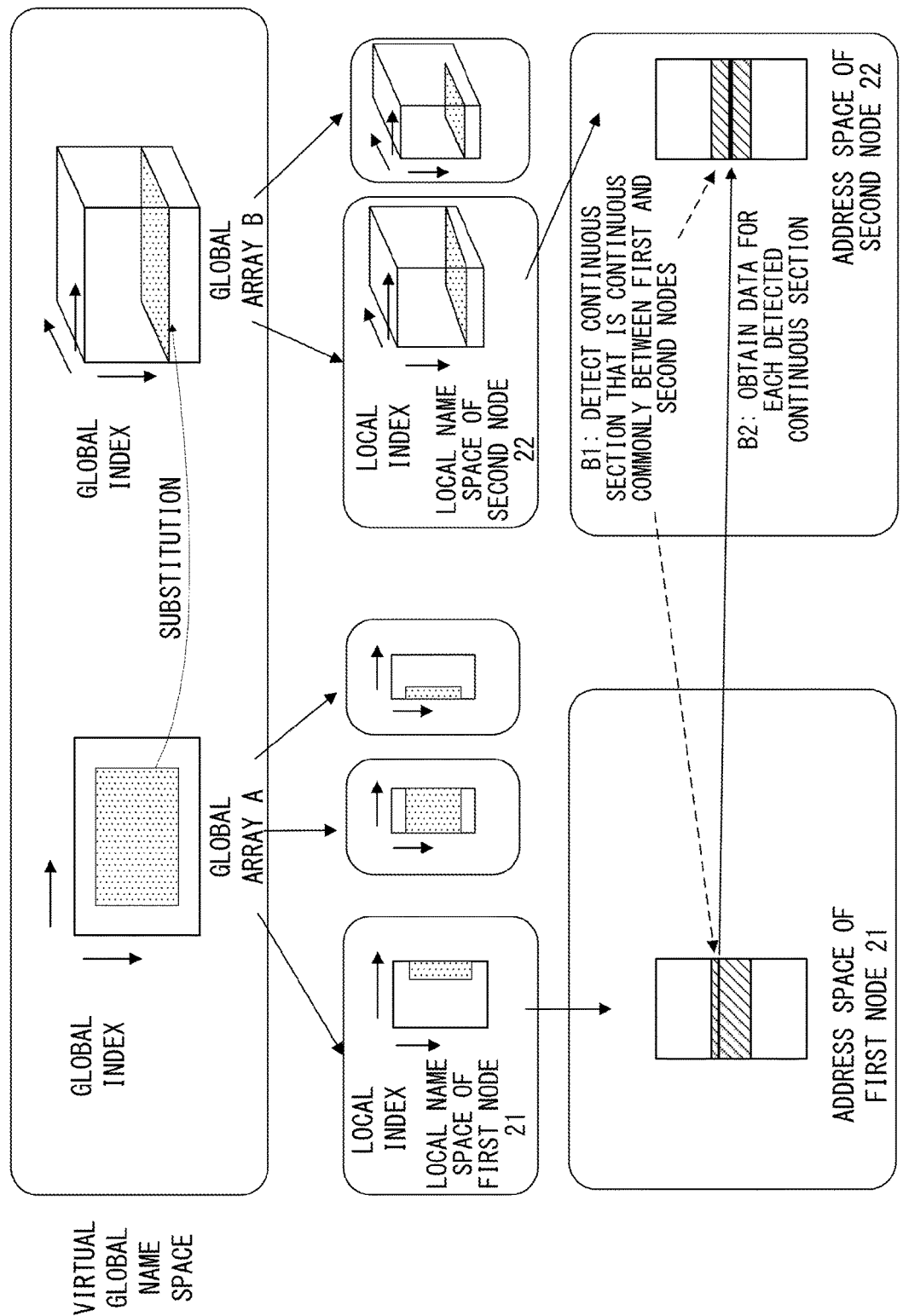
F I G. 2 3

```
for jx[D] = jx1[D] to jx2[D] step jx3[D]
    ...
    for jx[Dc+1] = jx1[Dc+1] to jx2[Dc+1] step jx3[Dc+1]
        CONTINUOUS DATA UNIT LIST Jc-list = ( jc[1], ..., jc[Dc], jx[Dc+1], ..., jx[D] )
        Call CONTINUOUS DATA UNIT PUT PROCEDURE
    end for
    ...
end for
```

FIG. 26

| NUMBER OF DIMENSIONS D OF COMMUNICATION DATA | 2 | |
|---|---|---|
| EACH DIMENSION D OF COMMUNICATION DATA | 1 | 2 |
| SIZE N[d] | 100 | 120 |
| LOOP VARIABLE NAME j[d] | $1 | $2 |
| DIMENSION OF CORRESPONDING PRIMARY SIDE DATA u = DtoU[d] | 1 | 2 |
| DIMENSION OF CORRESPONDING SECONDARY SIDE DATA v = DtoV[d] | 1 | 3 |

| NUMBER OF DIMENSIONS U OF PRIMARY SIDE NODE ARRAY | 2 | |
|---|---|---|
| EACH DIMENSION u OF PRIMARY SIDE NODE ARRAY | 1 | 2 |
| ALLOCATION SIZE OF GLOBAL ARRAY | 200 | 300 |
| ALLOCATION SIZE OF LOCAL ARRAY | 100 | 100 |
| NODE SIZE X[u] | 2 | 3 |
| TYPE OF DISTRIBUTION | block | block |
| DISTRIBUTION PARAMETER | w = 100 | w = 100 |
| GLOBAL SUBSCRIPT EXPRESSION k[u] = $f_u$ | $1 + 10 | $2 + n2 |
| DIMENSION OF CORRESPONDING COMMUNICATION DATA d = UtoD[u] | 1 | 2 |
| TYPE OF GLOBAL SUBSCRIPT | INTERVAL | INTERVAL |
| k1[u] OF GLOBAL SUBSCRIPT COMBINATION-OF-THE-THREE PARAMETERS | 10 | n2 |
| k2[u] OF GLOBAL SUBSCRIPT COMBINATION-OF-THE-THREE PARAMETERS | 109 | N2 + 119 |
| k3[u] OF GLOBAL SUBSCRIPT COMBINATION-OF-THE-THREE PARAMETERS | - | - |

FIG. 27

| NODE INDEX p | 0 | 0 | 1 | 0 | 0 | 1 | ... |
|---|---|---|---|---|---|---|---|
| EACH DIMENSION d OF COMMUNICATION DATA | 1 | 0 | 1 | 0 | 1 | 2 | ... |
| jx1[d] OF COMBINATION-OF-THE-THREE PARAMETERS CORRESPONDING TO SELF NODE | 10−10 = 0 max(n2, 0) − n2 = max(0, −n2) | 2 min(n2+119, 99) − n2 = min(119, 99−n2) | 100−10 = 90 max(n2, 0) − n2 = max(0, −n2) | 2 min(n2+119, 99) − n2 = min(119, 99−n2) | 10−10 = 0 max(n2, 100) − n2 = max(0, 100−n2) | 2 min(n2+119, 199) − n2 = min(119, 199−n2) | ... |
| jx2[d] OF COMBINATION-OF-THE-THREE PARAMETERS CORRESPONDING TO SELF NODE | 99−10 = 89 | | 109−10 = 99 | | 99−10 = 89 | | ... |
| jx3[d] OF COMBINATION-OF-THE-THREE PARAMETERS CORRESPONDING TO SELF NODE | 1 | | 1 | | 1 | | ... |

F I G. 28

| NODE INDEX p | 0 | | | 1 | | 0 | | 1 | | ... |
|---|---|---|---|---|---|---|---|---|---|---|
| EACH DIMENSION u OF PRIMARY SIDE LOCAL ARRAY | 0 | 1 | 2 | 0 | 1 | 2 | 0 | 1 | 2 | ... |
| TYPE OF LOCAL ARRAY SUBSCRIPT | INTERVAL | INTERVAL | INTERVAL | INTERVAL | INTERVAL | INTERVAL | INTERVAL | INTERVAL | INTERVAL | ... |
| WHETHER LOCAL ARRAY SUBSCRIPT COVERS ENTIRE ALLOCATION SIZE, fullSpan[u] | FALSE | FALSE | FALSE | FALSE | FALSE | FALSE | FALSE | FALSE | FALSE | ... |
| i1[u] OF LOCAL ARRAY SUBSCRIPT COMBINATION-OF-THE-THREE PARAMETERS | max(10, 0) = 10 | max(n2, 0) | max(10-100, 0) = 0 | max(n2, 0) | max(10, 0) = 10 | max(n2-100, 0) | max(10, 0) = 10 | max(n2, 0) | ... |
| i2[u] OF LOCAL ARRAY SUBSCRIPT COMBINATION-OF-THE-THREE PARAMETERS | min(109, 99) = 99 | min(n2+119, 99) | min(10-1, 99) = 9 | min(n2+119, 99) | min(109, 99) = 99 | min(n2+119-100, 99) | min(109, 99) = 99 | min(n2+119, 99) | ... |
| i3[u] OF LOCAL ARRAY SUBSCRIPT COMBINATION-OF-THE-THREE PARAMETERS | | | | | | | | | | ... |
| kx1[u] OF GLOBAL SUBSCRIPT COMBINATION-OF-THE-THREE PARAMETERS CORRESPONDING TO LOCAL ARRAY SUBSCRIPTS | max(10, 0) = 10 | max(n2, 0) | max(10, 100) = 100 | max(n2, 0) | max(10, 0) = 10 | max(n2, 100) | | | | ... |
| kx2[u] OF GLOBAL SUBSCRIPT COMBINATION-OF-THE-THREE PARAMETERS CORRESPONDING TO LOCAL ARRAY SUBSCRIPTS | min(109, 99) = 99 | min(n2+119, 99) | min(109, 100+99) = 109 | min(n2+119, 99) | min(109, 99) = 99 | min(n2+119, 100+99) | | | | ... |
| kx3[u] OF GLOBAL SUBSCRIPT COMBINATION-OF-THE-THREE PARAMETERS CORRESPONDING TO LOCAL ARRAY SUBSCRIPTS | 1 | 1 | 1 | 1 | 1 | 1 | | | | ... |

F I G. 29

| | | | |
|---|---|---|---|
| NUMBER OF DIMENSIONS v OF SECONDARY SIDE NODE ARRAY | 3 | | |
| EACH DIMENSION v OF SECONDARY SIDE NODE ARRAY | 1 | 2 | 3 |
| SIZE OF GLOBAL ARRAY | 100 | 100 | 120 |
| ALLOCATION SIZE OF LOCAL ARRAY | 100 | 100 | 30 |
| NODE SIZE Y[v] | 1 | 1 | 4 |
| TYPE OF DISTRIBUTION | NOT DISTRIBUTION | NOT DISTRIBUTION | block |
| DISTRIBUTION PARAMETER | – | – | w = 30 |
| GLOBAL SUBSCRIPT EXPRESSION $k'[v] = g_v$ | $1 | 60 | $2 |
| DIMENSION OF CORRESPONDING COMMUNICATION DATA d = VtoD[v] | 1 | 0 | 2 |
| TYPE OF GLOBAL SUBSCRIPT | INTERVAL | SCALAR | INTERVAL |
| k1'[v] OF GLOBAL SUBSCRIPT COMBINATION-OF-THE-THREE PARAMETERS | 0 | 60 | 0 |
| k2'[v] OF GLOBAL SUBSCRIPT COMBINATION-OF-THE-THREE PARAMETERS | 99 | – | 119 |
| k3'[v] OF GLOBAL SUBSCRIPT COMBINATION-OF-THE-THREE PARAMETERS | – | – | – |

F I G. 30

1   BY ANALYZING PROGRAM, FOLLOWING PIECES OF INFORMATION ARE OBTAINED AND SET IN COMMUNICATION INFORMATION TABLE
    WHEN NECESSARY. DIMENSIONAL EXPANSION IS CONDUCTED SO THAT GLOBAL ARRAY, LOCAL ARRAY AND NODE ARRAY HAVE THE SAME NUMBER
    OF DIMENSIONS ON PRIMARY AND SECONDARY SIDES, AND NORMALIZATION IS CONDUCTED SO THAT DECLARATION LOWER LIMIT VALUE IS ZERO
    1.1    LOOP VARIABLE NAME j[d] AND SIZE N[d] FOR NUMBER OF DIMENSIONS D OF COMMUNICATION DATA ARRAY AND EACH DIMENSION
    1.2    FOR NUMBER OF DIMENSIONS U OF PRIMARY SIDE DATA AND EACH DIMENSION, SIZE OF EACH DIMENSION OF GLOBAL ARRAY,
           ALLOCATION METHOD OF LOCAL DATA, SIZE OF NODE ARRAY, TYPE OF DISTRIBUTION, DISTRIBUTION PARAMETER AND GLOBAL SUBSCRIPT
           EXPRESSION k[u]
    1.3    FOR NUMBER OF DIMENSIONS V OF SECONDARY SIDE DATA AND EACH DIMENSION, SIZE OF EACH DIMENSION OF GLOBAL ARRAY, ALLOCATION
           METHOD OF LOCAL DATA, SIZE OF NODE ARRAY, TYPE OF DISTRIBUTION, DISTRIBUTION PARAMETER AND GLOBAL SUBSCRIPT EXPRESSION
           k'[u]
2   FOR u=1, ..., U, GENERATE DIMENSION CORRESPONDENCE TABLES UtoD AND DtoU
    2.1    OBTAIN ALL LOOP VARIABLES j[d] INCLUDED IN SUBSCRIPT EXPRESSION k[u], AND STORE DIMENSION d OF CORRESPONDING
           COMMUNICATION DATA IN UtoD[u]
    2.2    ADD u TO LIST DtoU[d] FOR ALL d INCLUDED IN UtoD[u]
3   SIMILARLY, GENERATE DIMENSION CORRESPONDENCE TABLES VtoD AND DtoV FOR v=1, ..., V
    3.1    OBTAIN ALL LOOP VARIABLES j[d] INCLUDED IN SUBSCRIPT EXPRESSION k'[v] AND STORE DIMENSION d OF CORRESPONDING
           COMMUNICATION DATA IN VtoD[v]
    3.2    ADD V TO LIST DtoV[d] FOR ALL d INCLUDED IN VtoD[v]
4   FOR u=1, ..., U, TYPE OF GLOBAL SUBSCRIPT AND COMBINATION-OF-THE-THREE PARAMETERS k1[u], k2[u], k3[u]
    4.1    WHEN UtoD[u] IS ZERO,
        4.1.1   COPY EXPRESSION k[u] TO k1[u]
        4.1.2   SET "SCALAR" AS TYPE OF GLOBAL SUBSCRIPT
    4.2    WHEN UtoD[u] HAS POSITIVE VALUE d
        4.2.1   WHEN k[u] CAN BE EXPRESSED BY $S+C*j[d]$ FROM EXPRESSION k[u] OR ANALYSIS OF PROGRAM
                WHEN c IS 1, SETTING IS CONDUCTED AS FOLLOWS
            4.2.1.1     $k1[u] = s, k2[u] = s + N[d] - 1$ ARE SET AND k3[u] IS NOT SET
                        SET "INTERVAL" AS TYPE OF GLOBAL SUBSCRIPT
                        WHEN c IS NOT 1, SETTING IS CONDUCTED AS FOLLOWS
            4.2.1.2     $k1[u] = s, k2[u] = s + c * (N[d] - 1), k3[u] = c$
                        SET "COMBINATION OF THE THREE" AS TYPE OF GLOBAL SUBSCRIPT
        4.2.2   IN OTHER CASES OR WHEN ANALYSIS IS DIFFICULT, SET "OTHERS" AS TYPE OF GLOBAL SUBSCRIPT
    4.3    IN OTHER CASES, SET "OTHERS" AS TYPE OF GLOBAL SUBSCRIPT

5
 SIMILARLY, FOR v=1,..., V, SET TYPE OF GLOBAL SUBSCRIPT AND COMBINATION-OF-THE-THREE PARAMETERS k1'[v], k2'[v], k3'[v]
  5.1  WHEN VtoD[v] IS ZERO,
    5.1.1  COPY EXPRESSION k'[v] TO k1'[v]
    5.1.2  SET "SCALAR" AS TYPE OF GLOBAL SUBSCRIPT
  5.2  WHEN VtoD[v] HAS POSITIVE VALUE d
    5.2.1  WHEN k'[v] CAN BE EXPRESSED BY s+c*j[d] FROM EXPRESSION k'[v] OR ANALYSIS OF PROGRAM,
      5.2.1.1  WHEN c IS 1, SETTING IS CONDUCTED AS FOLLOWS
                 k1'[v] = s, k2'[v] = s + N[d] - 1 ARE SET AND k3'[v] ARE NOT SET
                 SET "INTERVAL" AS TYPE OF GLOBAL SUBSCRIPT
      5.2.1.2  WHEN c IS NOT 1, CONDUCT SETTING FOLLOWS
                 k1'[v] = s, k2'[v] = s + c * (N[d] - 1), k3'[v] = c
                 SET "COMBINATION OF THE THREE" AS TYPE OF GLOBAL SUBSCRIPT
    5.2.2  IN OTHER CASES OR WHEN ANALYSIS IS DIFFICULT, SET "OTHERS" AS TYPE OF GLOBAL SUBSCRIPT
  5.3  IN OTHER CASES, SET "OTHERS" AS TYPE OF GLOBAL SUBSCRIPT
6
 FOR u=1,...,U, SET TYPE OF LOCAL SUBSCRIPT, COMBINATION-OF-THE-THREE PARAMETERS OF SELF NODE, GLOBAL SUBSCRIPT
 COMBINATION-OF-THE-THREE PARAMETERS CORRESPONDING TO SELF NODE AND COMBINATION-OF-THE-THREE PARAMETERS OF
 COMMUNICATION DATA CORRESPONDING TO SELF NODE
  6.1  WHEN "OTHERS" HAS BEEN SET AS TYEP OF GLOBAL SUBSCRIPT
    6.1.1  SET "OTHERS" AS TYEP OF LOCAL SUBSCRIPT
    6.1.2  fullSpan[u] = false
  6.2  WHEN "SCALAR" HAS BEEN SET AS TYEP OF GLOBAL SUBSCRIPT
    6.2.1  EVALUATE FUNCTION $gtop_A(k1[u])$ OF FIG. 4 AND COMAPRE IT WITH INDEX x[u] OF SELF NODE WHEN THEY ARE EQUAL
      6.2.1.1  SET "SCALAR" AS TYEP OF LOCAL SUBSCRIPT
      6.2.1.2  SET TRUE IN fullSpan[u] WHEN SIZE OF DIMENSION u OF LOCAL ARRAY IS 1, AND OTHERSISE SET FALSE IN
                 fullSpan[u]
      6.2.1.3  EVALUATE $gtol_A(k1[u], x[u])$, AND SET IN i1[u]
      6.2.1.4  COPY k1[u] TO kx1[u]
    6.2.2  WHEN THEY ARE NOT EQUAL
      6.2.2.1  SET "OTHERS" AS TYEP OF LOCAL SUBSCRIPT
      6.2.2.2  fullSpan[u] = false

```
6.3   WHEN "INTERVAL" HAS BEEN SET AS TYEP OF GLOBAL SUBSCRIPT
      6.3.1   EVALUATE FUNCTION gtoI2_A(k1[u], k2[u], x[u]) OF FIG. 5.   WHEN EVALUATION IS POSSIBLE
              6.3.1.1   SET RESULT IN i1[u], i2[u]
              6.3.1.2   SET "INTERVAL" AS TYEP OF LOCAL SUBSCRIPT
              6.3.1.3   WHEN SIZE OF DIMENSION u OF LOCAL ARRAY IS EQUAL TO i2[u] - i1[u] + 1, THEN fullSpan[u] = true,
                        OTHERSIZE fullSpan[u] = false
      6.3.2   WHEN EVALUATOIN IS NOT POSSIBLE
              6.3.2.1   SET "OTHERS" AS TYEP FO LOCAL SUBSCRIPT
      6.3.3   WHEN IT WAS POSSIBLE TO EVALUATE FUNCTION gtog2_A(k1[u], k2[u], x[u]) OF FIG. 7,
              6.3.3.1   SET RESULT IN kx1[u], kx2[u], kx3[u]
              6.3.3.2   OBTAIN COMMUNICATION DATA DIMENSION d FROM UtoD[u] AND EVALUATE AND SET AS FOLLOWS
                        jx1[d] = kx1[u] - k1[u]
                        jx2[d] = kx2[u] - k1[u]
                        jx3[d] = kx3[u]
6.4   WHEN "COMBINATION OF THE THREE" HAS BEEN SET AS TYEP OF GLOBAL SUBSCRIPT
      6.4.1   EVALUATE FUNCTION gtoI3_A(k1[u], k2[u], k3[u], x[u]) OF FIG. 8.   WHEN EVALUATION IS POSSIBLE
              6.4.1.1   SET RESULT IN i1[u], i2[u], i3[u]
              6.4.1.2   SET "COMBINATION OF THE THREE" AS TYEP OF LOCAL SUBSCRIPT
              6.4.1.3   fullSpan[u] = false
      6.4.2   WHEN EVALUATION IS NOT POSSIBLE
              6.4.2.1   SET "OTHERS" IN TYEP OF LOCAL SUBSCRIPT
      6.4.3   WHEN IT WAS POSSIBLE TO EVALUATE FUNCTION gtog3_A(k1[u], k2[u], k3[u], x[u]) OF FIG. 10,
              6.4.3.1   SET RESULT IN kx1[u], kx2[u], kx3[u]
              6.4.3.2   OBTAIN COMMUNICATION DATA DIMENSION d FROM UtoD[u] AND EVALUATE AND SET AS FOLLOWS
                        jx1[d] = kx1[u] - k1[u]
                        jx2[d] = kx2[u] - k1[u]
                        jx3[d] = kx3[u]
```

FIG. 33

1  INITIALIZATION Uc = 0, Ic = ( ), Dc = 0, Jc = ( ), Lc = LENGTH OF ARRAY ELEMENT
2  last_d = 0
3  FOR PRIMARY SIDE DIMESION u = 1, ..., U, FLLLOWING IS REPEATED
   3.1  WHEN TYPE OF LOCAL SUBSCRIPT IS "COMBINATION OF THE THREE" OR "OTHERS", DETERMINE THAT u-TH DIMENSION IS NOT CONTINUOUS, AND INTERRUPCT REPEATING
   3.2  WHEN TYPE OF LOCAL SUBSCRIPT IS "SCALAR"
        3.2.1  UPDATE Uc, Ic
               3.2.1.1  Uc = u
               3.2.1.2  COPY LOCAL SUBSCRIPT i1[u] AND ADD RESULT TO TAIL OF Ic
   3.3  TYPE OF LOCAL SUBSCRIPT IS "INTERVAL"
        3.3.1  OBTAIN d FROM UtoD[u]
        3.3.2  WHEN d = last_d + 1 IS NOT SATISFIED, DETERMINE THAT CONTINUITY DOES NOT EXIST OVER u-TH DIMENSION, AND INTERRUPT REPEATING
        3.3.3  last_d = d
        3.3.4  UPDATE Uc, Ic, Dc, Jc
               3.3.4.1  Uc = u
               3.3.4.2  COPY LOCAL SUBSCRIPT COMBINATION-OF-THE-THREE PARAMETERS jx1[d], jx2[d], jx3[d] CORRESPONDING TO PRIMARY SIDE TO TAIL OF Ic
               3.3.4.3  Dc = d
               3.3.4.4  COPY COMBINATION-OF-THE-THREE PARAMETERS i1[u], i2[u], i3[u] AND ADD RESULT TO TAIL OF Jc
               3.3.4.5  Lc = Lc * (i2[u] - i1[u] + 1)
   3.4  WHEN fullSpan[u] OF INFORMATION TABLE IS FALSE, DETERMINE THAT CONTINUITY OVER DIMENSIONS IS NOT POSSIBLE, AND INTERRUPCT REPEATING
   3.5  RPEATING MAY BE INTERRUPTED HERE WHEN IT HAS BEEN DETERMINEED BY VALUE OF (OPTION) Lc THAT CONTINUOUS DATA UNIT IS SUFFICINELY LARGE
   3.6  TO NEXT u
4  RETURN Uc, Ic, Dc, Jc, Lc AND TERMIANTE

F I G. 34

1  WHEN Jc-list IS VACANT, PROCESS IS TERMIANTED
2  EXTRACT ONE FROM TOP OF Jc-list AND TREAT IT AS Jc
3  BY CONTINUOUS-CONTINUOUS DATA UNIT DETECTION PROCEDURE, OBTAIN PARTIAL ARRAY Jcc OF Jc THAT HAS SAME ORIGINATION AS Jc AND THAT IS CONTINUOUS OVER DIMENSION ON BOTH PRIMARY SIDE AND SECONDARY SIDE AND NUMBER OF DIMENSIONS (CONTINOUS DIMENSIONS) Dcc($0 \leq Dcc \leq Dc$)
   AT THE SAME TIME, OBTAIN PARTIAL Jcr-list, WHICH IS RESULT OF REMOVING Jcc FROM Jc
4  TREAT Jcc AS COMMUNICATION DATA UNIT. BY CONTINUOUS-CONTINUOUS DATA UNIT PUT PROCEDURE, DATA IS PUT FROM PRIMARY SIDE TO
   SECONDARY SIDE FOR COMMUNICATION DATA UNIT
5  ADD Jcr-list TO TOP OF Jc-list
6  RETURN TO 1

F I G. 35

```
1   OBTAIN NODE INDEX AND LOCAL INDEX ORIGINATION ON SECONDARY SIDE DATA CORRESPONDING TO ORIGINATION OF Jc, SPECIFICALLY, FOLLOING
    IS REPEATED FOR ALL v=1,..., V
    1.1    OBTAIN SECONDARY SIDE GLOBAL INDEX kc1' [v] = g_v( jc1 )
    1.2    OBTAIN SECONDARY SIDE NODE INDEX ycc[v] = gtop_B(kc1' [v])
    1.3    OBTAIN ORIGINATION OF SECONDARY SIDE LOCAL INDEX icc1' [v] = gtol_B(kc1' [v], ycc[v])
2   INITIALIZATOIN
    2.1    Dcc = 0, Vcc = 0, Lcc = LENGTH OF ARRAY ELEMENT
    2.2    jcc1[d] = jc1[d] FOR ALL d = 1,..., D
3   REPEAT FOLLOWING FOR SECONDARY SIDE DIMENSION v = 1,..., V
    3.1    WHEN TYEP OF GLOBAL SUBSCRIPT IS "OTHERS"
           3.1.1    DETERMINE THAT DIMENSION v IS NOT COTINOUS AND INTERRUPT REPEATING
    3.2    WHEN TYPE OF GLOBAL SUBSCRIPT IS "SCALAR"
           3.2.1    WHEN ALLOCATON SIZE OF DIMENSION v OF SECONDARY SIDE LOCAL ARRAY IS NOT 1, DETERMINE THAT DIMENSION v IS NOT
                    CONTINOUS AND INTERRUPT REPEATING
           3.2.2    icc1' [v] = ic1' [v],  Vcc = v
    3.3    WHEN TYPE OF GLOBAL SUBSCRIPT IS "INTERVAL" OR "COMBINATION OF THE THREE"
           3.3.1    OBTAIN d FROM VtoD[v]
           3.3.2    WHEN d = Dcc + 1 IS NOT SATISFIED, DETERMINE THAT v-TH DIMENSION IS NOT CONTINOUS AND INTERRUPT REPEATING
           3.3.3    OBTAIN COMBINATION-OF-THE-THREE PARAMETERS kc' [v] OF SECONDARY SIDE GLOBAL INDEX FROM GLOBAL SUBSCRIPT
                    COMBINATION-OF-THE-THREE PARAMETERS k' [v] AND COMBINATION-OF-THE-THREE PARAMETERS jc[d] OF INPUT
                    COMMUNICATION DATA INDEX, AND OBTAIN COMBINATION-OF-THE-THREE PARAMETERS icc' [v] OF LOCAL INDEX IN NODE
                    INDEX ycc[v]
                    WHEN TYPE IS "INTERVAL"
                        kc1' [v] = k1' [v] + jc1[d],   kc2' [v] = k1' [v] + jc2[d]
                        (icc1' [v], icc2' [v]) = gtol2_B(kc1' [v], kc2' [v], ycc[v])
                    WHEN TYEP IS "COMBINATION OF THE THREE"
                        kc1' [v] = k1' [v] + jc1[d] * k3' [v],   kc2' [v] = k1' [v] + jc2[d] * k3' [v],
                        kc3' [v] = jc3[d] * k3' [v]
                        (icc1' [v], icc2' [v], icc3' [v]) = gtol3_B(kc1' [v], kc2' [v], kc3' [v], ycc[v])
           3.3.4    WHEN TYPE OF GLOBAL SUBSCRIPT IS "COMBINATION OF THE THREE" AND icc3' [v] IS NOT 1, DETERMINE THAT v-TH
                    DIMENSION IS NOT CONTINOUS AND INTERRUPT REPEATING
```

F I G. 37

3.3.5 FROM kc'[v], OBTAIN RANGE kcc'[v] OF GLOBAL INDEX ASSIGNED TO NODE INDEX ycc[v], AND OBTAIN CORRESPONDING COMMUNICATION DATA jcc[d]. WHEN TYPE IS "INTERVAL",
(kcc1'[v], kcc2'[v]) = gtog2_B(kc1'[v], kc2'[v], ycc[v])
jcc1[d] = kcc1'[v] - k1'[v], jcc2[d] = kcc2'[v] - k1'[v]
WHEN TYEP IS "COMBINATION OF THE THREE",
(kcc1'[v], kcc2'[v], kcc3'[v]) = gtog2_B(kc1'[v], kc2'[v], ycc[v])
jcc1[d] = (kcc1'[v] - k1'[v]) / k3'[v], jcc2[d] = (kcc2'[v] - k1'[v]) / k3'[v], jcc3[d] = jcc3[d] : jcc3[d]
jcc3[d] = kcc3'[v] / k3'[v]

3.3.6 WHEN jcc3[d] IS NOT EQUAL TO jc3[d], DETERMINE THAT IT IS NOT POSSIBLE TO MAKE v-TH DIMENSION CONTINOUS ON BOTH PRIMARY SIDE AND SECONDARY SIDE, AND INTERRUPT REPEATING 3.3.7 IT WAS DETERMINED THAT v-TH DIMENSION IS CONTINUOUS ALSO ON SECONDARY SIDE IN AREA jcc1[d] : jcc2[d] : jcc3[d]
jcc1[d] = jc1[d], jcc3[d] = jc3[d] ARE SATISFIED NOW. CONDUCT FOLLOING SETTING
Vcc = v, Dcc = d
LENGTH OF INTERVAL OF LOCAL INDEX extent = icc1'[v] - icc1'[v] + 1
Lcc = Lcc * extent 3.3.8 WHEN jcc2[d] IS NOT EQUAL TO jc2[d], DETERMINE THAT CONTINUITY OVER DIMENSIONS IS NOT POSSIBLE AND INTERRUPT REPEATING 3.3.9 WHEN extent IS NOT EQUAL TO ALLOCATION SIZE OF DIMENSION v OF SECONDARY SIDE LOCAL ARRAY, DETERMINE THAT CONTINUITY OVER DIMENSION IS NOT POSSIBLE AND INTERRUPT REPEATING 3.4 TO NEXT v 4 OBTAIN Jcr-list 4.1 WHEN jcc2[Dcc] + jcc3[Dcc] > jc2[Dcc] IS SATISFIED, Jcr-list IS VACANT 4.2 OTHERWISE
4.2.1 FOR d = 1, ....., Dcc-1, jcr1[d] = jc1[d], jcr2[d] = jc2[d], jcr3[d] = jc3[d]
4.2.2 jcr1[Dcc] = jcc2[Dcc] + jcc3[Dcc], jcr2[Dcc] = jc2[Dcc], jcr3[Dcc] = jc3[Dcc]
4.2.3 FOR d = Dcc+1, ....., D, jcr1[d] = jc1[d]
4.2.4 Jcr-list = ( Jcr )

4.3 WHEN Dcc < Dc IS SATISFIED, REPEAT FOLLOING FOR dd = Dcc+1, ....., Dc
4.3.1 FOR d = 1, ....., dd-1, jcr1[d] = jc1[d], jcr2[d] = jc2[d], jcr3[d] = jc3[d]
4.3.2 jcr1[dd] = jc1[dd] + jc3[dd], jcr2[dd] = jc2[dd], jcr3[dd] = jc3[dd]
WHEN jcr1[dd] > jcr2[dd] IS SATISFIED, SKP TO NEXT dd
4.3.3 FOR d = dd+1, ....., D, jcr1[d] = jc1[d]
4.3.4 ADD Jcr = (jcr[1], ....., jcr[D]) TO TAIL OF Jcr-list
THIS PROCESS IS EXPLAINED IN FIG. 39. FIG. 39 IS FOR A CASE WHEN jc3[1] = jc3[2] = jc3[3] = 1 FOR Dc = 3, Dcc = 1. THREE MULTIDIMENSIONAL RECTANGULARS THAT ARE TO GENERATE NEXT COMMUNICATION ARE SET IN Jcr-list BY REPEATING FROM dd = 1 TO 3

5 RETURN Jcc, Lcc, Dcc, ycc, Icc1', Jcr-list , AND TERMIANTE

F I G. 3 8

```
1   OBTAIN ORIGINATION OF PRIMARY SIDE LOCAL INDEX icc1 = (icc1[1], ....., icc1[U])
1.1   FOR ALL u = 1, ....., DtoU[Dcc]
        d = UtoD[u]
        icc1[u] = i1[u] + jcc1[d] * i3[u],   icc2[u] = i1[u] + jcc2[d] * i3[u],   icc3[u] = i3[u]
1.2   FOR ALL u = DtoU[Dcc] + 1, ....., U
        icc1[u] = gtol_A(f_u(jcc1))
2   BY USING MPI LIBRARY ETC., PUT CONTINUOUS DATA OF LENGTH Lcc FROM ARRAY ELEMENT a(icc1) OF SELF NODE
    TO CONTINOUS AREA FROM
    ARRAY ELEMENT b(icc1') OF NODE ycc
3   TERMINATE
```

F I G. 4 0

```
for jx[D] = jx1[D] to jx2[D] step jx3[D]
  ...
  for jx[Dt+1] = jx1[Dt+1] to jx2[Dt+1] step jx3[Dt+1]
    RECTANGULAR DATA UNIT LIST Jt-list = ( jt[1], ..., jt[Dt], jx[Dt+1], ..., jx[t] )
    call RECTANGULAR DATA UNIT PUT PROCEDURE
  end for
  ...
end for
```

F I G. 4 2

1  INITIALIZATION Ut = 0, It = ( ), Dt = 0, Jt = ( ), Lt = LENGTH OF ARRAY ELEMENT
2  last_d = 0
3  FOR PRIMARY SIDE DIMENSION u = 1, ..., U, REPEAT FOLLOWING
    3.1   WHEN TYPE OF LOCAL SUBSCRIPT IS "OTHERS", DETERMINE THAT u-TH DIMENSION IS IRREGULAR AND INTERRUPT REPEATING
    3.2   WHEN TYPE OF LOCAL SUBSCRIPT IS "SCALAR"
         3.2.1   UPDATE Ut, It
                3.2.1.1   Ut = u
                3.2.1.2   COPY LOCAL SUBSCRIPT i1[u], AND ADD RESULT TO TAIL OF It
    3.3   WHEN TYPE OF LOCAL SUBSCRIPT IS "INTERVAL" OR "COMBINATION OF THE THREE"
         3.3.1   OBTAIN d FROM UtoD[u]
         3.3.2   WHEN d = last_d + 1 IS NOT SATISFIED, DETERMINE THAT THERE IS ACCESS OF DIMENSION THAT IS NOT RECTANGULAR
                 BEFORE u-TH DIMENSION AND INTERRUPT REPEATING
         3.3.3   last_d = d
         3.3.4   UPDATE Ut, It, Dt, Jt
                3.3.4.1   Ut = u
                3.3.4.2   COPY LOCAL SUBSCRIPT COMBINATION-OF-THE-THREE PARAMETERS i1[u], i2[u], i3[u] AND ADD RESULT TO
                          TAIL OF It
                3.3.4.3   Dt = d
                3.3.4.4   COPY COMBINATION-OF-THE-THREE PARAMETERS jx1[d], jx2[d], jx3[d] CORRESPONDING TO PRIMARY SIDE
                          DATA AND ADD RESULT TO TAIL OF Jt
                3.3.4.5   Lt = Lt * max(int((i2[u] - i1[u] + i3[u]) / i3[u]), 0)
         3.3.5   REPEATING MAY BE INTERRUPTED HERE WHEN IT HAS BEEN DETERMINED BY VALUE OF (OPTION) Lt THAT RECTANGULAR
                 DATA UNIT IS SUFFICINELY LARGE
    3.4   TO NEXT u
4  RETURN Ut, It, Dt, Jt, AND TERMIANTE

F I G. 43

F I G. 44

1 WHEN Jt-list IS VACANT, PROCESS IS TERMIANTED
2 EXTRACT ONE FROM TOP OF Jt-list AND TREAT IT AS Jt
3 BY RECTANGULAR-CONTINUOUS DATA UNIT DETECTION PROCEDURE, OBTAIN PARTIAL ARRAY Jtc OF Jt THAT HAS SAME ORIGINATION AS Jt AND THAT IS CONTINUOUS OVER DIMENSION ON SECONDARY SIDE AND NUMBER OF DIMENSIONS (CONTINOUS DIMENSIONS) Dtc$(0 \leq Dtc \leq Dt)$ OF COMMUNICATION DATA THEREOF. AT THE SAME TIME, OBTAIN PARTIAL Jtr-list, WHICH IS RESULT OF REMOVING Jtc FROM Jt
4 TREAT Jtc AS COMMUNICATION DATA UNIT. BY RECTANGULAR-CONTINOUS DATA UNIT PUT PROCEDURE, PUT DATA FROM BUFFER TO SECONDARY SIDE AFTER BEING BUFFERRED ON THE PRIMARY SIDE FOR COMMUNICATION DATA UNIT
5 ADD Jtr-list TO TOP OF Jt-list
6 RETURN TO 1

```
1  OBTAIN NODE INDEX AND LOCAL INDEX ORIGINATION OF SECONDARY SIDE DATA CORRESPONDING TO ORIGINATION OF Jt. SPECIFICALLY, FOLLOWING IS
   REPEATED FOR ALL v=1,...,V
   1.1   OBTAIN SECONDARY SIDE GLOBAL INDEX kt1' [v] = g_v( jt1 )
   1.2   OBTAIN SECONDARY SIDE NODE INDEX ytc[v] = gtop_B(kt1' [v])
   1.3   OBTAIN ORIGINATION OF SECONDARY SIDE LOCAL INDEX itc1' [v] = gtol_B(kt1' [v], ytc[v])
2  INITIALIZATOIN
   2.1   Dtc = 0, Vtc = 0, Ltc = = LENGTH OF ARRAY ELEMENT
   2.2   FOR ALL d = 1, ..., D,  jtc1[d] = jt1[d]
3  REPEAT FOLLOWING FOR SECONDARY SIDE DIMENSION v = 1, ..., V
   3.1   WHEN TYEP OF GLOBAL SUBSCRIPT IS "OTHERS"
         3.1.1  DETERMINE THAT DIMENSION v IS NOT COTINOUS AND INTERRUPT REPEATING
   3.2   WHEN TYPE OF GLOBAL SUBSCRIPT IS "SCALAR"
         3.2.1  WHEN ALLOCATON SIZE OF DIMENSION v OF SECONDARY SIDE LOCAL ARRAY IS NOT 1, DETERMINE THAT DIMENSION v IS NOT
                CONTINOUS AND INTERRUPT REPEATING
         3.2.2  itc1' [v] = it1' [v],  Vtc = v
   3.3   WHEN TYPE OF GLOBAL SUBSCRIPT IS "INTERVAL" OR "COMBINATION OF THE THREE"
         3.3.1  OBTAIN d FROM VtoD[v]
         3.3.2  WHEN d == Dtc + 1 IS NOT SATISFIED, DETERMINE THAT v-TH DIMENSION IS NOT CONTINOUS AND INTERRUPT REPEATING
         3.3.3  OBTAIN COMBINATION-OF-THE-THREE PARAMETERS itc' [v] OF LOCAL INDEX FROM GLOBAL SUBSCRIPT COMBINATION-OF-THE-
                THREE
                PARAMETERS k' [v] AND COMBINATION-OF-THE-THREE PARAMETERS jt[d] OF INPUT COMMUNICATION DATA INDEX IN INFORMATION
                TABLE, AND OBTAIN COMBINATION-OF-THE-THREE PARAMETERS itc' [v] OF LOCAL INDEX IN NODE INDEX ytc[v]
                WHEN TYPE IS "INTERVAL"
                   kt1' [v] = k1' [v] + jt1[d],   kt2' [v] = k1' [v] + jt2[d]
                   (itc1' [v],  itc2' [v]) = gtoI2_B(kt1' [v], kt2' [v], ytc[v])
                WHEN TYEP IS "COMBINATION OF THE THREE"
                   kt1' [v] = k1' [v] + jt1[d] * k3' [v],   kt2' [v] = k1' [v] + jt2[d] * k3' [v]
                   kt3' [v] = jt3[d] * k3' [v]
                   (itc1' [v], itc2' [v], itc3' [v]) = gtoI3_B(kt1' [v], kt2' [v], kt3' [v], ytc[v])
         3.3.4  WHEN TYPE OF GLOBAL SUBSCRIPT IS "COMBINATION OF THE THREE" AND itc3' [v] IS NOT 1, DETERMINE THAT v-TH
                DIMENSION IS NOT CONTINOUS AND INTERRUPT REPEATING
         3.3.5  FROM kt' [v], OBTAIN RANGE ktc' [v] OF GLOBAL INDEX ASSINGED TO NODE INDEX ytc[v] AND OBTAIN CORRESPONDING
                COMMUNICATION DATA jtc[d].
                WHEN TYPE IS "INTERVAL"
                   (ktc1' [v], ktc2' [v]) = gtog2_B(kt1' [v], kt2' [v], ytc[v])
                   jtc1[d] = ktc1' [v] - k1' [v],   jtc2[d] = ktc2' [v] - k1' [v]
                WHEN TYPE IS "COMBINATION OF THE THREE"
                   (ktc1' [v], ktc2' [v], ktc3' [v]) = gtog2_B(kt1' [v], kt2' [v], ytc[v])
                   jtc1[d] = (ktc1' [v] - k1' [v]) / k3' [v],   jtc2[d] = (ktc2' [v] - k1' [v]) / k3' [v]
                   jtc3[d] = ktc3' [v] / k3' [v]
```

F I G. 4 6

```
3.3.6    IT WAS DETERMINED THAT COMMUNICATION DATA jtc1[d]:jtc2[d]:jtc3[d] IS CONTINOUS IN NODE INDEX ytc[v] OF v-TH
         DIMENSION
         jtc1[d] = jt1[d],jtc3[d] IS MULTIPLE OF jt3[d].    CONDUCT FOLLOWING SETTING
         Vtc = v, Dtc = d
         LENGTH OF INTERVAL OF LOCAL INDEX IS extent = itc2'[v] - itc1'[v] + 1
         Ltc = Ltc * extent
3.3.7    WHEN jtc2[d] IS NOT EQUAL TO jt2[d] OR WHEN jtc3[d] IS NOT EQUAL TO jt3[d]. DETERMINE THAT CONTINUITY OVER
         DIMENSIONS IS NOT POSSIBLE AND INTERRUPT REPEATING
3.3.8    WHEN extent IS NOT EQUAL TO ALLOCATOIN SIZE OF DIMENSION v OF SECONDARY SIDE LOCAL ARRAY, DETERMINE THAT
         CONTINUITY OVER DIMENSION IS NOT POSSIBLE AND INTERRUPT REPEATING
3.4 TO NEXT v
4  AFTER INITALIZING Jtr-list BY VACANT LIST, OBTAIN Jtr-list BY FOLLOWING PROCEDURE
4.1   WHEN jtc3[Dtc] > jt3[Dtc] IS SATISFIED, FOR t = 1, ..., jtc3[Dtc] / jt3[Dtc] - 1, REPEAT FOLLOWING
4.1.1     FOR d = 1, ..., Dtc-1, jtr1[d] = jt1[d], jtr2[d] = jt2[d], jtr3[d] = jt3[d]
4.1.2     jtr1[Dtc] = jt1[Dtc] + t * jt3[Dtc], jtr2[Dtc] = jt2[Dtc], jtr3[Dtc] = jtc3[Dtc]
4.1.3     FOR d = Dtc+1, ..., D, jtr1[d] = jt1[d]
4.1.4     ADD Jtr = (jtr[1], ..., jtr[D]) TO TAIL OF Jtr-list
4.2   WHEN jtc2[Dtc] + jtc3[Dtc] ≦ jt2[Dtc]
4.2.1     FOR d = 1, ..., Dtc-1, jtr1[d] = jt1[d], jtr2[d] = jt2[d], jtr3[d] = jt3[d]
4.2.2     jtr1[Dtc] = jtc2[Dtc] + jtc3[Dtc], jtr2[Dtc] = jt2[Dtc], jtr3[Dtc] = jt3[Dtc]
4.2.3     FOR d = Dtc+1, ..., D, jtr1[d] = jt1[d]
4.2.4     ADD Jtr = (jtr[1], ..., jtr[D]) TO TAIL OF Jtr-list
4.3   WHEN Dtc < Dt IS SATISFIED, FOR dd = Dtc+1, ..., D, REPEAT FOLLOWING
4.3.1     FOR d = 1, ..., dd-1, jtr1[d] = jt1[d], jtr2[d] = jt2[d], jtr3[d] = jt3[d]
4.3.2     jtr1[dd] = jt1[dd] + jt3[dd], jtr2[dd] = jt2[dd], jtr3[dd] = jt3[dd]
          WHEN jtr1[dd] > jtr2[dd] IS SATISFIED, SKIP TO NEXT dd
4.3.3     FOR d = dd+1, ..., D, jtr1[d] = jt1[d]
4.3.4     ADD Jtr = (jtr[1], ..., jtr[D]) TO TAIL OF Jtr-list
5  OBTAIN PRIMARY SIDE LOCAL INDEX Itc = (itc[1], ..., itc[DtoU[Dtc]]) CORRESPONDING TO Jtc.    SPECIFICALLY, FOR ALL u = 1, ...,
   DtoU[Dcc]
5.1    d = UtoD[u]
5.2    itc1[u] = i1[u] + jtc1[d] * i3[u], itc2[u] = i1[u] + jtc2[d] * i3[u], itc3[u] = i3[u]
6  RETURN Jtc, Ltc, Dtc, ytc, Itc1', Itc1', Jtr-list, AND TERMIANTE
```

F I G. 47

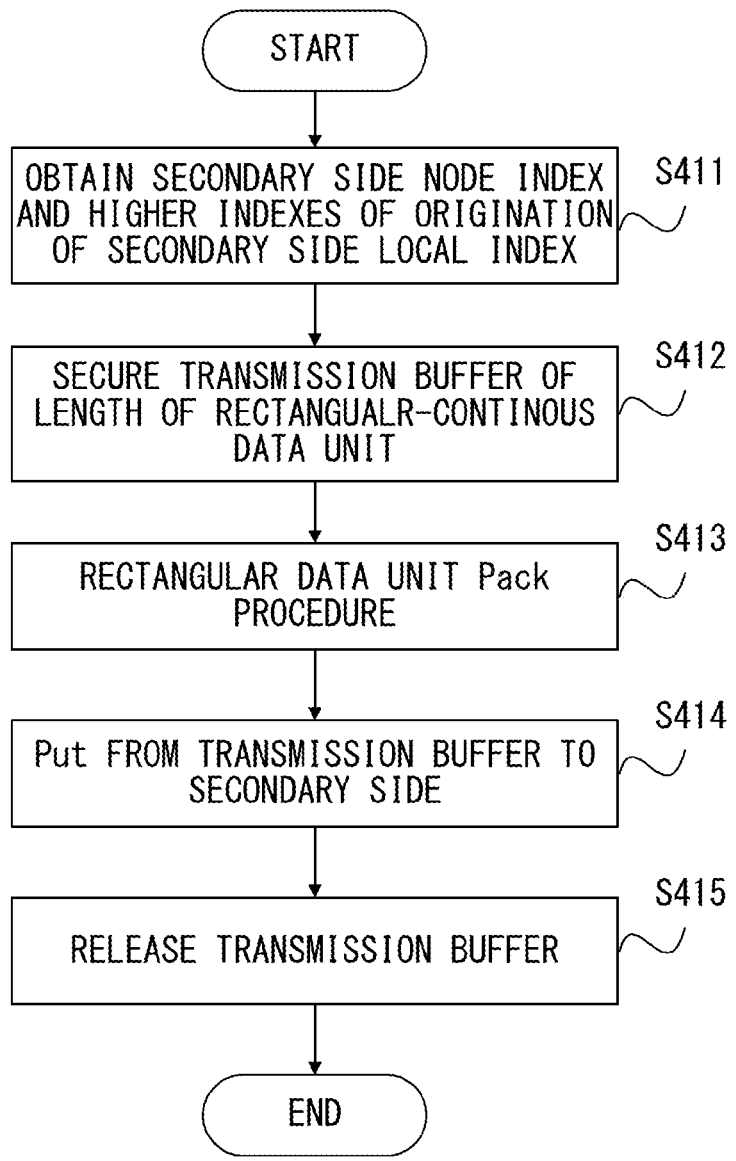
F I G. 4 8

1  OBTAIN ORIGINATION it1 = (it1[1], ..., it1[U]) OF PRIMARY SIDE LOCAL INDEX CORRESPONDING TO jt
  1.1  FOR ALL u = 1, ..., DtoU[u]
         d = UtoD[u]
         it1[u] = i1[u] + jt1[d] * i3[u]
  1.2  FOR ALL u = DtoU[Dt] + 1, ..., U
         it1[u] = gtol$_A$(f$_u$( jt1 ))
2  OBTAIN CONTINOUS LENGTH Lc AND NUMBER OF CONTINOUS DIMENSIONS OF it1 Dc ($0 \leq Dc \leq Dt$)
  2.1  INITIAL VALUE Uc = 0, Lc = LENGTH OF ARRAY ELEMENT
  2.2  FOR ALL u = 1, ..., DtoU[Dt]
      2.2.1  WHEN TYPE OF DIMENSION u OF PRIMARY SIDE LOCAL DATA IS NOT "INTERVAL", DETERMINE THAT IT IS NOT CONTINOUS
             IN DIMENSION u AND INTERRUPT REPEATING
      2.2.2  Uc = u, extent = it2[u] - it1[u] + 1, Lc = Lc * extent
      2.2.3  WHEN extent IS NOT DENTICAL TO ALLOCATION SIZE OF DIMENSION u OF LOCAL ARRAY, DETERMINE THAT THERE IS
             NOT CONTINUITY OVER DIMENSION AND INTERRUPT REPEATING
      2.2.4  TO NEXT u
  2.3  Dc = UtoD[Uc]
3  REPEATEDLY COPY PRIMARY SIDE DATA TO AREA SPECIFIED BY BUFFER POINTER FOR EACH CONTINOUS INTERVAL OF LENGTH Lc. THIS
   MULTIPLE LOOP MAY BE IMPLEMENTED BY USING A RECURSIVE PROCEDURE CALL.
       pos = SendBuf
       for u = 1 to U          /* INITIALIZATION */
           ic[u] = it1[U]
       end for
       for j[Dt+1] = jt1[Dt] to jt2[Dt] step jt3[Dt]
           u = DtoU[Dt];  ic[u] = i1[u] + j[Dt+1] * i3[u]
           ...
           for j[Dc+1] = jt1[Dc+1] to jt2[Dc+1] step jt3[Dc+1]
               u = DtoU[Dc+1];  ic[u] = i1[u] + j[Dc+1] * i3[u]
               COPY CONTIOUS DATA OF LENGTH Lc FROM a(ic[1], ..., ic[D]) TO pos
               PROCEED pos BY Lc
           end for
           ...
       end for
4  TERMINATION

F I G. 49

```
for jx[D] = jx1[D] to jx2[D] step jx3[D]
  ...
  for jx[Dc+1] = jx1[Dc+1] to jx2[Dc+1] step jx3[Dc+1]
    CONTINUOUS DATA UNIT LIST Jc-list = ( jc[1], ..., jc[Dc], jx[Dc+1], ..., jx[D] )
    call CONTINOUS DATA UNIT GET PROCEDURE
  end for
  ...
end for
```

F I G. 5 1

1  WHEN Jc-list IS VACANT, TERMINATE PROCESS
2  EXTRACT ONE FROM TOP OF Jc-list AND TREAT IT AS Jc
3  BY CONTINUOUS-CONTINUOUS DATA UNIT DETECTION PROCEDURE, OBTAIN PARTIAL ARRAY Jcc OF Jc THAT HAS SAME ORIGINATION AS Jc AND THAT IS CONTINUOUS OVER DIMENSION ON BOTH PRIMARY SIDE AND SECONDARY SIDE AND NUMBER OF DIMENSIONS (CONTINUOUS-CONTINUOUS DIMENSIONS) $Dcc$ $(0 \leq Dcc \leq Dc)$ OF COMMUNICATION DATA THEREOF. AT THE SAME TIME, OBTAIN PARTIAL Jcr-list, WHICH IS RESULT OF REMOVING Jcc FROM Jc
4  TREAT Jcc AS COMMUNICATION DATA UNIT. BY CONTINOUS-CONTINOUS DATA UNIT GET PROCEDURE, PUT DATA FROM PRIMARY SIDE TO SECONDARY SIDE FOR COMMUNICATION DATA UNIT
5  ADD Jcr-list TO TOP OF Jc-list
6  RETURN TO 1

F I G. 5 2

```
1    OBTAIN ORIGINAITON OF PRIMARY SIDE LOCAL INDEX icc1 = (icc1[1], ....., icc1[U]) CORRESPONDING TO Jcc
1.1      FOR ALL u = 1, ....., DtoU[Dcc]
             d = UtoD[u]
             icc1[u] = i1[u] + jcc1[U] * i3[u]
1.2      FOR ALL u = DtoU[Dcc] + 1, ....., U
             icc1[u] = gtol_A(f_u( jcc1 ))
2    BY USING MPI LIBRARY ETC., GET CONTINUOUS DATA OF LENGTH Lcc FROM ARRAY ELEMENT b( icc1' ) OF NODE ycc
     TO CONTINOUS AREA FROM ARRAY ELEMENT a( icc1 ) OF SELF NODE
3    TERMINATE
```

F I G. 5 4

```
for jx[D] = jx1[D] to jx2[D] step jx3[D]
   ...
   for jx[Dt+1] = jx1[Dt+1] to jx2[Dt+1] step jx3[Dt+1]
      RECTANGULAR DATA UNIT LIST Jt-list = ( jt[1], ..., jt[Dt], jx[Dt+1], ..., jx[t] )
      call RECTANGULAR DATA UNIT GET PROCEDURE
   end for
   ...
end for
```

FIG. 56

| | |
|---|---|
| 1 | WHEN Jt-list IS VACANT, TERMINATE PROCESS |
| 2 | EXTRACT ONE FROM TOP OF Jt-list AND TREAT IT AS Jt |
| 3 | BY <u>RECTANGULAR-CONTINUOUS DATA UNIT DETECTION PROCEDURE</u>, OBTAIN PARTIAL ARRAY Jtc OF Jt THAT HAS SAME ORIGINATION AS Jt AND THAT IS CONTINUOUS OVER DIMENSION ON SECONDARY SIDE AND NUMBER OF DIMENSIONS (RECTANGULAR-CONTINOUS DIMENSIONS) Dtc(0≦Dtc≦Dt) OF COMMUNICATION DATA THEREOF. AT THE SAME TIME, OBTAIN PARTIAL Jtr-list, WHICH IS RESULT OF REMOVING Jtc FROM Jt |
| 4 | TREAT Jtc AS COMMUNICATION DATA UNIT. BY <u>RECTANGULAR-CONTINOUS DATA UNIT GET PROCEDURE</u>, GET DATA AFTER BUFFERING THE DATA ON PRIMARY SIDE FOR COMMUNICATION DATA UNIT |
| 5 | ADD Jtr-list TO TOP OF Jt-list |
| 6 | RETURN TO 1 |

F I G. 57

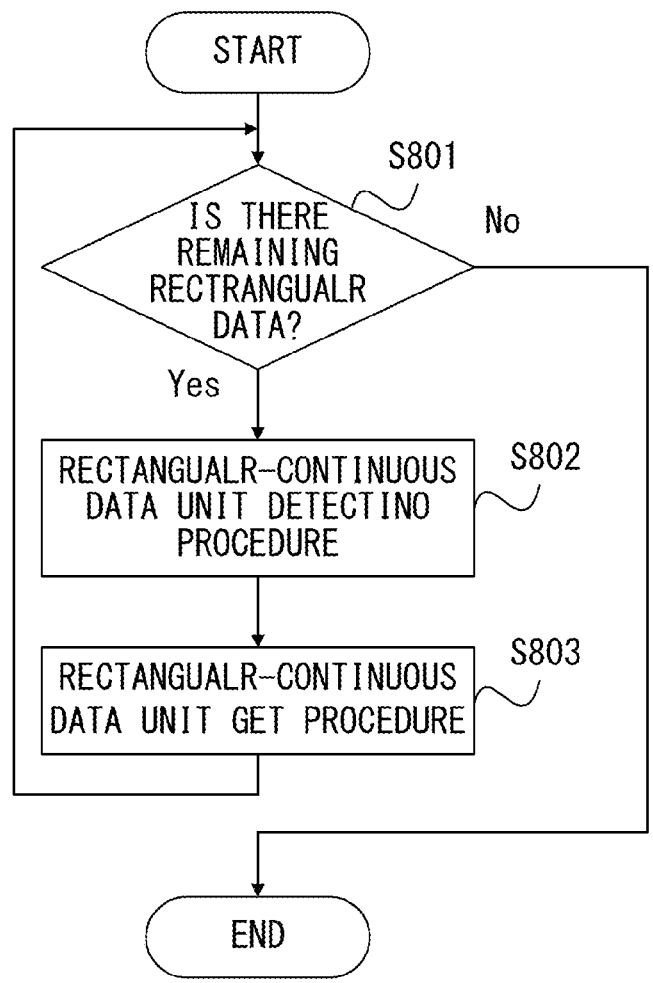
F I G. 5 8

```
1   OBTAIN ORIGINATION it1 = (it1[1], ..., it1[U]) OF PRIMARY SIDE LOCAL INDEX CORRESPONDING TO jt
    1.1   FOR ALL u = 1, ..., DtoU[Dt]
              d = UtoD[u]
              it1[u] = i1[u] + jt1[d] * i3[u]
    1.2   FOR ALL u = DtoU[Dt] + 1, ..., U
              it1[u] = gtolA(fu( jt1 ))
2   OBTAIN CONTINOUS LENGTH Lc (LNGTH OF ARRAY ELEMENT ≦Lc≦Lt) AND NUMBER OF CONTINOSU DIMENSIONS OF it Dc (0≦Dc≦Dt)
    2.1   INITIAL VALUE Uc = 0, Lc = LENGTH OF ARRAY ELEMENT
    2.2   FOR ALL u = 1, ..., DtoU[Dt]
          2.2.1  WHEN TYPE OF DIMENSION u OF PRIMARY SIDE LOCAL DATA IS NOT "INTERVAL", DETERMINE THAT IT IS NOT
                 CONTINOUS IN DIMENSION u AND INTERRUPT REPEATING
          2.2.2  Uc = u, extent = it2[u] - it1[u] + 1, Lc = Lc * extent
          2.2.3  WHEN extent IS NOT IDENTICAL TO ALLOCATION SIZE OF DIMENSION u OF LOCAL ARRAY, DETERMINE THAT THERE
                 IS NOT CONTINOUITY OVER DIMENSION AND INTERRUPT REPEATING
          2.2.4  TO NEXT u
    2.3   Dc = UtoD[Uc]
3   REPEATEDLY DISTRIBUTE FROM RecvBuf TO PRIMARY SIDE DATA FOR EACH CONTINOUS INTERVAL. THIS MULTIPLE LOOP MAY BE
    IMPLEMENTED BY USING A RECURSIVE PROCEDURE CALL.
        pos = RecvBuf
        for u = 1 to U
            ic[u] = it1[U]     /* INITIALIZATION */
        end for
        for j[Dc+1] = jt1[Dt] to jt2[Dt] step jt3[Dt]
            u = DtoU[Dt];  ic[u] = i1[u] + j[Dt] * i3[u]
            ...
            for j[Dc+1] = jt1[Dc+1] to jt2[Dc+1] step jt3[Dc+1]
                u = DtoU[Dc+1];  ic[u] = i1[u] + j[Dc+1] * i3[u]
                COPY CONTIOUS DATA OF LENGTH Lc TO a(ic[1], ..., ic[D]) FROM POSITION OF pos
                PROCEED pos BY Lc
            end for
            ...
        end for
```

F I G. 6 0

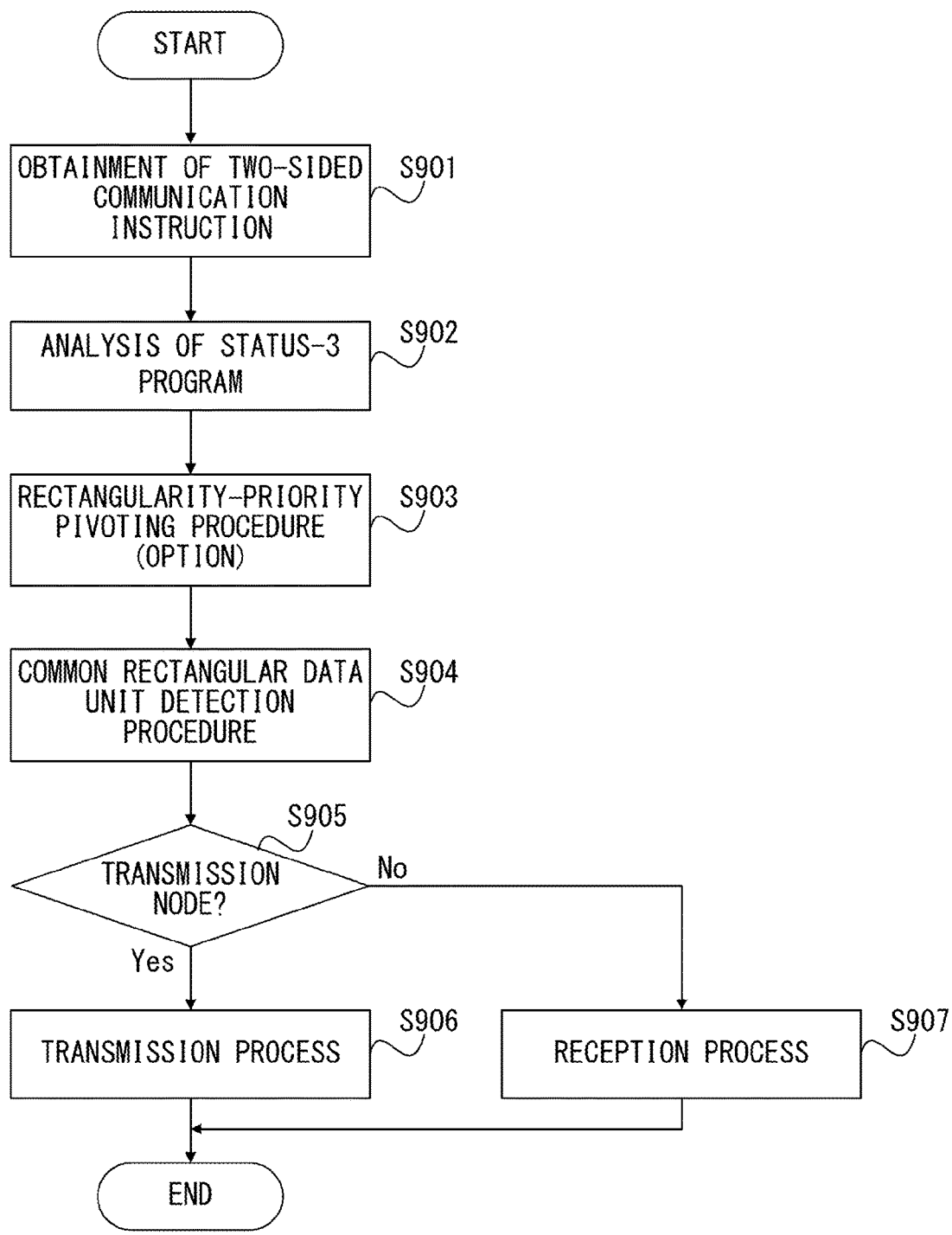
F I G. 6 1

```
for jx[D] = jx1_A[D] to jx2_A[D] step jx3_A[D]
  ...
  for jx[Dt+1] = jx1_A[Dt+1] to jx2_A[Dt+1] step jx3_A[Dt+1]
    call COMMON RECTANGUALR DATA UNIT TRANSMISSION PROCESS
  end for
  ...
end for
```

FIG. 62

```
for jx[D] = jx1_B[D] to jx2_B[D] step jx3_B[D]
    ...
    for jx[Dt+1] = jx1_B[Dt+1] to jx2_B[Dt+1] step jx3_B[Dt+1]
        call COMMON RECTANGUALR DATA UNIT RECEPTION PROCESS
    end for
    ...
end for
```

F I G. 6 3

1  FOR COMMUNICATION INFORMATION TABLES ON TRANSMISSION AND RECEPTION SIDES, SORT TABLE OF COMMUNICATION DATA SO THAT RECTANGULAR DIMENSIONS ARE LOWER AND OTHER DIMENSIONS ARE HIGHER. SPECIFICALLY:
   1.1  list1 = (), list2 = ()
   1.2  SEQUENTIALLY FOR ALL d = 0, ..., D-1
        1.2.1  WHEN u = DtoU[d] CAN BE OBTAINED FOR COMMUNICATION INFORMATION TABLES ON TRANSMISSION AND RECEPTION SIDES AND TYEP OF GLOBAL ARRAY SUBSCRIPT OF DIMENSION u IS "SCALAR", "INTERVAL" OR "COMBINATION OF THE THREE", ADD d TO TAIL OF plist1
               OTHERWISE, ADD d TO TAILE OF plist2
   1.3  SORT TABLE OF COMMUNICATION DATA SO THAT IT BECOMES ORDER OF LIST THAT OBTAINED BY CONNECTING list1 AND list2
2  FOR COMMUNICATION INFORMATION TABLES ON TRANSMISSION AND RECEPTION SIDES, CONVERT VALUES OF UtoD AND DtoU SO THAT THEY CORRESPOND TO THE SORTING OF COMMUNICATION DATA. SPECIFICALLY FOR ALL d = 0, ..., D-1, IT IS ASSUMED THAT UtoD[DtoU[d]] = d, VtoD[DtoV[d]] = d
3  (OPTION) FOR HIGHER EFFICINECY OF MEMORY COPYING WHEN BUFFERING OR UNBUFFERING IS CONDUCTED, IT IS POSSIBLE TO EXECUTE CONTINUITY-PRIORITY PIVOTING PROCEDURE HERE IN SCOPE OF DIMENSION OF list1

F I G. 6 4

```
1   INITIAL VALUE Dt = 0
2   FOR DIMENSION OF COMMUNICATION DATA d = 1, ..., D, CONDUCT FOLLOWING
    2.1   WHEN IT IS NOT POSSIBLE TO OBTAIN u =DtoU[d] OR TYPE OF DIMENSION u OF GLOBAL SUBSCRIPT IS
          "OTHERS" IN TRANSMISSION SIDE COMMUNICATION INFORMATION TABLE, INTERRUPT REPEATING
    2.2   WHEN IT IS NOT POSSIBLE TO OBTAIN u =DtoU[d] OR TYPE OF DIMENSION u OF GLOBAL SUBSCRIPT IS
          "OTHERS" IN RECEPTION SIDE COMMUNICATION INFORMATION TABLE, INTERRUPT REPEATING
    2.3   Dt = d
    2.4   (OPTION) WHEN IT HAS BEEN DETERMINED THAT COMMON RECTANGULAR DATA UNIT IS SUFFICINETLY LARGE,
          IT IS POSSIBLE TO DETERMINE Dt AND INTERRUPT REPEATING
    2.5   TO NEXT d
3   RETRUN Dt AND TERMIANTE
```

F I G. 65

```
1   SECURE TWO-DIMENSIONAL ARRAY bufExtent[Dt][Ymax] AND INITIALIZE ALL TO ZERO.  HERE, Ymax =max{ Y[DtoV[1]], ..., Y[DtoV[Dt]] }
    INITIALIZE ALLAY OF LIST y_countList[Dt] BY VACANCY
2   STORE, IN bufExtent[d][y[v]], SIZE OF BUFFER FOR PAIR DIMENSION d = 1, ..., Dt OF COMMUNICATION DATA AND SECONDARY SIDE NODE
    INDEX y[v] = 0, ..., Y[v] - 1(v =DtoV[d]) CORRESPONDING TO d.  AT SAME TIME, STORE, IN y_countList[d], PATTERN OF BUFFEIRNG IN
    DIMENSION d.
    2.1   FOR ALL d = 1, ..., Dt
          2.1.1   u = DtoU[u],  v = DtoV[d]
          2.1.2   BY REPEATING FOLLOWING, SET y_countList[d]
                  for j[d] = jx1[d] to jx2[d] step jx3[d]
                      k' [v] = g_v( j[d] )
                      y[v] = gtop_B( k' )
                      WHEN y_countList[d] IS VACANT OR y OF LAST ELEMNT OF y_countList[d] IS NOT EQUAL TO y[v]
                          ADD NEW y_count = ( y, count ) = ( y[v], 1 ) TO TAIL OF y_countList[d]
                      WYEN y OF LAST ELEMENT OF y_countList[d] IS EQUAL TO y[v]
                          INCREMENT count OF LAST ELEMENT OF y_countList[d] BY 1
                  end for
          2.1.3   BY REPEATING FOLLOWING, SET bufExtent[d]
                  for ( y, count ) in y_countList[d]
                      bufExtent[d][y] = bufExtent[d][y] + count
3   CREATE CODES FOR SECUING AS MANY BUFFERS SendBuf[ y_1 ] ... [ y_Dt ] ( y_1 = 0, ..., Y[DtoV[1]] - 1; ... ; y_Dt = 0, ..., Y[DtoV[Dt]] - 1
    AS SPECIFIED BY Y[DtoV[1]] * ... * Y[DtoV[Dt]] RESPECGIVELY WITH SIZES bufExtent[1] [ y_1 ] * ... * bufExtent[Dt] [ y_Dt ] AT
    EXECUTION
    IN CASE OF IMPLEMENTATION BY COMPILER, CODES AS FOLLOWS ARE TO BE CREATED.  IN CASE OF RUNTIME LIBRARY, CODES LIKE THIS MAY BE
    EXECUTED
        for y_1 = 0 to Y[DtoV[1]] - 1
          ...
            for y_Dt = 0 to Y[DtoV[Dt]] - 1
                length = bufExtent[1][y_1] * ... * bufExtent[Dt][y_Dt]
                SendBuf[y_1]...[y_Dt] = ALLOCATE(length * SIZE OF ARRAY ELEMENT)
            end for
          ...
        end for
4   TERMIANTE
```

FIG. 67

```
1   INITIALIZE ORIGINATION It1 = ( it1[1], ......, it1[U] ) BY It = ( it[1], ....., it[U] ) OF PRIMARY SIDE LOCAL DATA CORRESPONDING TO
    ORIGINATION ( jt1[1], ....., jt1[D] ) OF COMMON RECTANGULAR DATA UNIT
2   EXECUTE FOLLOWING MULTIPLE LOOP. THIS MAY BE IMPLEMENTED BY USING RECURSIVE PROCEDURE CALL.

it[DtoU[Dt]] = it1[DtoU[Dt]]
    for ( yy[Dt], count[Dt] ) in y_countList[Dt]
        for c[Dt] = 1 to count[Dt]
        ...
            it[DtoU[2]] = it1[DtoU[2]]
            for ( yy[2], count[2] ) in y_countList[2]
                for c[2] = 1 to count[2]
                    it[DtoU[1]] = it1[DtoU[1]]
                    for ( yy[1], count[1] ) in y_countList[1]
                        for c[1] = 1 to count[1]
                            PUSH VALUE OF a( it[1], ....., it[U] ) TO TRANSMISSION BUFFER SendBuf[yy[1] ... [yy[Dt]]
                            it[DtoU[1]] = it[DtoU[1]] + it3[DtoU[1]]
                        end for
                    end for
                    it[DtoU[2]] = it[DtoU[2]] + it3[DtoU[2]]
                end for
            end for
        ...
        end for
        it[DtoU[Dt]] = it[DtoU[Dt]] + it3[DtoU[Dt]]
    end for

3   TERMINATE
```

F I G. 6 8

```
1   FOR ALL TRANSMISSION BUFFERS, ISSUE SEND AS FOLLOWS. THIS SEND COMMUNICATION
    IS ASSOCIATED WITH RECV COMMUNICATION HAVING THE SAME TAG.
    for d = D to Dt+1 step -1
        v = DtoV[d]
        y[v] = gtop( g_v( Jt ) )
    end for
    for y[DtoV[Dt]] = 0 to Y[DtoV[Dt]] - 1
        ...
        for y[DtoV[1]] = 0 to Y[DtoV[1]] - 1
            SEND BY USING FOLLOWING PARAMETERS
                FROM SELF-NODE TRANSMISSION BUFFER SendBuf [y[DtoV[1]]... [y[DtoV[Dt]]]
                TO SECONDARY SIDE NODE ( y[1], ..., y[V] )
                LENGTH bufExtent[1] [y[DtoV[1]] * ... * bufExtent[Dt] [y[DtoV[Dt]]]
                TAG ( jt[Dt+1], ..., jt[D] )
        end for
        ...
    end for
```

```
1  FOR ALL RECEPTION BUFFERS, ISSUE RECV AS FOLLOWS.  THIS RECV COMMUNICATION IS ASSOCIATED WITH SEND
   COMMUNICATION HAVING SAME TAG.
   for d = D to Dt+1 step -1
     v = DtoV[d]
     y[v] = gtop( g_v( Jt ) )
   end for
   for y[DtoV[Dt]] = 0 to Y[DtoV[Dt]] - 1
     ...
       for y[DtoV[1]] = 0 to Y[DtoV[1]] - 1
         RECV BY FOLLOWING PARAMETERS
           TO SELF-NODE RECEPTION BUFFER RecvBuf[y[DtoV[1]]]...[y[DtoV[Dt]]]
           FROM SECONDARY SIDE NODE (y[1], ...., y[V])
           LENGTH bufExtent' [1][y[DtoV[1]]] * ... * bufExtent[Dt][y[DtoV[Dt]]]
           TAG ( jt[Dt+1], ...., jt[D] )
       end for
     ...
   end for
```

1  INITIALIZE ORIGIANTOIN OF PRIMARY SIDE LOCAL DATA It1 = ( it1[1], ...., it1[U] ) by It = ( it[1], ...., it[U] )
   CORRESPONDING TO ORIGINATION OF COMMON RECTANGULAR DATA UNIT ( jt1[1], ...., jt1[D] )
2  EXECUTE FOLLOWING MULTIPLE LOOP.   THIS MAY BE IMPLEMENTED BY USING RECURSIVE PROCEDURE CALL.

it[DtoU[Dt]] = it1[DtoU[Dt]]
       for ( yy[Dt], count[Dt] ) in y_countList[Dt]
           for c[Dt] = 1 to count[Dt]
               ...
               it[DtoU[2]] = it1[DtoU[2]]
               for ( yy[2], count[2] ) in y_countList[2]
                   for c[2] = 1 to count[2]
                       it[DtoU[1]] = it1[DtoU[1]]
                       for ( yy[1], count[1] ) in y_countList[1]
                           for c[1] = 1 to count[1]
                               pop RRO FROM RECEPTION BUFFER RecvBuf[yy[1]] ... [yy[Dt]] TO b( it[1], ...., it[U] )
                           end for
                           it[DtoU[1]] = it[DtoU[1]] + it3[DtoU[1]]
                       end for
                   end for
                   it[DtoU[2]] = it[DtoU[2]] + it3[DtoU[2]]
               end for
           ...
           end for
           it[DtoU[Dt]] = it[DtoU[Dt]] + it3[DtoU[Dt]]
       end for

3  TERMIANTE

F I G.  7 2

```
!-TRANSMISSION SIDE NODE ARAPY P AND VARIABLE ARRAY A
!$xmp nodes P(2,3)
real A(0:199, 0:299)
!$xmp distribute A(block, block) onto P !-RECEPTION SIDE NODE ARRAY Q AND VARIABLE ARARY B
!$xmp nodes Q(4)
real B(0:99, 0:99, 0:119)
!$xmp distribute B(*, *, block)

!-INSTRUCTION OF COMMUNICATION
!$xmp gmove
B(:, 60, :) = A(10:109, n2:n2+119)
```

F I G. 7 3

1. INITIALIZATION Uc = 0, Ic = ( ), Dc = 0, Jc = ( ), Lc = 4 BYTES
2. last_d = 0
3. PRIMARY SIDE DIMENSION u = 1
3.3 TYPE OF LOCAL SUBSCRIPT IS "INTERVAL"
3.3.1  d = UtoD[1] = 1
3.3.2  CONTINUE BECASEU d = last_d + 1 IS SATISFIED
3.3.3  last_d = 1
3.3.4  UPDATE Uc, Ic, Dc, Jc
3.3.4.1  Uc = 1
3.3.4.2  Ic = ( i1[1]:i2[1]:i3[1] ) = ( 10: 99 )
3.3.4.3  Dc = 1
3.3.4.4  Jc = ( jx1[1]:jx2[1]:jx3[1] ) = ( 0:89 )
3.3.4.5  Lc = Lc * (i2[1] - i1[1] + 1) = 4 * (99 - 10 + 1) = 360
3.4  BECAUSE fullSpan[u] IN INFORMATION TABLE IS false, INTERRUPT REPEATING
4. REPEAT Uc = 1, Ic = ( 10:99 ), Dc = 1, Jc = ( 0:89 ), Lc = 360 AND TERMIANTE

FIG. 76

1. Jc-list IS NOT VACANT
2. Jc = ( 0:89, 80 )
   Jc-list HAS BECOME VACANT
3. CONTINUOUS-CONTINUOUS DATA UNIT DETECTION PROCEDURE
   INPUT: Jc = ( 0:89, 80 ), Dc = 1

---

1. OBTAIN SECONDARY SIDE NODE ycc AND LOCAL INDEX ORIGINATION Icc1' CORRESPONDING TO ORIGINATION ( 0, 80 ) OF Jc
FOR v = 1
1.1  kc1' [1] = $g_v$((0,80)) = 0      # FROM COMMUNICATION INFORMATION TABLE
1.2  ycc[1] = $gtop_B$(0) = 0          # FIRST DIMENSION ON SECONDARY SIDE IS NOT DISTRIBUTION
1.3  icc1' [1] = $gtol_B$(0, 0) = 0    # FIRST DIMENSION ON SECONDARY SIDE IS NOT DISTRIBUTION
FOR v = 2
1.1  kc1' [2] = $g_v$((0,80)) = 60     # FROM COMMUNICATION INFORMATION TABLE
1.2  ycc[2] = $gtop_B$(60) = 0         # SECOND DIMENSION ON SECONDARY SIDE IS NOT DISTRIBUTION
1.3  icc1' [2] = $gtol_B$(60, 0) = 60  # SECOND DIMENSION ON SECONDARY SIDE IS NOT DISTRIBUTION
FOR v = 3
1.1  kc1' [3] = $g_v$((0,80)) = 80     # FROM COMMUNICATION INFOMRATION TABLE
1.2  ycc[3] = $gtop_B$(80) = ceiling(80/30) = 2    # THIRD DIMENSION ON SECONDARY SIDE IS block(w=30) DISTRIBUTION
1.3  icc1' [2] = $gtol_B$(80, 2) = mod(80, 30) = 20   # THIRD DIMENSION ON SECONDARY SIDE IS block(w=30) DISTRIBUTION
THEREBY, SECONDARY SIDE NODE INDEX ycc = (0, 0, 2) AND SECONDARY SIDE LOCAL INDEX ORIGINAITON Icc1' = (0, 60, 20) HAVE BEEN OBTAINED 2.
2.1  Dcc = 0, Vcc = 0, Lcc = 4
2.2  jcc1[1] = jc1[1] = 0, jcc1[2] = jc1[2] = 80

3.  FOR v = 1
3.3  TYPE OF FIRST DIMENSION ON SECONDARY SIDE IS "INTERVAL"
3.3.1  d = VtoD[1] = 1
3.3.2  CONTINUE BECAUSE d == Dcc+1 IS SATISFIED
3.3.3  kc1' [1] = k1' [1] + jc1[1] = 0 + 0 = 0
       kc2' [1] = k1' [1] + jc2[1] = 0 + 89 = 89
       (icc1' [1], icc2' [1]) = $gtol2_B$(kc1' [1], kc2' [1], ycc[1]) = $gtol2_B$(0, 89, 0) = (0, 89)  #NOT DISTRIBUTION
3.3.5  (kcc1' [1], kcc2' [1]) = $gtog2_B$(kc1' [1], kc2' [1], ycc[1]) = $gtol2_B$(0, 89, 0) = (0, 89)  #NOT DISTRIBUTION
       jcc1[1] = kcc1' [1] - k1' [1] = 0 - 0 = 0
       jcc2[1] = kcc2' [1] - k1' [1] = 89 - 0 = 89
3.3.6  CONTINUE BECAUSE jcc3[1] IS 1 SIMIALRLY TO jc3[1]
3.3.7  BY THE ABOVE, IT HAS BEEN FOUND THAT FIRST DIMENSIN ON SECONDARY SIDE IS CONTINOSU TO THIS COMMUNICATION
       Vcc = v = 1, Dcc = d = 1, extent = icc2' [1] - icc1' [1] + 1 = 89 - 0 + 1 = 90
       Lcc = Lcc * extent = 4 * 90 = 360
3.3.8  CONTINUE BECAUSE jcc2[1] = 89, jc2[1] = 89 IS SATISFIED
3.3.9  INTERRUPT REPEATIGN OF v BECAUSE extent = 90, BECASEU ALLOCATION SIZE = 100
AS A RESULT, IT HAS BEEN FOUND THAT CONTINOUS COMMUNICATION IS POSSIBLE ONLY IN FIRST DIMENSION ON SECONDARY SIDE AND THE NUMBER OF CONTINOUS ELEMENTS IN FIRST DIMENSION ON SECONDARY SIDE IS 90

4.  EXTRACT CONTINUOUS-CONTINUOUS DATA UNIT FROM CONTINOUS DATA UNIT AND RECORD REMANING IN Jct_list
4.1  BECAUSE jcc2[1] + jcc3[1] = 90 > jc2[1] = 89 IS SATISFIED, Jcr_list IS VACANT
4.2  DO NOTHING. IF jc1 = 0:99 HAD BEEN SATISFIED, Jcr = ( 90:99, 80 ) WOULD HAVE BEEN ADDED TO Jcr-list
4.3  DO NOTHING BECAUSE Dcc = Dc = 1 IS SATISFIED. IF Dc=2, Jc = ( 0:99, 80:99 ) HAD BEEN SATISFIED, Jcr = ( 0:89, 81:99 ) WOULD HAVE BEEN ADDED TO Jcr-list
5.  RETURN Jcc = ( 0:89, 80 ), Lcc = 360, Dcc = 1, ycc = (0, 0, 2), Icc1' = (0, 60, 20), Jcr_list = ( )

F I G. 7 7

4. CONTINUOUS-CONTINUOUS DATA UNIT PUT PROCEDURE
   INPUT: $Jcc = (0:89, 80)$, $Dcc = 1$, $ycc = (0, 0, 2)$, $icc1'$
   $= (0, 60, 20)$, $Lcc = 360$ 1.
   1.1 BECAUSE $DtoU[Dcc] = DtoU[1] = 1$ IS SATISFIED, LOOP OF $u = 1$
       to 1
       $d = UtoD[1] = 1$
       $icc1[1] = i1[1] + jcc1[1] * i3[1] = 10 + 0 * 1 = 10$
       $icc2[1] = i1[1] + jcc2[1] * i3[1] = 10 + 89 * 1 = 99$
       $icc3[1] = i3[1] = 1$
   1.2 LOOP OF $u = 2$ to 2
       BECAUSE $n2=20$, $w=100$ ARE SATISFIED
       $icc1[2] = gtol_A(f_2(jcc1)) = mod(jcc1[2] + n2, w) =$
       $mod(80 + 20, 100) = 0$
   2. BECAUSE $icc1 = (10, 0)$, $Lcc = 360$, $ycc = (0, 0, 0)$, $icc1'$
      $= (0, 60, 0)$
      PUT DATA OF 360 BYTES FROM $a(10, 0)$ TO $b(0, 60, 20)$ OF NODE
      $(0, 0, 2)$
   3. TERMINATE 5. ADD Jcr-list TOP OF Jc-list
   BECAUSE Jc-list IS VACANT, Jc-list REMAINS VACANT
6. RETURN TO 1.
1. TERMINATE BECAUSE Jc-list VACANT

FIG. 78

3. CONTINUOUS-CONTINUOUS DATA UNIT DETECTION PROCEDURE
INPUT: Jc = ( 0:89, 81 ), Dc = 1

1. OBTAIN SECONDARY SIDE NODE ycc AND LOCAL INDEX ORIGINATION lcc1' CORRESPONDING TO ORIGINATION
( 0, 81 ) OF Jc
FOR v = 3
1.1  kc1' [3] = $g_v$((0, 81)) = 81        # FROM COMMUNICATION INFORMATION TABLE
1.2  ycc[3] = $gtop_B$(81) = ceiling(81/30) = 2        # THIRD DIMENSION ON SECONDARY SIDE IS block(w=30) DISTRIBUTION
1.3  icc1' [2] = $gtol_B$(80, 2) = mod(81, 30) = 21    # THIRD DIMENSION ON SECONDARY SIDE IS block(w=30) DISTRIBUTION
THEREBY, SECONDARY SIDE NODE INDEX ycc = ( 0, 0, 2 ) AND SECONDARY SIDE LOCAL INDEX ORIGINATION lcc1'
= ( 0, 60, 21 ) WERE OBTAINED 2.2  jcc1[1] = jc1[1] = 0,  jcc1[2] = jc1[2] = 81

5. RETURN Jcc = ( 0:89, 81 ), Lcc = 360, Dcc = 1, ycc = ( 0, 0, 2 ), lcc1' = ( 0, 60, 21 ),
Jcr_list = ( )

4. CONTINUOUS-CONTINUOUS DATA UNIT PUT PROCEDURE
INPUT: Jcc = ( 0:89, 81 ), Dcc = 1, ycc = ( 0, 0, 2 ), lcc1' = ( 0, 60, 21 ), Lcc = 360

1.2  icc1[2] = $gtol_A$($f_2$( jcc1 )) = mod(jcc1[2] + n2, w) = mod(81 + 20, 100) = 1
2. BECAUSE icc1 = (10, 1), Lcc = 360, ycc = (0, 0, 0), icc1' = (0, 60, 1)
PUT DATA OF 360 BYTES FROM a(10, 1) TO b(0, 60, 21) OF NODE (0, 0, 2)

F I G. 79

3. CONTINUOUS-CONTINUOUS DATA UNIT DETECTION PROCEDURE
   INPUT: Jc = ( 0:89, 90 ), Dc = 1

1. OBTAIN SECONDARY SIDE NODE ycc AND LOCAL INDEX ORIGINATION Icc1' CORRESPONDING TO ORIGINATION
      ( 0, 90 ) OF Jc
      FOR v = 3
      1.1 kc1' [3] = $g_v$((0,90)) = 90          # FROM COMMUNICATION INFORMATION TABLE
      1.2 ycc[3] = $gtop_B$(90) = ceiling(90/30) = 3    # THIRD DIMENSION ON SECONDARY SIDE IS block(w=30)
      DISTRIBUTION
      1.3 icc1' [2] = $gtol_B$(90, 3) = mod(90, 30) = 0  # THIRD DIMENSION ON SECONDARY SIDE IS block(w=30)
      DISTRIBUTION
      THEREBY, SECONDARY SIDE NODE INDEX ycc = ( 0, 0, 3 ) AND SECONDARY SIDE LOCAL INDEX ORIGINATION Icc1'
      = (0, 60, 0) WERE OBTAINED
   2.1 jcc1[1] = jc1[1] = 0, jcc1[2] = jc1[2] = 90
   2.2 jcc1[1] = jc1[1] = 0, jcc1[2] = jc1[2] = 90
   5. RETURN Jcc = ( 0:89, 90 ), Dcc = 1, ycc = ( 0, 0, 3 ), icc1' = ( 0, 60, 0 ), Jcr_list
      = ( )

4. CONTINUOUS-CONTINUOUS DATA UNIT PUT PROCEDURE
   INPUT: Jcc = ( 0:89, 90 ), Dcc = 1, ycc = ( 0, 0, 3 ), icc1' = ( 0, 60, 0 ), Lcc = 360
   1.2 icc1[2] = $gtol_A$($f_2$( jcc1 )) = mod(jcc1[2] + n2, w) = mod(90 + 20, 100) = 10
   2. BECAUSE icc1 = (10, 10), Lcc = 360, ycc = (0, 0, 3), icc1' = (0, 60, 0)
      PUT DATA OF 360 BYTES FROM a(10,10) TO b(0,60,0) OF NODE (0,0,3)

F I G. 80

| jx[2] | PRIMARY SIDE LOCAL DATA | SECONDARY SIDE NODE | SECONDARY SIDE LOCAL DATA |
|---|---|---|---|
| 80 | ( 10, 0 ) | ( 0, 0, 2 ) | ( 0, 60, 20 ) |
| 81 | ( 10, 1 ) | ( 0, 0, 2 ) | ( 0, 60, 21 ) |
| ... | ... | ... | ... |
| 89 | ( 10, 9 ) | ( 0, 0, 2 ) | ( 0, 60, 29 ) |
| 90 | ( 10, 10 ) | ( 0, 0, 3 ) | ( 0, 60, 0 ) |
| 91 | ( 10, 11 ) | ( 0, 0, 3 ) | ( 0, 60, 1 ) |
| ... | ... | ... | ... |
| 119 | ( 10, 39 ) | ( 0, 0, 3 ) | ( 0, 60, 29 ) |

F I G. 8 1

INFORMATION PROCESSING APPARATUS, COMMUNICATION METHOD AND INFORMATION PROCESSING SYSTEM FOR COMMUNICATION OF GLOBAL DATA SHARED BY INFORMATION PROCESSING APPARATUSES

CROSS-REFERENCE TO RELATED APPLICATION

This application is based upon and claims the benefit of priority of the prior Japanese Patent Application No. 2014-230227, filed on Nov. 12, 2014, the entire contents of which are incorporated herein by reference.

FIELD

The embodiments discussed herein are related to an information processing apparatus, a communication method, a communication program and an information processing system.

BACKGROUND

In parallel programming languages, such as High Performance Fortran (HPF), Unified Parallel C (UPC), etc., having a global view, data is placed in a virtual global space. The programmer describes exchanges of global data without considering node numbers. Also, the RAID (Redundant Arrays of Inexpensive Disks) technique permits users to treat, as one virtual piece of continuous data, pieces of data that has actually been divided and arranged over a plurality of hard disks. In the explanations below, this type of data is referred to as global data, and data that is obtained by naming a virtual multidimensional rectangle that is global data is referred to as a global array. Mapping of global data onto a node is conducted by middleware such as compilers.

Communications in a programming language of a global view includes reference to (reading) and definition of (writing) global data. Specifically, they are reference to a global array in a formula, substitution into a global array, an input/output statement related to global data, invocation of a procedure by using global data as an argument, invocation of a syntax that explicitly specifies communications, invocation of a communication library, etc. A case where files that have been distributedly arranged over nodes are to be treated as one piece of data can also be considered as reference to or definition of global data. In some cases, communications in a programming language of a global view can be expressed in a form of substitution between pieces of global data, expressed by the following FORALL syntax of Fortran.

$$\text{forall}(j[1]=0:N[1]-1, \ldots j[D]=0:N[D]-1)$$

$$B(k'[1], \ldots, k'[V])=A(k[1], \ldots, k[U])$$

In the above syntax, A and B are global arrays that respectively have arbitrary numbers of dimensions U and V and that were distributed on arbitrary dimensions. The right side, $A(k[1], \ldots, k[U])$, is data that is referred to and transmitted, while the left side, $B(k'[1], \ldots, k'[V])$, is data received and updated. The index $j=(j[1], \ldots, j[D])$ of the FORALL syntax is referred to as index of communication data. The subscript expressions $k[u]$ and $k'[v]$ ($u=1, \ldots, U$; $v=1, \ldots, V$) are functions of j that can be described as $k[u]=fu(j)$, $k'[v]=gv(j)$. Actually, they are often $fu(j)=k1+k3*j$, which is an affine function of a single index that can be expressed also by a combination of the three subscripts $k1:k2:k3$ of Fortran or scalar. The D-dimensional space $[N[1], \ldots, N[D]]$ based on j is referred to as a communication data array. However, because the order of the appearing of the indexes $j[1], \ldots, j[D]$ in the FORALL syntax does not have a meaning, the order of the dimensions of the communication data array can be selected arbitrarily in such a manner that the communication is conducted at a higher speed.

Speeds of communications between nodes increase with increasing throughput (bytes/second) of the network and with decreasing latency (in units of seconds). Latency in this example is a period of time of software and hardware required for the activation and completion of communications, and is a value that basically has no relation to the amount of the data. When the amount of data communicated in one packet is n (bytes), a period of time required for one time of communication can be expressed by the equation below.

$$T(n)=\text{Latency}+n/\text{Throughput[second]} \quad \text{(equation 1)}$$

As expressed by equation (1), it is possible to make influence of latency occupying the communication time relatively smaller by increasing the amount of data n that is communicated at one time.

Techniques described in the documents below are known.
Japanese Laid-open Patent Publication No. 9-34855
Japanese Laid-open Patent Publication No. 2005-285042

SUMMARY

According to an aspect of the embodiment, an information processing apparatus, among a plurality of information processing apparatuses, to which one of pieces of local data is assigned, the pieces of local data having been obtained by dividing global data shared by the plurality of information processing apparatuses, the information processing apparatus includes: a storage unit that includes a first storage area sectioned into prescribed units, and stores local data that is assigned to the information processing apparatus in the first storage area; and a processor that executes a process including: obtaining a writing instruction of target local data, which is a writing target on a different information processing apparatus from the information processing apparatus; detecting a plurality of continuous sections to which the target local data is to be written in a second storage area that is sectioned into the prescribed units in a different storage unit included in the different information processing apparatus, on the basis of storage area information that identifies data to which the target local data corresponds in the global data; and extracting as many pieces of local data stored in the first storage area as specified by the number of the continuous sections and transmitting the extracted pieces of local data to the different information processing apparatus.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 explains mapping of global data onto the respective nodes;

FIG. 4 illustrates examples of functions for respective types of distribution;

FIG. 5 illustrates an example of a function gtol2;

FIG. 6 illustrates an example of a function ltog2;

FIG. 7 illustrates an example of a function gtog2;

FIG. 8A illustrates an example of a function gtol3 (first);

FIG. 8B illustrates an example of the function gtol3 (second);

FIG. 9 illustrates an example of a function of ltog3;

FIG. 10A illustrates an example of a function gtog3 (first);

FIG. 10B illustrates an example of the function gtog3 (second);

FIG. 13 illustrates an example of relationships between substitution over virtual global arrays and a many-to-many communication over nodes;

FIG. 14 illustrates an example of Put procedure 1 in a comparison example;

FIG. 15 illustrates an example of Get procedure 1 in the comparison example;

FIG. 23 illustrates an example of operations of the information processing apparatus according to the reception process of the embodiment;

FIG. 26 illustrates a detailed example of a continuous-data Put process;

FIG. 27 illustrates an example of a configuration of a communication information table (first);

FIG. 28 illustrates an example of a configuration of the communication information table (second);

FIG. 29 illustrates an example of a configuration of the communication information table (third);

FIG. 30 illustrates an example of a configuration of the communication information table (fourth);

FIG. 31 illustrates an example of an algorithm for analyzing a state-1 program (first);

FIG. 32 illustrates an example of an algorithm for analyzing the state-1 program (second);

FIG. 33 illustrates an example of an algorithm for analyzing the state-1 program (third);

FIG. 34 illustrates an example of an algorithm of a continuous data unit detection procedure;

FIG. 35 illustrates an example of an algorithm of a continuous data unit Put procedure;

FIG. 37 illustrates an example of an algorithm of a continuous-continuous data unit detection procedure (first);

FIG. 38 illustrates an example of an algorithm of the continuous-continuous data unit detection procedure (second);

FIG. 40 illustrates an example of a continuous-continuous data unit Put procedure algorithm;

FIG. 42 illustrates an example of a rectangular data Put process;

FIG. 43 illustrates an example of an algorithm of a rectangular data unit detection procedure;

FIG. 44 illustrates an example of an algorithm of a rectangular data unit Put procedure;

FIG. 46 illustrates an example of an algorithm of a rectangular-continuous data unit detection procedure (first);

FIG. 47 illustrates an example of an algorithm of the rectangular-continuous data unit detection procedure (second);

FIG. 48 illustrates an example of a flowchart explaining the process of a rectangular-continuous data unit Put procedure;

FIG. 49 illustrates an example of an algorithm of a rectangular data unit pack procedure;

FIG. 51 illustrates a detailed example of a continuous data Get procedure;

FIG. 52 illustrates an example of an algorithm of a continuous data unit Get procedure;

FIG. 54 illustrates an example of an algorithm of a continuous-continuous data unit Get procedure;

FIG. 56 illustrates a detailed example of a rectangular data Get process;

FIG. 57 illustrates an example of an algorithm of a rectangular data unit Get procedure;

FIG. 58 illustrates an example of a flowchart that explains the process of the rectangular data unit Get procedure;

FIG. 60 illustrates an example of an algorithm of a rectangular data unit unpack procedure;

FIG. 61 illustrates a flowchart explaining the process of a buffered two-sided communication according to the embodiment;

FIG. 62 illustrates a detailed example of a transmission process;

FIG. 63 illustrates a detailed example of a reception process;

FIG. 64 illustrates an example of an algorithm of a rectangularity-priority pivoting procedure;

FIG. 65 illustrates an example of an algorithm of a common rectangular data unit detection procedure;

FIG. 67 illustrates an example of an algorithm of a transmission buffer preparation procedure;

FIG. 68 illustrates an example of an algorithm of a common rectangular data unit pack procedure;

FIG. 69 illustrates an example of an algorithm of a common rectangular data unit send procedure;

FIG. 71 illustrates an example of an algorithm of a common rectangular data unit recv procedure;

FIG. 72 illustrates an example of an algorithm of a common rectangular data unit unpack procedure;

FIG. 73 illustrates an example of a communication that is expressed by a gmove syntax of a XcalableMP program;

FIG. 76 illustrates the execution of the continuous data unit detection procedure;

FIG. 77 illustrates an example of the processes of the continuous data unit Put procedure that is called in the first repeating in loop 1 (first);

FIG. 78 illustrates an example of the processes of the continuous data unit Put procedure that is called in the first repeating in loop 1 (second);

FIG. 79 illustrates an example of the process of a continuous data unit Put procedure that is called in the second repeating loop 1;

FIG. 80 illustrates an example of the process of a continuous data unit Put procedure that is called in the eleventh repeating loop 1;

FIG. 81 illustrates a result of putting data from the primary side node (0, 1) to the secondary side node (0,0,2) or (0,0,3)

DESCRIPTION OF EMBODIMENTS

When a communication is generated for each element of array elements (sections), a small amount of data is communicated at one time, which leads to total latency that is very long when all array elements are communicated.

Therefore, as an example of embodiments in the present invention, attaining higher efficiency in communications of global data is explained as follows.

The information processing system according to the embodiment can attain higher efficiency in communications of global data.

The global data is mapped onto a plurality of nodes. FIG. 1 explains mapping of global data onto the respective nodes. In FIG. 1, global arrays A and B described in a program exist in a virtual global name space that does not take nodes into consideration, and data elements thereof are identified by a multidimensional global index. The compiler defines local arrays a and b, which correspond to global arrays A and B, in a plurality of nodes, and determines the mapping (association) of the global index and the local index in each node in accordance with instructions from programmers. This is referred to as distribution of data. Part or all of the distribution destinations of A and B may be the same node and may also be different nodes. At the final stage, the compiler allocates memories that correspond to variables a and b. At that moment, the mapping of the local index and the address depends upon the implementation of the compiler. The base addresses of the same variable may be different from each other between nodes. However, when local indexes on the first dimension are continuous, the addresses corresponding to the continuous local indexes are also continuous in the embodiment.

Note that "address" in the embodiment is an address viewed from a communication mechanism, and in some cases may be different from the virtual memory address or the physical memory address that are viewed from the Central Processing Unit (CPU) of a node. In some systems, the same data may have addresses that differ between when the data is observed from one node and when it is observed from another.

Figure 2:
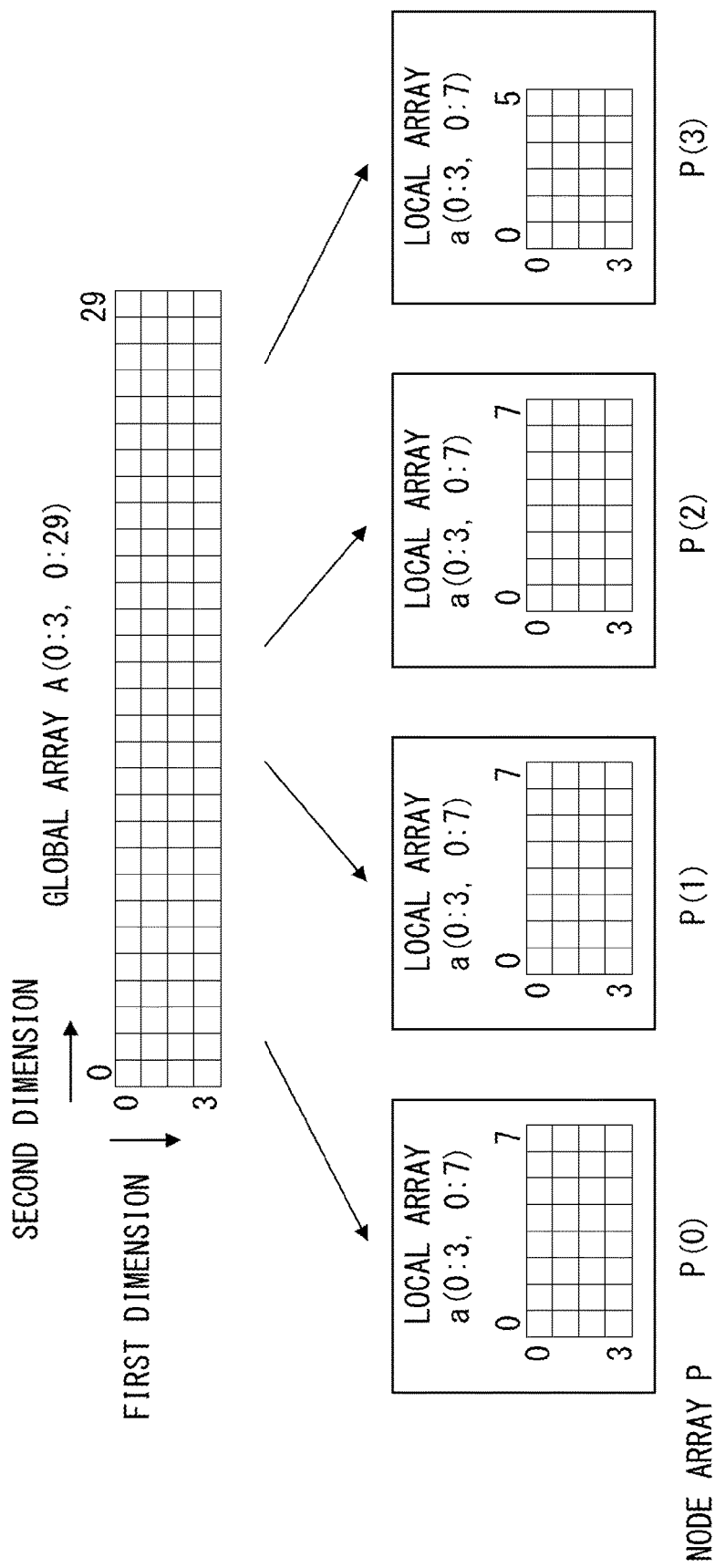
FIG. 2 illustrates an example in which two-dimensional global array A is distributedly arranged in one-dimensional node array P having the size of four.

Detailed explanations will be given for distribution of data. The entity of an M-dimensional global array is allocated to one or more nodes after being divided into M-dimensional local arrays. A node that is an allocation destination forms a virtual array (referred to as a node array hereinafter). FIG. 2 illustrates an example in which two-dimensional global array A is distributedly arranged in one-dimensional node array P having the size of four. In FIG. 2, the second dimension of global array A is divided into four blocks and the blocks are arranged to the respective nodes that are expressed by the respective elements of node array P. Because the first dimension of global array A is not distributed, the first dimension of local array a of each node has the same length as that of the global array. Because the second dimension of global array A has been divided into four blocks, the lengths of the second dimension of the local array a of each node are eight and six. As described above, the lengths of each dimension depend upon dividing methods.

In FIG. 2, the second dimension has been divided into four blocks. There are various types of distribution, and explanations will be given for such types of distribution. FIGS. 3A-3E illustrate examples of types of one-dimensional distribution. As illustrated in FIGS. 3A-3E, there are block distribution, cyclic distribution, block-cyclic distribution, uneven block distribution and irregular distribution as types of one-dimensional distribution.

Figure 3A:
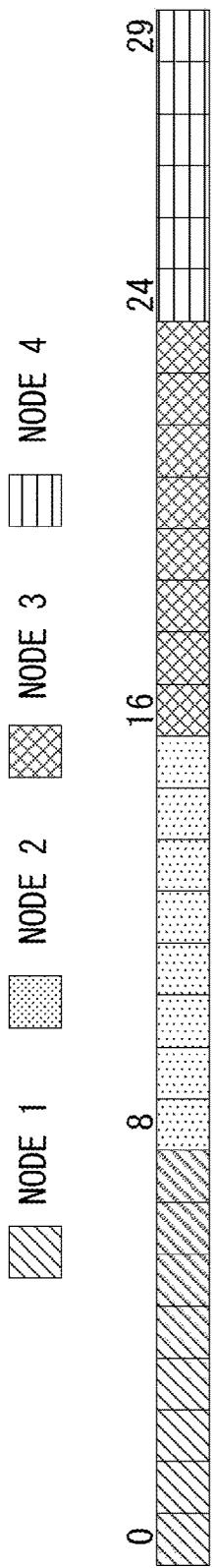
FIGS. 3A-3E illustrate examples of types of one-dimensional distribution.

FIG. 3A illustrates an example of block distribution. In block distribution, a plurality of elements having continuous indexes are treated as one block and blocks are allocated to respective nodes. The number of blocks is equal to the length of the node array. The length (the number of elements) of each block is equal to a value obtained by dividing the length of the division-target dimension in the global array by the length of the node array. Accordingly, blocks of the same length are allocated to respective nodes. However, when the length of the dimension to be divided is not evenly divisible by the number of blocks, the length of for example the last block is smaller than the length of each of the other blocks.

Figure 3B:
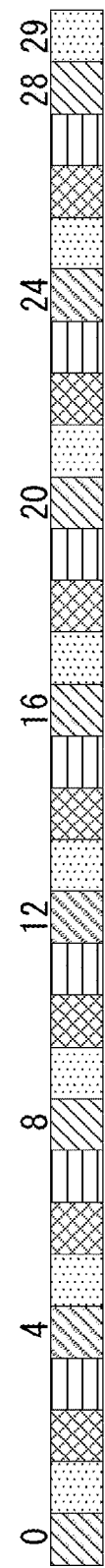

FIG. 3B illustrates an example of cyclic division. In cyclic division, respective elements of a dimension to be divided are allocated to respective nodes in a node array in for example ascending order of index. When elements of the global array have been allocated to the last node of a node array, the element next to the element allocated to the last node is allocated to the first node of the node array.

Figure 3C:
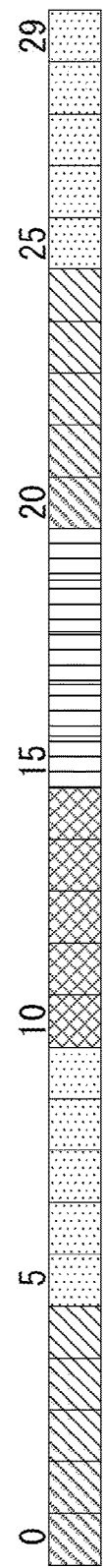

FIG. 3C illustrates block-cyclic division. In block-cyclic division, allocation to nodes in a node array is conducted cyclically for each block including elements of a plurality of global arrays.

Figure 3D:
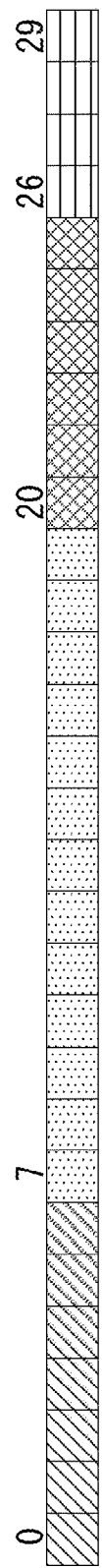

FIG. 3D illustrates an example of uneven block division. In uneven block division, blocks of different lengths are allocated to respective nodes.

Figure 3E:
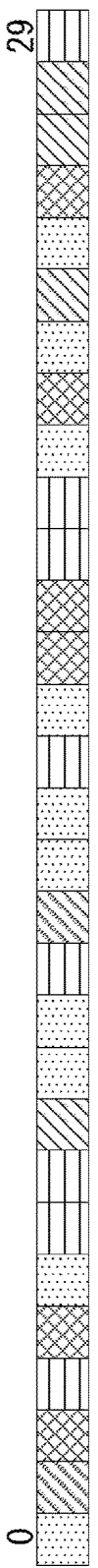

FIG. 3E illustrates an example of irregular division. In irregular division, division is conducted irregularly.

In the explanations below, subscripts of global arrays are referred to as global indexes and subscripts of local arrays are referred to as local indexes. Also, subscripts of node arrays are referred to as node indexes.

In a programming language such as PF, association between global indexes and node indexes is defined for each type of distribution. FIG. 4 illustrates examples of functions for respective types of distribution. In FIG. 4, the column for "gtop(k)" illustrates an example of a function that represents the association between global indexes and node indexes.

In FIG. 4, P represents the size of a dimension on which attention is focused in a node array. N represents the size of a dimension on which attention is focused in a global array. In this example, a dimension on which attention is focused is a dimension that is a target of distribution. A distribution target dimension is a second dimension when distribution is conducted as illustrated in for example FIG. 2.

In block distribution, w represents the block width (the length of a block). w may be specified by the user or may be set as w=ceil(N/P). In the case of for example FIG. 2, w=ceil(N/P)=ceil(30/4)=8 is satisfied. In such a case, the node index of block distribution is floor (k/w) and accordingly, floor (20/8)=2 is satisfied regarding the element of for example k=20, and calculations indicate that the element is arranged to node (P(2)), whose node index is two.

In uneven block distribution, W(p) (0≤p<P) represents a block width in node p and is specified by the user. B(p) (0≤p≤P) represents the lower limit value of the global indexes in node p and is expressed as follows.

$$B(p)=\text{sum}\{W(q)|0\leq q<p\} \text{ for } p<P$$

$$B(p)=N \text{ for } p=P$$

In irregular distribution, M is referred to as a mapping array and is specified by the user. M(k) represents a node that corresponds to k. GTOL(k) (0≤k<N) and LTOG(i,p) (0≤p<P) are tables and are derived from M.

The embodiment is based on the normalization, and accordingly zero is the lower limit of the declaration of the shape of all variable arrays, template arrays and node arrays is zero. Note that the normalization is not essential but is for the purpose of simplifying a conversion equation treated in processes after the normalization. When normalization is not conducted, more parameters are used in the formulas appearing in FIG. 4, making such formulas more complex.

Examples of mapping (association) of global indexes and local indexes are illustrated in the columns for "gtol(k, p)" and "ltog(i, p)". The mapping illustrated in FIG. 4 is an example, and mapping (association) of global indexes and local indexes depends upon the implementation.

By using FIG. 4, in distribution of for example data illustrated in FIG. 2, it is possible to refer to an element A(ix, iy) of global array A by referring to a local array element a (ix, gtol(iy, P(gtop(iy))) existing in a node P(gtop(iy)). A local array element a(ii, jj) placed in a node P(kk) is the entity of a global array element A(ii, ltog(jj, kk)).

By conducting the above conversions, compilers and runtime libraries prevent the user from being conscious of local arrays, thereby realizing programming based on global arrays. Local indexes are converted into memory addresses by compiler and runtime libraries, and node indexes are converted into IP addresses etc. for identifying nodes.

Explanations will be given for an example of a definition of interconversion between an interval of global index and an interval of local index.

FIG. 5 illustrates an example of a function gtol2, which conducts conversion from an interval of a global index into an interval of a local index, i.e., from k1:k2 into i1:i2. In other words, gtol2 can be expressed by "(i1,i2)=gtol2(k1, k2,p)". By executing gtol2 illustrated in FIG. 5, it is possible to obtain continuous intervals of local indexes, k1:k2=k1, k1+1, k1+2, . . . , k2 in a processor p among local indexes that correspond to continuous intervals of global indexes k1:k2=k1, k1+1, k1+2, . . . , k2. When i1>i2, there is not an element. In gtol2 illustrated in FIG. 5, when global indexes are continuous intervals, the local indexes of respective nodes are also continuous intervals. In this mapping, as illustrated in FIG. 5, it is guaranteed that when global indexes are continuous intervals, the corresponding local indexes are also continuous intervals having the length of zero or longer. Note that in other mapping, this is not always guaranteed.

FIG. 6 illustrates an example of a function ltog2, which conducts conversion from an interval of a local index into an interval of a global index, i.e., from i1:i2 into k1:k2. In other words, ltog2 can be expressed by "(k1,k2,k3)=ltog2(i1,i2, p)". By executing ltog2 illustrated in FIG. 6, it is possible to obtain a combination of three global indexes k1:k2:k3, which correspond to continuous intervals of local indexes i1:i2 of processor p. When local indexes are continuous intervals, global indexes are continuous in block distribution, uneven distribution and a process that is not distribution, and global indexes becomes a combination of the three in cyclic distribution. In block-cyclic distribution and irregular distribution, it is not guaranteed that global indexes become the combination of the three.

FIG. 7 illustrates an example of a function gtog2, which is a function for obtaining a combination of three global indexes kx1:kx2:kx3 that are distributed by processor p, the three global indexes corresponding to continuous intervals k1:k2 of global indexes. In other words, gtog2 can be expressed by "(kx1,kx2,kx3)=gtog2(k1,k2,p)". In gtog2 illustrated in FIG. 7, when the global indexes of input are continuous intervals, the global indexes are continuous intervals in block distribution, uneven distribution and a process that is not distribution, and the global indexes becomes the combination of the three in cyclic distribution. It is not guaranteed that the global indexes becomes the combination of the three in a block-cyclic distribution or in irregular distribution.

FIG. 8A and FIG. 8B illustrate an example of a function gtol3, which is a function for obtaining i1, i2 and i3 of the combination of the three local indexes i1:i2:i3 in processor p, the local indexes corresponding to the combination of the three global indexes k1:k2:k3. In other words, gtol3 can be expressed by "(i1,i2,i3)=gtol3(k1,k2,k3,p)". In gtol3 illustrated in FIG. 8, when the global indexes are the combination of the three, the local indexes of each node are also the combinations of the three except for the cases of block-cyclic distribution and irregular distribution.

FIG. 9 illustrates an example of a function ltog3, which is a function for obtaining k1, k2 and k3 of the combination of global indexes k1:k2:k3 that correspond to the combination of the three local indexes i1:i2:i3 of processor p. In other words, ltog3 can be expressed by "(k1,k2,k3)=ltog3(i1,i2,i3,p)". In ltog3 illustrated in FIG. 9, when the local indexes are the combination of the three, the global indexes are also the combination of the three except for the cases of block-cyclic distribution and irregular distribution.

FIG. 10 illustrates an example of a function gtog3, which is a function for obtaining the combination of three global indexes kx1:kx2:kx3 distributed by processor p, the local indexes corresponding to the combination of the three global indexes k1:k2:k3. In other words, gtog3 can be expressed by "(kx1,kx2, kx3)=gtog3(k1,k2,k3,p)". In gtol3 illustrated in FIG. 10, when the global indexes of input are continuous intervals, the global indexes are continuous intervals in block distribution, uneven distribution and a process that is not distribution, and the global indexes becomes the combination of the three in cyclic distribution. It is not guaranteed that the global indexes becomes the combination of the three in a block-cyclic distribution or in irregular distribution.

Figure 11:
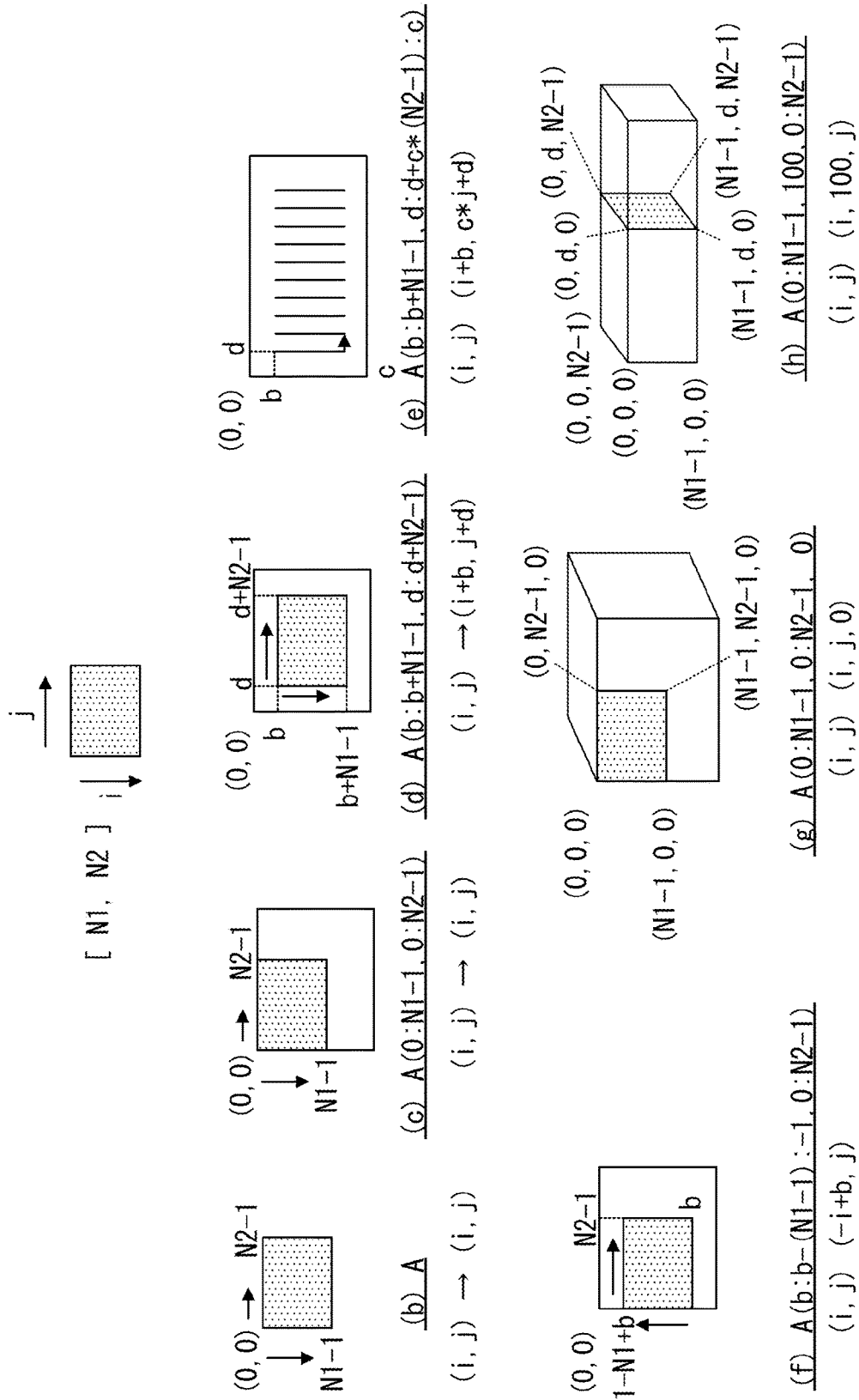
FIG. 11 illustrates an example of global indexes that correspond to two-dimensional communication data [N1, N2]

FIG. 11 illustrates an example of global indexes that correspond to two-dimensional communication data [N1, N2]. In FIG. 11, (b) illustrates a case where it is a global array of the shape [N1, N2] and the entire array is the target of a communication. In FIG. 11, (c) illustrates a global array having a size greater than that illustrated in (b), and a partial array of (c) is the target of a communication. In FIG. 11, (d) is an example in which the origin of the communication target data has been shifted in a global array. In FIG. 11, (e) illustrates an example in which the origin of the communication target data has been shifted in a global array and the communication target data has strides at constant intervals c in the direction of the second dimension of the global array. In FIG. 11, (f) illustrates an example in which the communication target data has negative strides in a global array. In FIG. 11, (g) and (h) illustrate examples in which cross sections of parent variables are treated as communication data in global arrays.

In FIG. 11, each of (b) through (h) illustrates mapping from index j onto a global index for communication data. Note, as illustrated in for example (e) in FIG. 11, that the combination of the three subscripts k1:k2:k3 indicates that there exists mapping "j→k3*j+k1:", which is from index j to a global index of communication data.

In a communication of global data conducted between nodes, the execution statuses of nodes can be categorized into three statuses as follows. A transmission node and a reception node respectively represent a node as a distribution destination for data to be transmitted and a node as a distribution destination for data to be received. Status 1: a status in which all transmission nodes are operating Status 2: a status in which all reception nodes are operating Status 3: a status in which all transmission nodes and reception nodes are conducting collective execution Status 1 contains status 3 and status 2 also contains status 3. Status 3 is an execution form known as Single Program/Multiple Data (SPMD), and is a status in which two-sided communications and collective communications of a Message Passing Interface (MPI) library can be used. Status 3 emerges the most often in the execution of a global view language. Whereas, status 1 and status 2 are communications between a self node and a different node (or a plurality of different nodes). When a communication emerges in status 1, a transmission node in some cases writes data to a memory of a node that is not executing the same program simultaneously or to a disk of a node that does not have a processor. A case when a communication in status 2 emerges is a case when a reception node reads data from a memory or a disk of a node that is not executing the same program simultaneously. In a parallel language of a global view, substitution between global arrays is realized for these three statuses.

In an actual system, it is not possible to communicate all types of data as one piece at one time. Pieces of data having continuous addresses may, in some cases, be communicated in one packet and at one time. However, pieces of discontinuous data are often divided into smaller packets on one of the layers of the runtime library of a compiler, the communication library such as an MPI and hardware related to communications, and are communicated.

When discontinuous pieces of data are to be transmitted, a transmission node, in some cases, once copies the data onto a buffer area so that the pieces of communication data become continuous (pack), and thereafter transmits the data to the external environment from the buffer area. Similarly, when pieces of discontinuous data are to be received, a reception node, in some cases, receives the communication data from the external environment as continuous pieces of data by using a buffer area, and thereafter copies the discontinuous pieces of data from the buffer area (unpack).

Figure 12A:
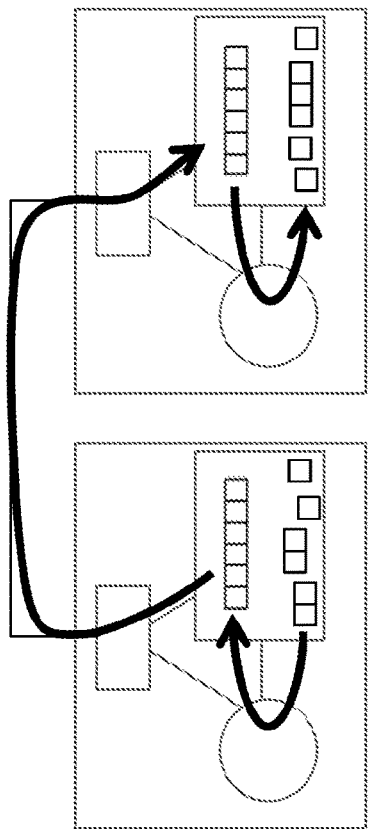
FIGS. 12A-12D illustrate a transmission and reception methods of data.
Figure 12B:
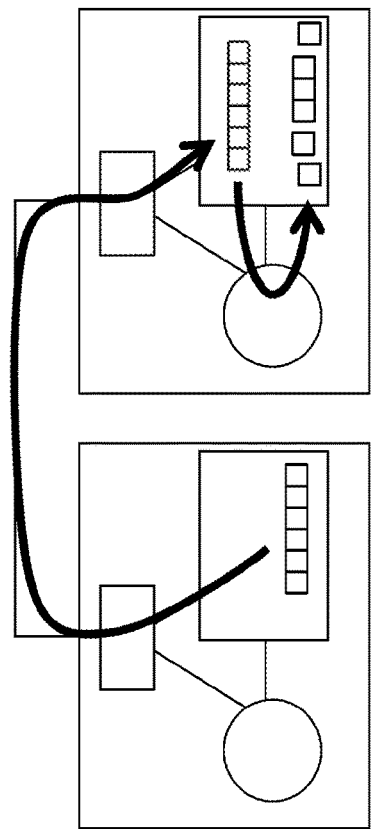
Figure 12C:
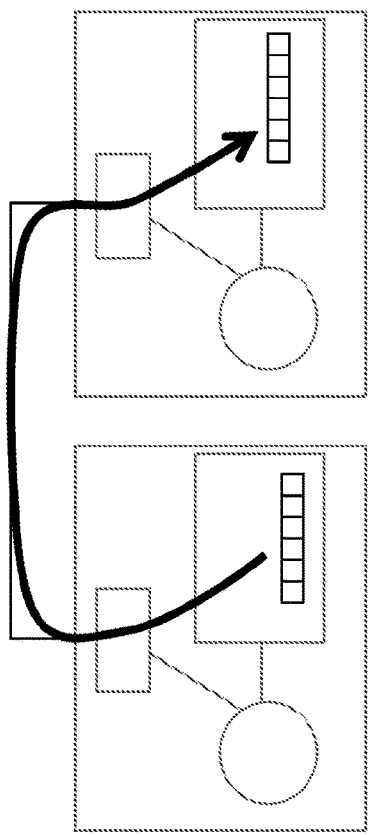
Figure 12D:
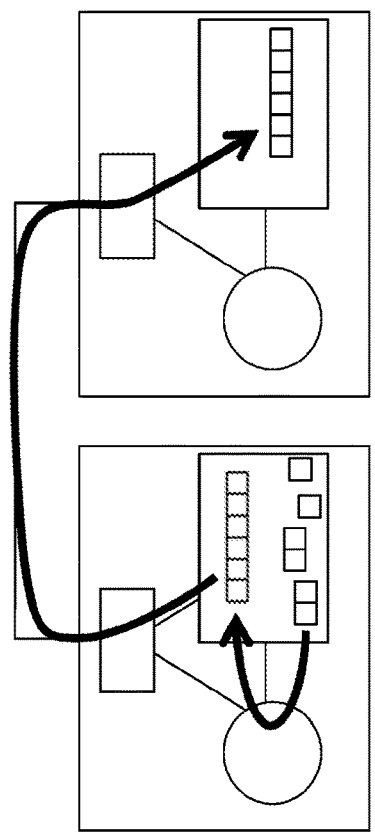

FIGS. 12A-12D illustrate a transmission and reception methods of data. FIG. 12A illustrates the transmission and reception of continuous data. FIG. 12B illustrates the transmission and reception of discontinuous data. FIG. 12C illustrates the transmission and reception in a case where the communication data is discontinuous in the transmission node while the communication data is continuous in the reception node. FIG. 12D illustrates the transmission and reception in a case where the communication data is continuous in the transmission node while the communication data is discontinuous in the reception node.

When it is recognized in advance that the data are continuous both on the transmission side and the reception side, it is possible to conduct a communication without copying data onto a work area such as a buffer as illustrated in FIG. 12A. This communication will be referred to as a non-buffered communication in the explanations below. When the data either on the transmission side or the reception side is discontinuous data, communications that uses a buffer area are conducted as illustrated in FIG. 12(B) through FIG. 12(D). These communications will be referred to as a buffered communication in the explanations below.

Non-buffered communications yield high communication efficiency because Latency is small in equation 1. However, it is needed to select a range in which data is continuous both on the transmission side and the reception side, which makes it difficult to increase the amount of data n. In recent parallel computers, in some cases, the amount of data n needs to be at least for example several thousands of bytes in order to make Latency equal to or shorter than the half of the total communication time. By contrast, in buffered communications, the amount of data n that is communicated at one time can be increased by conducting communications via a buffer. However, buffering and unbuffering that correspond to the data distribution in the node itself and the communication destination are complicated, and to conduct them highly efficiently is difficult.

As described above, a pattern of a communication between nodes in a parallel language having a global view can be expressed in a form of an array substitution statement of Fortran. A communication that is generated in response to this is a many-to-many communication between nodes from distributed data to distributed data.

FIG. 13 illustrates an example of relationships between substitution over virtual global arrays and a many-to-many communication over nodes. The compiler converts substitution of an array expressed by a global index into substitution between local indexes of a plurality of nodes, and further converts them into a many-to-many communication between the addresses of a plurality of nodes. In FIG. 13, substitution from global array A into global array B is converted into substitution from local array a into local array b of nodes. Further, data stored in address spaces corresponding to local arrays a of a plurality of nodes is substituted into the address spaces corresponding to local arrays b.

Substitution between global arrays is conducted for the three execution statuses described above. As communications, there is a non-buffered communication that is for avoiding an overhead cost of buffering and a buffered communication that aims at batched communications by using buffers.

In the following explanations, the following letters are used in common. "D" represents the number of dimensions of communication data. N[d] (d=1, . . . , D) represents a communication data array. "A" represents a global array on the transmission side that was distributed on an arbitrary dimension. "U" represents the number of dimensions of "A". k[u] (u=1, . . . , U) is a function of j that can be expressed by $k[u]=f_u(j)$. "B" represents a global array on the reception side that was distributed on an arbitrary dimension. "V" represents the number of dimensions. k'[v] (v=1, . . . , V) represents a function of j that can be expressed by $k'[v]=g_v(j)$.

In the embodiment, it is assumed that node arrays P and Q that correspond to A and B have the same numbers of dimensions as do A and B respectively and also that normalization has been conducted in such a manner that dimensions having the same dimension numbers of A and B are mapped. This normalization is easy because P and Q receive dimensional extension simply. A global index k[u] can be converted into a node index x[u], which is the u-th dimension of P, and into a local index i[u], which is the u-th dimension of local array a respectively by a function $gtop_A$ and a function $gtol_A$ that correspond to parameters of array A. Similarly, a global index k'[v] can be converted into a node index y[v], which is the v-th node index of Q, and into a local index i'[v], which is the v-th local index of local variable b, respectively by a function $gtop_B$ and a function $gtol_B$.

Next, explanations will be given for an example of data communications as an example to be compared with the embodiment. Here, explanations will be given for a data communication in the above three patterns of the execution statuses of a program. Note that in the explanations below, a transmission side node is referred to as a primary side node while a reception side node is referred to as a secondary side node in Put communications. Also, a reception side node is referred to as a primary side node while a transmission side node is referred to as a secondary node in Get communications.

(Non-Buffered Put Communication in Comparison Example)

First, explanations will be given for a non-buffered Put communication in a comparison example. The non-buffered Put communication in a comparison example is a communication in execution status 1, i.e., in a status in which all transmission nodes are conducting communications. A process related to a communication is conducted in the primary side node, which is a distribution destination of array A (transmission side). The secondary side node, which is the distribution destination of array B (reception side), conducts only passive operations. This communication is expressed as below, in a form of substitution between pieces of global data.

forall($j=0:N-1$)

$B(g(j))=A(f(j))$

Explanations will be given for specific operations of the non-buffered Put communication in the comparison example.

First, the primary side node inquires of all secondary side nodes as described below so as to obtain the base addresses of the respective local arrays b.

$y=(y[1], \ldots, y[V]); y[1]=0, \ldots, Y[1]-1; \ldots ;$
$y[V]=0, \ldots, Y[V]-1$ Next, the primary side node conducts the following multiple loop for all indexes of communication data (i.e., j= (j[1], . . . , j[D]); j[1]=0, . . . , N[1]-1; . . . ; j[D]=0, . . . , N[D]-1) (S2).

```
for j[D] = 0 to N[D] - 1
    ...
    for j[1] = 0 to N[1] - 1
        execute (Put procedure 1)
    end for
    ...
end for
```

In this multiple loop, the primary side node executes Put procedure 1.

FIG. 14 illustrates an example of Put procedure 1 in the comparison example. In FIG. 14, the primary side node first obtains a primary side global index k on the basis of j (S2-1). Specifically, the primary side node executes the following procedure.

```
for u = 1 to U
    k[u] = f_u( j )
end for
```

Next, the primary side node obtains a node index x and a local index i on the primary side on the basis of k (S2-2). Specifically, the primary side node executes the following procedure.

```
for u = 1 to U
    x[u] = gtop_A(k[u])
    i[u] = gtol_A(k[u])
end for
```

Next, the primary side node confirms whether or not x is the node itself (S2-3). When x is not the index of the node itself, the primary side node executes the process for next j in the loop without executing S2-4 through S2-7.

When x is the node itself, the primary side node obtains a global index k' on the secondary side on the basis of j (S2-4). Specifically, the primary side node executes the following procedure.

```
for v = 1 to V
    k'[v] = g_v( j )
end for
```

Next, the primary side node obtains a node index y and a local index i' on the secondary side on the basis of k' (S2-5). Specifically, the primary side node executes the following procedure.

```
for v = 1 to V
    y[v] = gtop_B(k'[v])
    i'[v] = gtol_B(k'[v])
end for
```

Next, the primary side node calculates the address of the secondary side on the basis of the base address i' of b in y (S2-6).

Next, the primary side node puts one element of a(i) of the node itself to the secondary side address of node y (S2-7). Then, the primary side node executes the process for next j.

(Non-Buffered Get Communication in Comparison Example)

Next, explanations will be given for an example of a non-buffered Get communication in the comparison example. A non-buffered Get communication in the comparison example is a communication in execution status 2, i.e., a status in which all reception nodes are conducting communications. A process related to a communication is conducted in the primary side node, which is a distribution destination of array A (reception side). The secondary side node, which is the distribution destination of array B (transmission side), conducts only passive operations. This communication is expressed as below, in a form of substitution between pieces of global data.

forall($j$=0:$N$−1)

$A(f(j))=B(g(j))$

Explanations will be given for specific operations of a non-buffered Get communication in the comparison example.

First, the primary side node inquires of all secondary side nodes below so as to receive the base addresses of the respective local arrays b.

$y=(y[1], \ldots, y[V]); y[1]=0, \ldots, Y[1]-1; \ldots ;$
$y[V]=0, \ldots, Y[V]-1$ Next, the primary side node conducts the following multiple loop for all indexes of pieces of communication data (i.e., j=(j[1], . . . , j[D]); j[1]=0, . . . , N[1]−1; . . . ; j[D]=0, . . . , N[D]−1) (S3).

```
for j[D] = 0 to N[D] − 1
    ...
    for j[1] = 0 to N[1] − 1
        execute (Get procedure 1)
    end for
    ...
end for
```

In this multiple loop, the primary side node executes Get procedure 1.

FIG. 15 illustrates an example of Get procedure 1 in the comparison example. Detailed aspects of the process are similar to those of the process illustrated in FIG. 14 (non-buffered Put communication in the comparison example) except for that all nodes x on the primary side use get instead of put in (S2-7) (S3-7). Each step in (S3-$n$) (1≤n≤6 where n is an integer) corresponds to (S2-$n$).

In the methods of the non-buffered Put communication and the non-buffered Get communication in the comparison example, a communication is generated for each element of an array, making the total of communication latency very long. The algorithms of a non-buffered Put communication and a non-buffered Get communication in the comparison example are not capable of determining the continuity of data, making it impossible to conduct batched communications. Also, because loop processes are conducted in all nodes, which exist in the number identical to the number of elements of global communication data, instead of being conducted only in the range that the node itself has after distribution, the scalability of the algorithms are also poor.

(Non-Buffered Two-Sided Communication in Comparison Example)

Next, explanations will be given for an example of a non-buffered two-sided communication in the comparison example. A non-buffered two-sided communication in the comparison example is execution status 3, i.e., a status in which all transmission nodes and reception nodes are conducting communications collectively. A non-buffered two-sided communication in the comparison example is conducted by cooperation between transmission nodes, which are distribution destinations of array A, and reception nodes, which are distribution destinations of array B. This communication is expressed as below, in a form of substitution between pieces of global data.

forall($j$=0:$N$−1)

$B(g(j))=A(f(j))$

Explanations will be given for specific operations of a non-buffered two-sided communication in the comparison example.

First, explanations will be given for operations of a transmission node. A transmission node conducts the following multiple loop for all indexes of pieces of communication data (i.e., j=(j[1], . . . , j[D]); j[1]=0, . . . , N[1]−1; . . . ; j[D]=0, . . . , N[D]−1). In this multiple loop, the transmission node executes transmission node communication procedure 1.

```
for j[D] = 0 to N[D] − 1
    ...
    for j[1] = 0 to N[1] − 1
        (transmission node communication procedure 1)
    end for
    ...
end for
```

Figure 16:
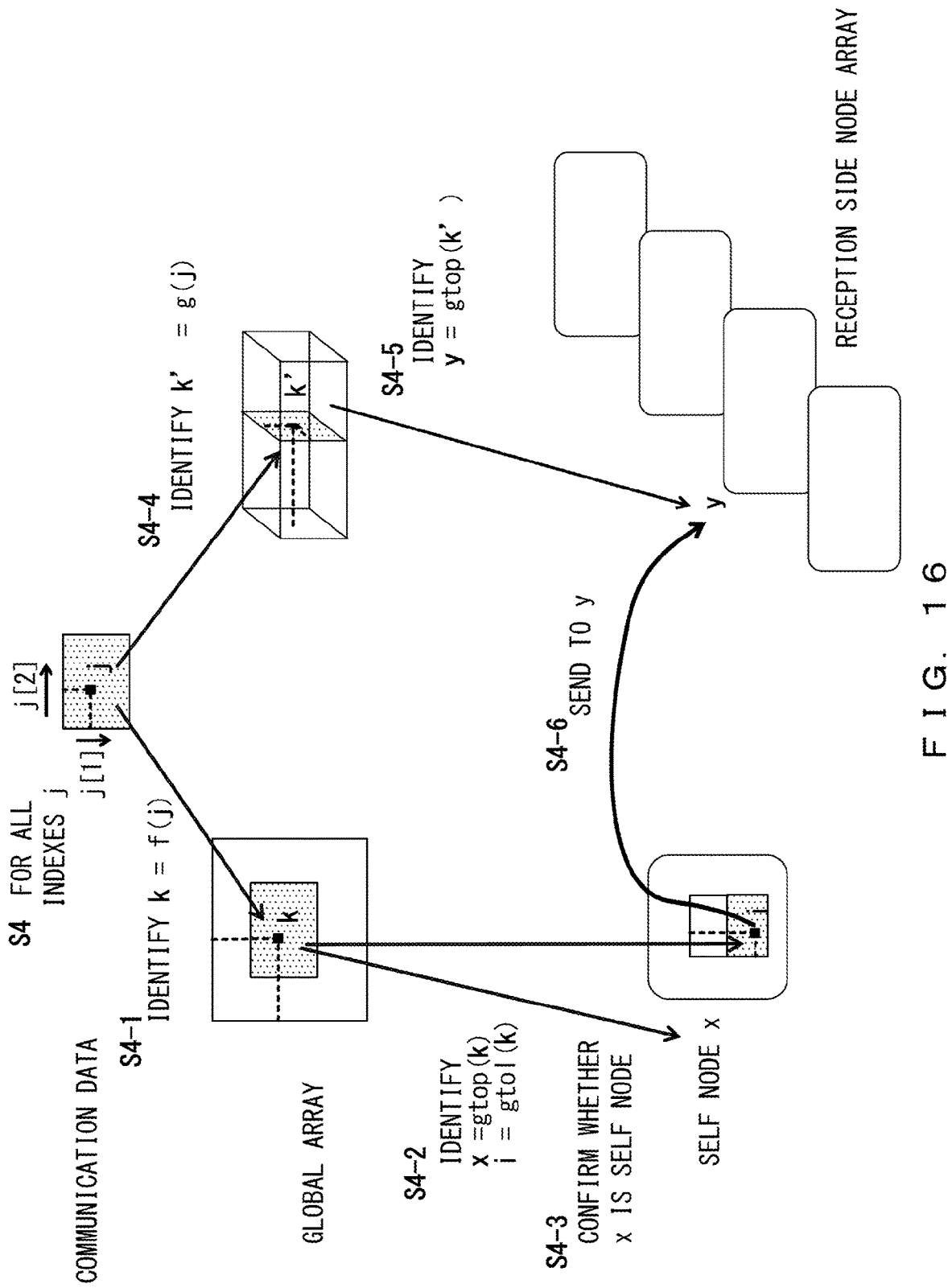
FIG. 16 illustrates an example of transmission node communication procedure 1 in a non-buffered two-sided communication in the comparison example.

FIG. 16 illustrates an example of transmission node communication procedure 1 in a non-buffered two-sided communication in the comparison example. In FIG. 16, the transmission node first obtains a global index k on the transmission side on the basis of j (S4-1). Specifically, the transmission node executes the following procedure.

```
for u = 1 to U
    k[u] = f_u( j )
end for
```

Next, the transmission node obtains a node index x and a local index i on the transmission side on the basis of k (S4-2). Specifically, the transmission node executes the following procedure.

```
for u = 1 to U
    x[u] = gtop_A(k[u])
    i[u] = gtol_A(k[u])
end for
```

Next, the transmission node confirms whether or not x is the node itself (S4-3). When x is not the index of the node itself, the transmission node executes the process for next j without executing S4-4 through S4-6.

When x is the node itself, the transmission node obtains a global index k' on the reception side on the basis of j (S4-4). Specifically, the transmission node executes the following procedure.

```
for v = 1 to V
    k'[v] = gv( j )
end for
```

Next, the transmission node obtains a node index y on the reception side on the basis of k' (S4-5). Specifically, the transmission node executes the following procedure.

```
for v = 1 to V
    y[v] = gtop_B(k'[v])
end for
```

Next, the transmission node transmits one element of a(i) of the node itself to a node y (S4-6). For this transmission, the transmission node conducts tagging so that correspondence occurs to the reception, having the same combination of (x, y), in procedure S5-6, which will be described later.

Then, the transmission node executes the process for next j.

Explanations will be given for operations of a reception node. A reception node conducts the following multiple loop for all indexes of pieces of communication data (i.e., j=(j[1], . . . , j[D]); j[1]=0, . . . , N[1]−1; . . . ; j[D]=0, . . . , N[D]−1).

```
for j[D] = 0 to N[D] − 1
    ...
        for j[1] = 0 to N[1] − 1
            (reception node communication procedure 1)
        end for
    ...
end for
```

In this multiple loop, the reception node executes reception node communication procedure 1.

Figure 17:
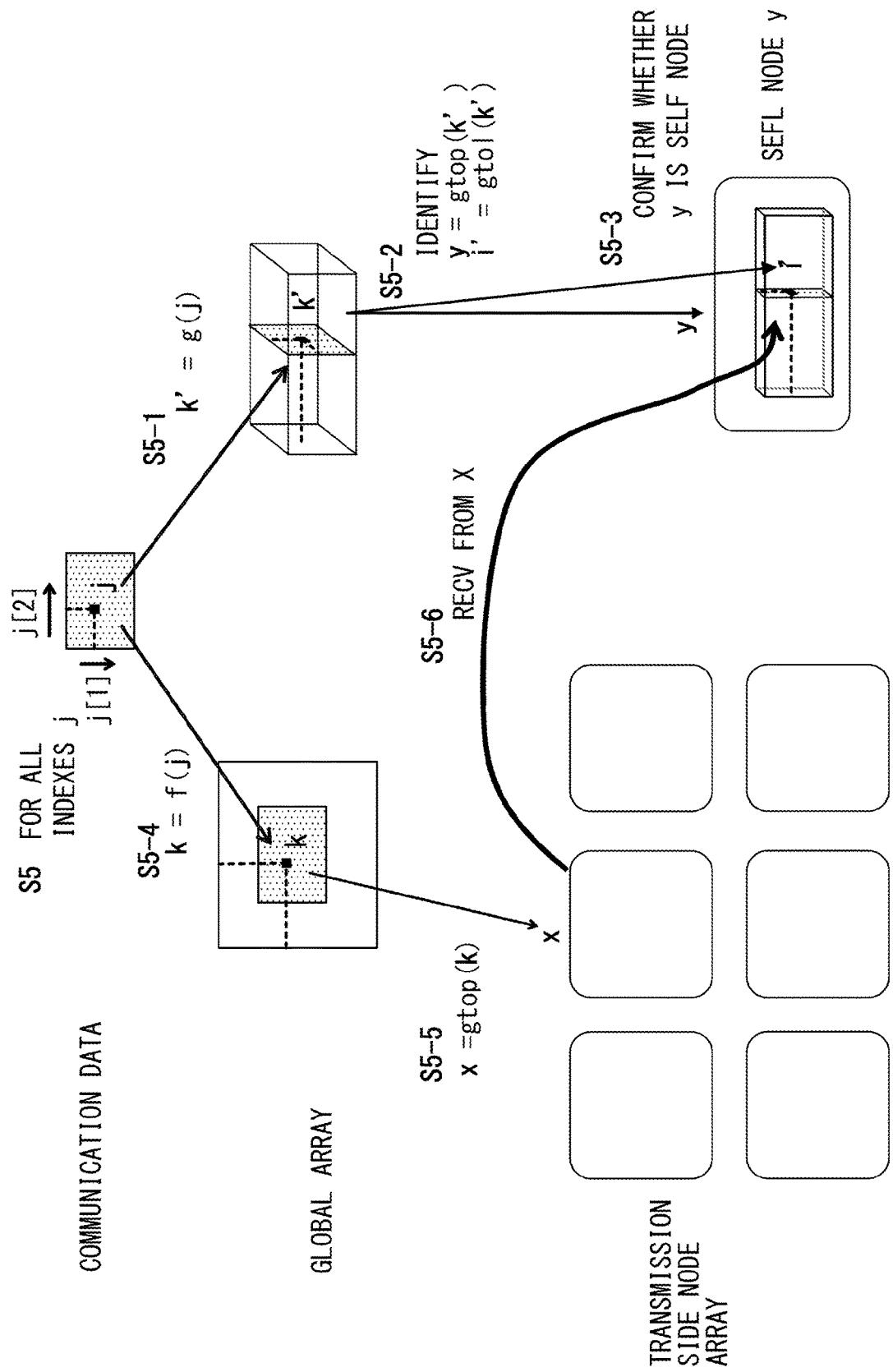
FIG. 17 illustrates an example of reception node communication procedure 1 in a non-buffered two-sided communication in the comparison example.

FIG. 17 illustrates an example of reception node communication procedure 1 in a non-buffered two-sided communication in the comparison example. In FIG. 17, a reception node first obtains a global index k' on the reception side on the basis of j (S5-1). Specifically, the reception node executes the following procedure.

```
for v = 1 to V
    k'[v] = g_v(j)
end for
```

Next, the reception node obtains a node index y and a local index i' on the reception side on the basis of k' (S5-2). Specifically, the reception node executes the following procedure.

```
for v = 1 to V
    y[v] = gtop_B(k'[v])
    i'[v] = gtol_B(k'[v])
end for
```

Next, the reception node confirms whether or not y is the node itself (S5-3). When y is not the index of the node itself, the reception node executes the process for next j without executing S5-4 through S5-6.

When y is the node itself, the reception node obtains a global index k on the transmission side on the basis of j (S5-4). Specifically, the reception node executes the following procedure.

```
for u = 1 to U
    k[u] = f_u(j)
end for
```

Next, the reception node obtains a node index x on the transmission side on the basis of k (S5-5). Specifically, the reception node executes the following procedure.

```
for u = 1 to U
    x[u] = gtop_A(k[u])
end for
```

Next, the reception node receives one element for b(i') of the node itself from node x (S5-6). For this reception, the reception node conducts tagging so that correspondence occurs to the transmission, having the same combination of (x, y), in procedure S4-6.

Then, the transmission node executes the process for next j.

A node that belongs to both of a transmission node and a reception node may conduct the processes in FIGS. 16 and 17 in an arbitrary order.

(Buffered Two-Sided Communication in Comparison Example)

Next, explanations will be given for an example of a buffered two-sided communication in a comparison example. A buffered two-sided communication in the comparison example is execution status 3, i.e., a status in which all transmission nodes and reception nodes are conducting communications collectively. In a buffered two-sided communication, transmission nodes, which are distribution targets of array A, and reception nodes, which are distribution targets of array B, operate in a cooperative manner.

Explanations will be given for specific operations of a buffered two-sided communication in the comparison example. First, a transmission node secures as many transmission buffers SendBuff as there are reception nodes, the transmission buffers having a sufficient length. Also, the reception node secures as many reception buffers RecvBuff as there are transmission nodes, the reception buffers having a sufficient length.

Next, the transmission node conducts the following multiple loop for all indexes of pieces of communication data (i.e., j=(j[1], . . . , j[D]); j[1]=0, . . . , N[1]−1; . . . ; j[D]=0, . . . , N[D]−1) (S6).

```
for j[D] = 0 to N[D] − 1
  ...
    for j[1] = 0 to N[1] − 1
      (transmission node communication procedure 2)
    end for
  ...
end for
```

In this multiple loop, the transmission node executes transmission node communication procedure 2.

Figure 18:
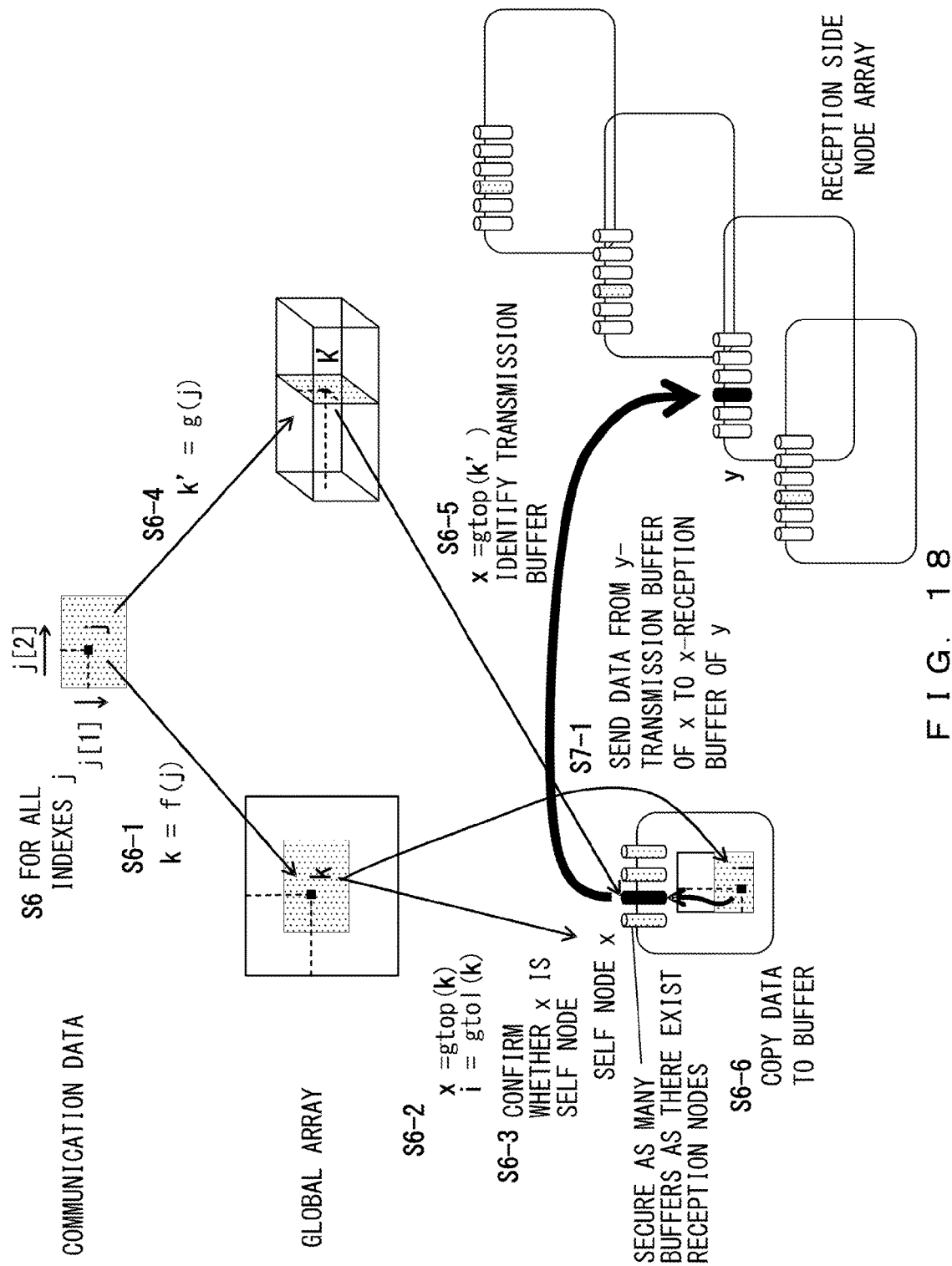
FIG. 18 illustrates an example of transmission node communication procedure 2 in a buffered two-sided communication in the comparison example.

FIG. 18 illustrates an example of transmission node communication procedure 2 of a buffered two-sided communication in the comparison example. In FIG. 18, the transmission node first obtains a global index k on the transmission side on the basis of j (S6-1). Specifically, the transmission node executes the following procedure.

```
for u = 1 to U
  k[u] = f_u(j)
end for
```

Next, the transmission node obtains a node index x and a local index i on the transmission side on the basis of k (S6-2). Specifically, the transmission node executes the following procedure.

```
for u = 1 to U
  x[u] = gtop_A(k[u])
  i[u] = gtol_A(k[u])
end for
```

Next, the transmission node confirms whether or not x is the node itself (S6-3). When x is not the index of the node itself, the transmission node executes the process for next j without executing S6-4 through S6-6.

When x is the node itself, the transmission node obtains a global index k' on the reception side on the basis of j (S6-4). Specifically, the transmission node executes the following procedure.

```
for v = 1 to V
  k'[v] = g_v(j)
end for
```

Next, the transmission node obtains a node index y on the reception side on the basis of k' (S6-5). Specifically, the transmission node executes the following procedure.

```
for v = 1 to V
  y[v] = gtop_B(k'[v])
end for
```

Next, the transmission node copies one element of a (i) of the node itself, and adds it to the tail of SendBuff[y] (S6-6).

Then, the transmission node executes the process for next j.

Next, the transmission node transmits the data of SendBuff to the corresponding reception node (S7-1).

Next, explanations will be given for operations of a reception node. The reception node receives data from a transmission node corresponding to RecvBuff (S7-2). Then, the reception node conducts the following multiple loop for all indexes of pieces of communication data (i.e., j=(j[1], . . . , j[D]); j[1]=0, . . . , N[1]−1; . . . ; j[D]=0, . . . , N[D]−1).

```
for j[D] = 0 to N[D] − 1
  ...
    for j[1] = 0 to N[1] − 1
      (reception node communication procedure 2)
    end for
  ...
end for
```

In this multiple loop, the reception node executes reception node communication procedure 2.

Figure 19:
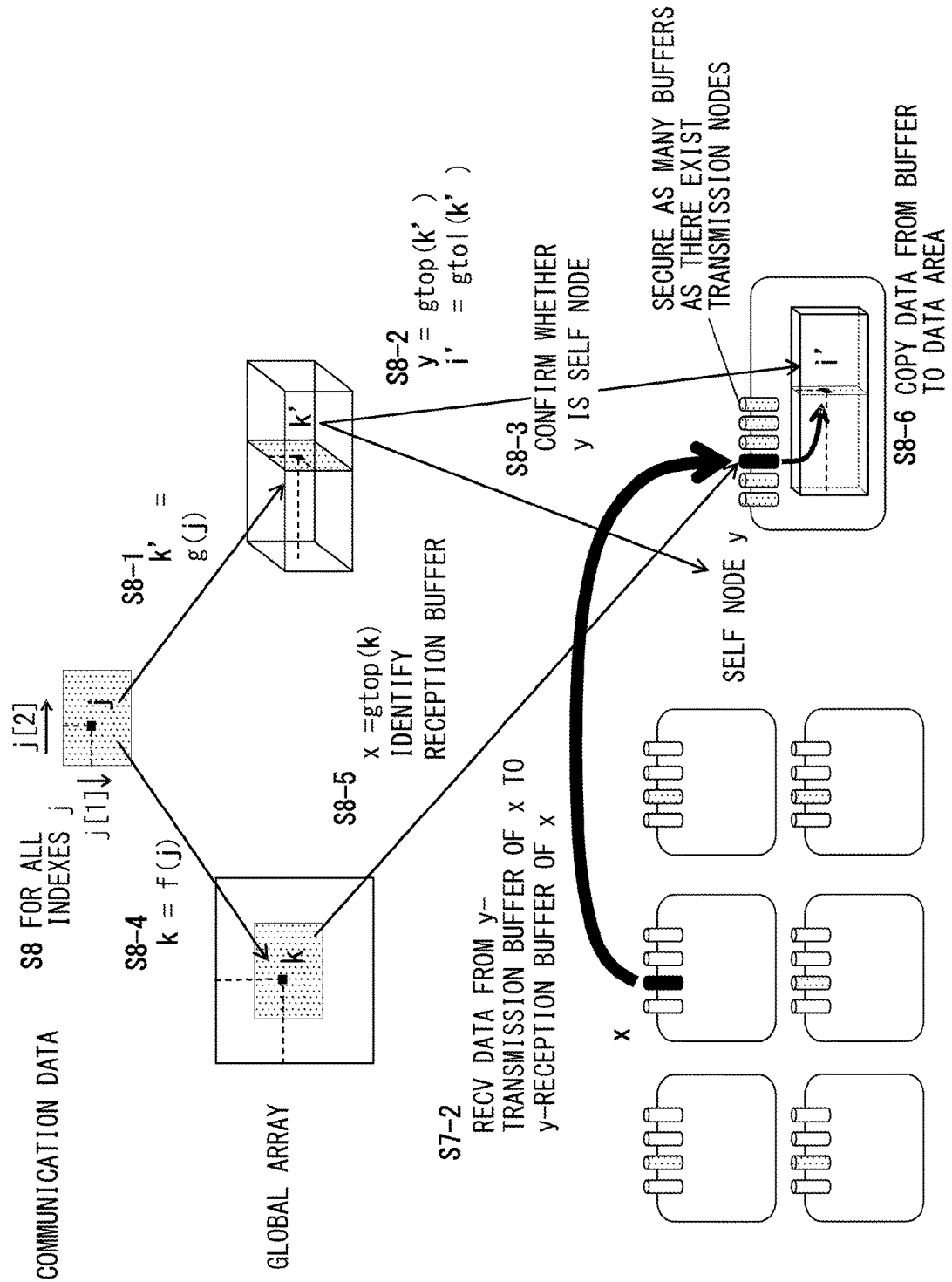
FIG. 19 illustrates an example of reception node communication procedure 2 in a buffered two-sided communication in the comparison example.

FIG. 19 illustrates an example of reception node communication procedure 2 in a buffered two-sided communication in the comparison example. In FIG. 19, a reception node first obtains a global index k' on the reception side on the basis of j (S5-1). Specifically, the reception node executes the following procedure.

```
for v = 1 to V
  k'[v] = g_v(j)
end for
```

Next, the reception node obtains a node index y and a local index i' on the reception side on the basis of k' (S8-2). Specifically, the reception node executes the following procedure.

```
for v = 1 to V
  y[v] = gtop_B(k'[v])
  i'[v] = gtol_B(k'[v])
end for
```

Next, the reception node confirms whether or not y is the node itself (S8-3). When y is not the index of the node itself, the reception node executes the process for next j without executing S8-4 through S8-6.

When y is the node itself, the reception node obtains a global index k on the transmission side on the basis of j (S8-4). Specifically, the reception node executes the following procedure.

```
for u = 1 to U
  k[u] = f_u(j)
end for
```

Next, the reception obtains a node index x on the transmission side on the basis of k (S8-5). Specifically, the reception node executes the following procedure.

```
for u = 1 to U
  x[u] = gtop_A(k[u])
end for
```

Next, the reception node extracts one element from the top of RecvBuff[x], and copies it onto b(i') (S8-6).

Then, the transmission node executes the process for next j.

As described above, explanations have been given for the procedures of communications in the comparison example. In non-buffered communications such as a non-buffered Put communication, a non-buffered Get communication, a non-buffered two-sided communication, etc., a communication is generated for each element of an array, making the total latency very long. In a limited case, a transmission node can determine that communication data is continuous and can conduct a collective communication. For example, when it is recognized for example that the first dimensions of the global arrays have the same length between the transmission side and the reception side and that distribution will not be conducted, a transmission node can treat data up to the length of the first dimension of the global array as continuous data. However, for a transmission node in the comparison example, it is difficult to determine that both of the corresponding transmission data and reception data are continuous.

In a buffered communication, such as the non-buffered two-sided communication in the comparison example, responding to data distribution increases the cost of buffering. This is because node indexes and local indexes are calculated for all elements of communication data, leading to a very high cost of buffering for one element.

In status 1 and status 2, it is assumed that secondary side nodes do not conduct communications actively, making it difficult to conduct buffering on the reception side in a Put communication and on the transmission side in a Get communication. Buffering on the secondary side can be implemented by interruption to a secondary side processor, a demon process or a demon thread, however, this configuration imposes loads on the secondary side, causing performance reduction in the entire system.

In view of the above, it is difficult to fully draw out the performance of a compiler in a parallel language that permits free data distribution and communications of global view.

In the communication method in the comparison example, it is needed to execute many procedures for a communication of one element or for buffering, leading to lower efficiency. By contrast, a communication method according to the embodiment that will be explained below, the continuity of data is extracted and a communication is conducted for each piece of continuous data both in a buffered communication and in a non-buffered communication. Thereby, it is possible to increase the efficiency in communications. Continuous data used herein is pieces of data that are stored in continuous addresses.

Also, a non-buffered communication according to the embodiment, an interval in which continuity is maintained between the transmission side and the reception side for a combination of a transmission node x and a reception node y. An interval in which continuity is maintained between the transmission side and the reception side is an interval in which addresses are continuous in an area that stores data in a transmission side node and in which addresses are continuous in an area that stores data in a reception side node. Note that data that is continuous commonly between the transmission side and the reception side is data stored in an interval in which continuity is maintained commonly between the transmission side and the reception side. By communicating data, at one time, in an interval in which continuity is maintained commonly between the transmission side and the reception side, it is possible to increase the efficiency in communications.

Further, in a buffered communication according to the embodiment, a continuity interval, which does not need a process of packing or unpacking, is detected in advance and simple memory copying is conducted between data and a buffer. Thereby, it is possible to increase the speed of data copying onto a buffer or data copying from a buffer, leading to higher efficiency in communications.

Also, a communication method according to the embodiment conducts communications targeting a plurality of elements or an interval of elements, making it possible to reduce the costs of collection (packing) from a memory to a buffer and of distribution (unpacking) from a buffer to a memory. The costs of packing and unpacking is added to communication latency. According to the communication method of the embodiment, it is possible to increase the efficiency in communications.

As will be described below, there are many factors that break the continuity of data, and such factors are also complex, making it difficult to determine such factors highly efficiently and to extract a long continuity interval. Accordingly, the communication method according to the embodiment repeatedly conducts a process of determining a communication data range locally instead of globally so as to implement data communications highly efficiently and to suppress the costs of unnecessary repeats and determination in a case when the level of paralleling is high, and thereby determines the continuity of data highly efficiently. Also, when the continuity of data between dimensions is guaranteed by the specification such as in case of for example multidimensional arrays of Fortran, continuity between dimensions is extracted.

In the buffered two-sided communication in the comparison example, it is difficult to determine an appropriate size of a transmission buffer and a reception buffer. Also, each node has to be provided with as many buffers as there are nodes, increasing the amount of used memories in a case when the level of paralleling is high, and also making the realization of highly-paralleled communications. In the buffered communication method according to the embodiment, the allocation of buffers is conducted with the minimum size that is used for a communication. This makes it possible to suppress the amount of memories used for buffer areas even when the level of paralleling is high.

Also, the communication method of the embodiment increases the amount of data that is communicated at one time while suppressing prolongment of latency based on the overhead cost of normalized communications, and thereby swiftly realizes communications. The communication method according to the embodiment can also be used for generating a communication code in a compiler and can also be used for implementing a runtime library.

Now, explanations will be given for a factor that breaks continuity of global data. Continuity of global data is broken by for example the following factors.

(1. Discontinuous Subscripts)

When subscripts of an array is used for specifying data to be accessed and the ranges of specified subscript expression are discontinuous, data to be accessed becomes discontinuous. An example of this is reference to a partial array based on a combination of three subscripts or indirect reference. A specific example of this is a case where data to be accessed has been specified by for example A(2:8:2) or A(IX(1:8)).

(2. Subscript Range/Over Dimensions)

In Fortran, when the entire k-th dimension is not referred to from the lower limit to the upper limit, data that is referred to is not continuous to the (k+1)-th dimension even when the data that is referred to is continuous in the k-th dimension. When for example the declaration of the shape is A(8,8), A(1:8, 2:3) is continuous over dimensions based on 8*2=16 elements, while A(1:7, 2:3) is not continuous over dimensions and is continuous based on 7 elements.

Note that the leftmost subscript in Fortran and the rightmost subscript in C language correspond to the first dimension. In languages that do not define the arrangement order of array elements over dimensions, the continuity over dimensions is not guaranteed.

(3. Implementation Method of Distribution)

In some implementation methods of distribution, there are cases where even when subscripts of a global array are continuous, the continuity of the subscripts of the corresponding local array is not guaranteed. In for example an implementation method in which distributed data is allocated without being compressed for cyclic distribution, when A(1:100) has received cyclic distribution to three nodes, the data to be distributed may be allocated to uncontinuous addresses each having the stride width of three.

(4. Broken Number of Distribution/Over Dimensions)

When an index is not divisible by the number of nodes in the distribution of the k-th dimension, continuity to the (k+1)-th dimension does not occur in an implementation in which the scale of the allocation is constant between nodes. When for example the declaration of the shape is such that the data of A(8,8) is distributed to three nodes in block distribution in the first dimension, the assignment becomes A(1:3, 1:8), A(4:6, 1:8) and A(7:8, 1:8). In such a case, the assigned amount of the first dimension is reduced only for the last node. When areas of the same size have been allocated to all nodes in such a case, only the last node does not have continuity to a different dimension.

(5. Uneven Distribution/Over Dimensions)

When the k-th dimension is uneven block distribution, block-cyclic distribution or indirect distribution, there are cases in which the continuity to the (k+1)-th dimension does not occur even when the index is dividable by the number of nodes. When for example the first dimension is uneven block distribution and the distribution widths are 1, 3, 3, and 2 for the respective nodes, continuity to the second dimension in the first and fourth nodes does not occur in an implementation in which the scale of allocation in each node is fixed to the maximum value of the distribution width, i.e., three.

(6. Indirect Mapping/Over Dimensions)

In a language such as PF, a global array is aligned with a virtual array known as a template instead of directly distributing the global array to nodes and the template is distributed, and thereby the global data can be distributed indirectly. In such a case, continuity to the (k+1)-th dimension of the global array does not occur except for a case when the size of the k-th dimension of the global array is identical to the size of the corresponding dimension of the template. A case is assumed as an example in which the shape of a global array is A(10, 8), the shape of a template is T (12, 8), A(i, j) is aligned with T (i+1, j), and the first dimension undergoes block distribution to four nodes. In such a case, the distribution of T to the respective nodes is T (1:3, 1:8), T (4:6, 1:8), T (7:9, 1:8) and T(10:12, 1:8), while the distribution of A to the respective nodes is A(1:2, 1:8), A(3:5, 1:8), A(6:8, 1:8) and A(9:10, 1:8). In an implementation in which memory allocation is conducted on the basis of the shape of a template, because the first dimensions in the first and fourth nodes are larger than the first dimension of the template, continuity to the second dimension does not occur.

An example of a factor that breaks continuity of global data has been explained above.

Figure 20:
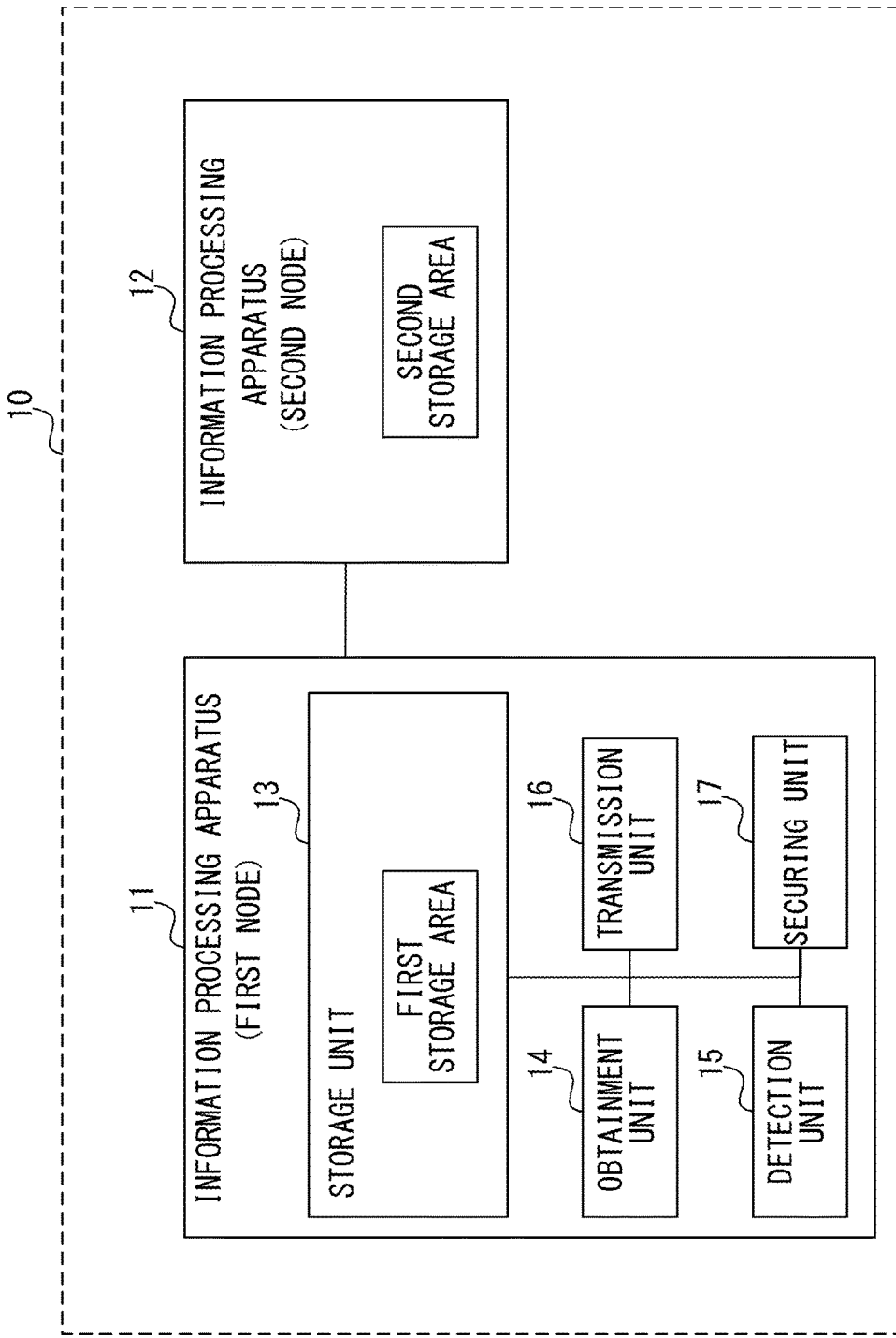
FIG. 20 illustrates an example of a configuration of an information processing apparatus according to a transmission process of an embodiment.

FIG. 20 illustrates an example of a configuration of an information processing apparatus according to a transmission process of the embodiment. In FIG. 20, local data obtained by dividing global data shared by a plurality of information processing apparatuses have been distributed to a plurality of information processing apparatuses in an information processing system 10. Also, the information processing system includes a first node 11 and a second node 12. The information processing apparatus 11 is the first node 11 included in the information processing system.

The information processing apparatus (first node) 11 includes a storage unit 13, an obtainment unit 14, a detection unit 15, a transmission unit 16 and a securing unit 17.

In the first storage area that has been sectioned to prescribed units, the storage unit 13 stores local data that has been assigned to the first node 11. In this example, sections are continuous areas that are specified by a prescribed address range of a storage area.

The obtainment unit 14 obtains an instruction to write target local data, which is a target of writing to the second node 12 from the first node 11.

On the basis of storage area information, the detection unit 15 detects a plurality of continuous sections to which target local data is to be written, in the second storage area that has been sectioned to prescribed units in a different storage unit included in the second node 12. The storage area information is information for identifying data to which the target local data corresponds in global data. Continuous sections are in a relationship in which the tailing address of one section and the initial address of the other section are continuous.

The transmission unit 16 extracts as many pieces of local data stored in the first storage area as specified by the number of the continuous sections that were detected by the detection unit 15, and transmits the data to the second node 12.

By the transmission unit 16 extracting a piece of local data from the storage unit 13 for each of the pieces of data stored in a plurality of continuous sections from among the sections in the second storage area in the second node 12 and transmitting it to the second node 12, it is possible to increase the communication efficiency.

Also, the storage area information includes information for identifying target local data that has been assigned to the first node 11 and information for identifying target local data that has been assigned to the second node 12. On the basis of this storage area information, the detection unit 15 detects a plurality of continuous sections from among continuous sections in the second storage area, sections of the first storage area in which the target local data to be written to the continuous sections has been stored being continuous. Then, the transmission unit 16 extracts as many pieces of local data stored in the first storage area as there are continuous sections detected by the detection unit 15, and transmits the data to the second node 12.

By the transmission unit 16 extracting a piece of local data from the storage unit 13 for each of the pieces of data stored in a plurality of sections that are continuous commonly over the first and second storage areas and transmitting it to the second node 12, it is possible to increase the communication efficiency.

Also, the transmission unit 16 extracts as many pieces of local data stored in the first storage area as there are continuous sections, stores the data in a prescribed buffer area, and transmits the local data stored in the buffer area to the second node 12 in prescribed units.

By the transmission unit 16 extracting from the storage unit 13 pieces of local data in a number equal to the number of the sections corresponding to the number of continuous sections detected by the detection unit 15 and storing the data in a prescribed buffer area, it is possible to store data in a buffer highly efficiently.

The securing unit 17 secures a buffer area of a size in accordance with the number of continuous sections detected by the detection unit 15. Thereby, it is possible to reduce the size of a buffer area to the minimum size used for communications, making it possible to suppress the amount of memories used for communications.

The second node 12 is an information processing apparatus that conducts communications with the first node 11. The second node 12 receives as many pieces of local data as there are continuous sections from the first node 11, and stores the pieces of data in the second storage area.

The storage area information may include local array information of the second node 12 that is expressed by for example a multidimensional array. The detection unit 15 detects a plurality of continuous sections on the basis of continuity of indexes of a multidimensional array of storage area information. As a specific example, the detection unit 15 determines, to be a plurality of continuous sections, sections corresponding to intervals of a multidimensional array in which the indexes of the first dimension of storage area information are continuous. Also, as another example, the detection unit 15 determines, to be a plurality of continuous sections, sections corresponding to intervals of a multidimensional array in which the indexes of storage area information are continuous over dimensions. Further, storage area information may include local array information of the first node 11, which is expressed by for example a multidimensional array.

Also, storage area information may include, as specific examples, the size of each dimension of a node array on the reception side, information that specifies the type of distribution and information of a global array for each dimension of a node array. This will be explained later by referring to FIG. 30.

Figure 21:
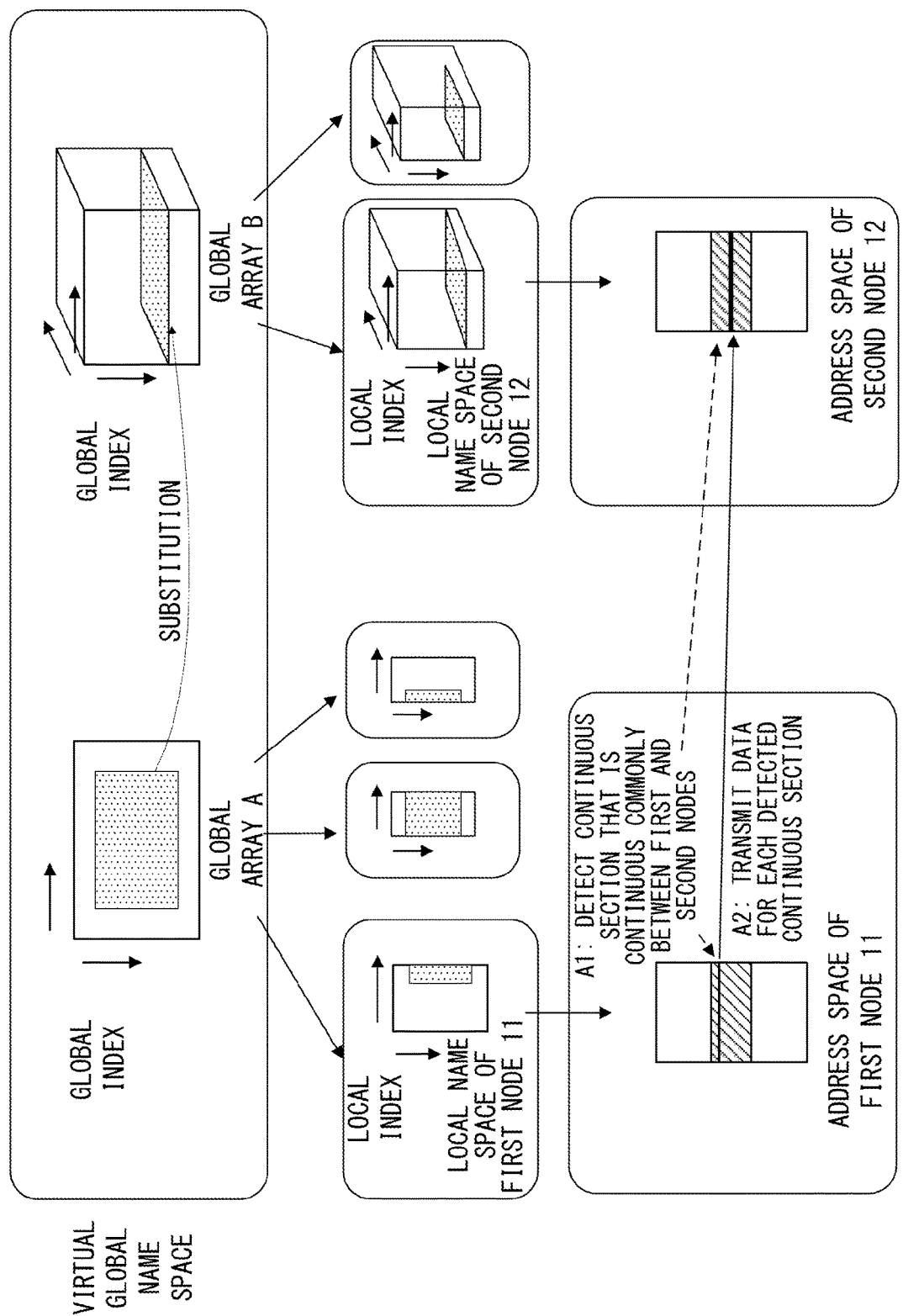
FIG. 21 illustrates an example of operations of the information processing apparatus according to the transmission process of the embodiment.

An example of operations of an information processing apparatus according to a transmission process of the embodiment will be explained. FIG. 21 illustrates an example of operations of an information processing apparatus according to a transmission process of the embodiment. In FIG. 21 illustrates an example of a communication that corresponds to a manipulation of substituting data of global array A into global array B. Global arrays A and B are respectively distributed to and arranged in a plurality of nodes. The first node 11 is one of the plurality of nodes which global array A was distributed to and arranged in. The second node 12 is one of the plurality of nodes which global array B was distributed to and arranged in.

Writing of data from the first node 11 to the second node 12 without using a buffer is described in FIG. 21. First, on the basis of storage area information, the first node 11 detects a plurality of sections that are continuous commonly over the area storing the target local data in the first node 11 and the area storing the target local data in the second node 12 (A1). Then, the first node 11 transmits, to the second node, data for each of the detected continuous sections (A2). This communication will be explained later in detail in the explanations for the section of (Non-buffered Put communication).

Figure 22:
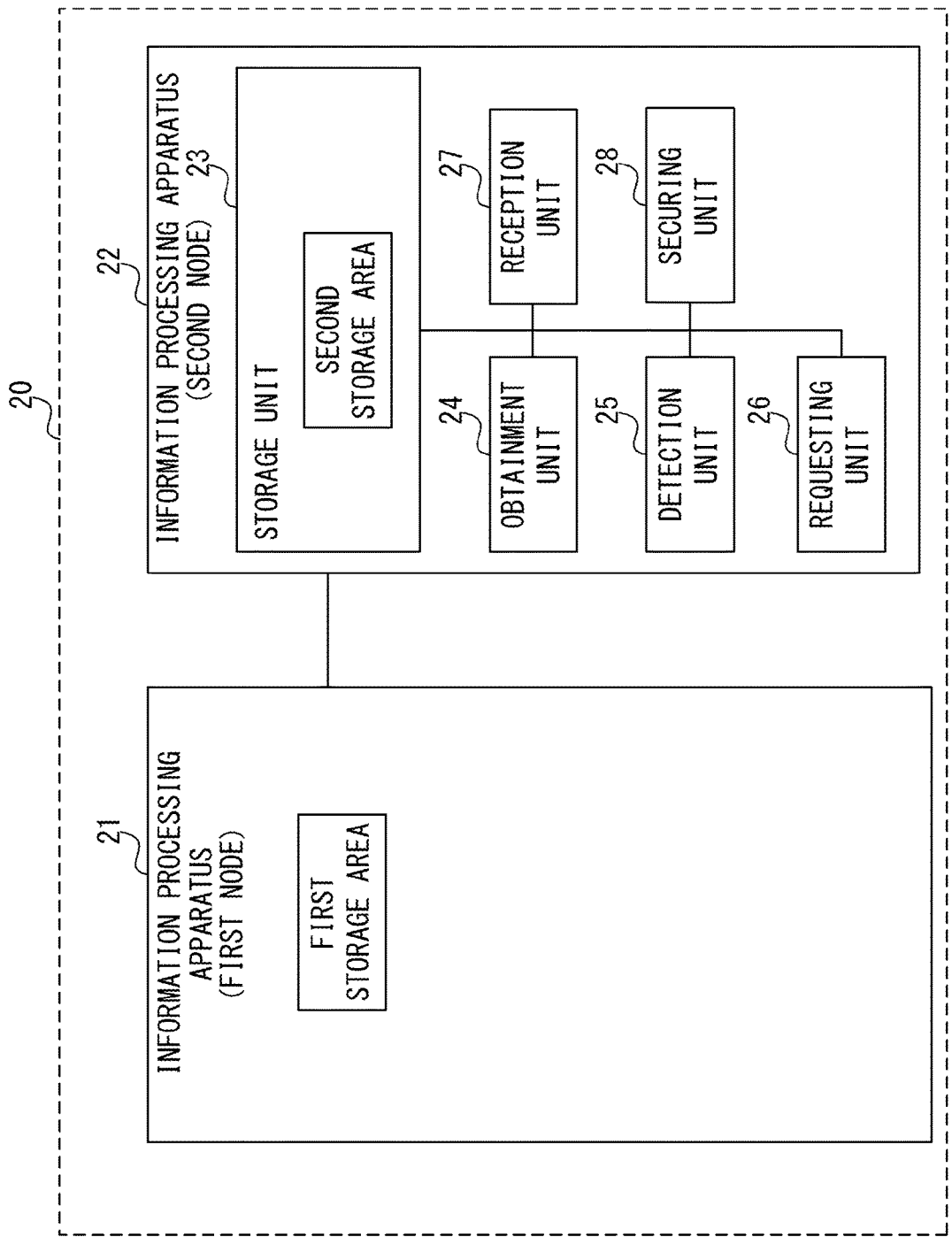
FIG. 22 illustrates an example of a configuration of the information processing apparatus according to a reception process of the embodiment.

FIG. 22 illustrates an example of a configuration of an information processing apparatus according to a reception process of the embodiment. In FIG. 22, in an information processing system 20, pieces of local data obtained by dividing global data shared by a plurality of information processing apparatuses have been distributed to a plurality of information processing apparatuses. Then, the information processing system 20 includes a first node 21 and a second node 22. The information processing apparatus 22 is the second node 22 that is included in the information processing system.

The information processing apparatus (second node) 22 includes a storage unit 23, an obtainment unit 24, a detection unit 25, a requesting unit 26, a reception unit 27 and a securing unit 28.

The storage unit 23 includes a second storage area that has been sectioned to prescribed units. A local data area of the storage unit 23 is assigned to the information processing apparatus 22.

The obtainment unit 24 obtains an instruction to read target local data from the first node 21 to the second node 22.

On the basis of storage area information, the detection unit 25 detects a plurality of continuous sections from which target local data is to be read, from the first storage area that has been sectioned to a prescribed units by a different storage unit included in the first node 21. Storage area information is information for identifying data to which target local data corresponds in the global data.

The requesting unit 26 requests that the first node 21 extract as many pieces of local data stored in the first storage area as specified by the number of the continuous sections detected by the detection unit 25 and transmit the data to the second node 22.

The reception unit 27 receives from the first node 21 as many pieces of local data as specified by the number of the continuous sections transmitted in response to the request from the requesting unit 26, and stores the data in the second storage area.

By the reception unit 27 receiving, from the first node 21, a piece of local data for each of the pieces of data stored in the plurality of continuous sections among sections in first storage unit in the first node 21, it is possible to increase the communication efficiency.

Also, storage area information includes information for identifying target local data assigned to the first node 21 and information for identifying target local data assigned to the second node 22. On the basis of this storage area information, the detection unit 25 detects a plurality of continuous sections from among the continuous sections of the first storage area, sections of the second storage area in which data read from the continuous sections is stored being continuous. Then, the reception unit 27 receives from the first node 21 as many pieces of local data as specified by the number of the continuous sections transmitted in response to a request from the requesting unit 26, and stores the data in the second storage area.

By the reception unit 27 receiving, from the first node 21, a piece of local data for each of the pieces of data stored in the plurality of sections that are continuous both in the first storage area and the second storage area, it is possible to increase the communication efficiency.

Also, the reception unit 27 receives local data and stores it in a prescribed buffer area, and thereafter extracts as many pieces of data as specified by the number of the continuous sections detected by the detection unit 25 so as to store the data in the second storage area.

By the reception unit 27 extracting as many pieces of local data as specified by the number of the continuous sections detected by the detection unit 25 and storing the data in a storage area, it is possible to move data from a buffer area to a storage area efficiently.

The securing unit 28 secures a buffer area of a size that is in accordance with the continuous sections detected by the detection unit 25. Thereby, it is possible to reduce the size of a buffer area to the minimum size used for communications, making it possible to suppress the amount of memory that is used for communications.

The first node 21 is an information processing apparatus that conducts communications with the second node 22. In response to a request from the second node 22, the first node 21 extracts as many pieces of local data stored in the first storage area as specified by the number of the continuous sections, and transmits the data to the second node 22.

Storage area information may include local array information of the first node 21 that is expressed by for example a multidimensional array. Also, storage area information may include local array information of the second node 22 that is expressed by for example a multidimensional array. Storage area information may include, as specific examples, the size of each dimension of a node array on the transmission side, information that specifies the type of distribution and information of a global array for each dimension of a node array. Similarly to the detection unit 15, the detection unit 25 detects continuous sections. Note that the information processing apparatus 11 and the information processing apparatus 22 may be the same information processing apparatus.

Explanations will be given for operations of an information processing apparatus according to a reception process of the embodiment. FIG. 23 illustrates an example of operations of an information processing apparatus according to a transmission process of the embodiment. FIG. 23 illustrates an example of a communication that is conducted in response to manipulation of substituting data of global array A into global array B. Global arrays A and B are respectively distributed to and arranged in a plurality of nodes. The first node 21 is one of the plurality of nodes which global array A was distributed to and arranged in. The second node 22 is one of the plurality of nodes which global array B was distributed to and arranged in.

Reading of data from the first node 21 to the second node 22 without using a buffer is described in FIG. 23. First, on the basis of storage area information, the first node 21 detects a plurality of sections that are continuous commonly over the area storing the target local data in the first node 21 and the area storing the target local data in the second node 22 (B1). Then, the first node 21 obtains, from the first node 21, data for each of the detected continuous sections (B2). This communication will be explained later in detail in the explanations for the section of (Non-buffered Get communication).

Figure 24:
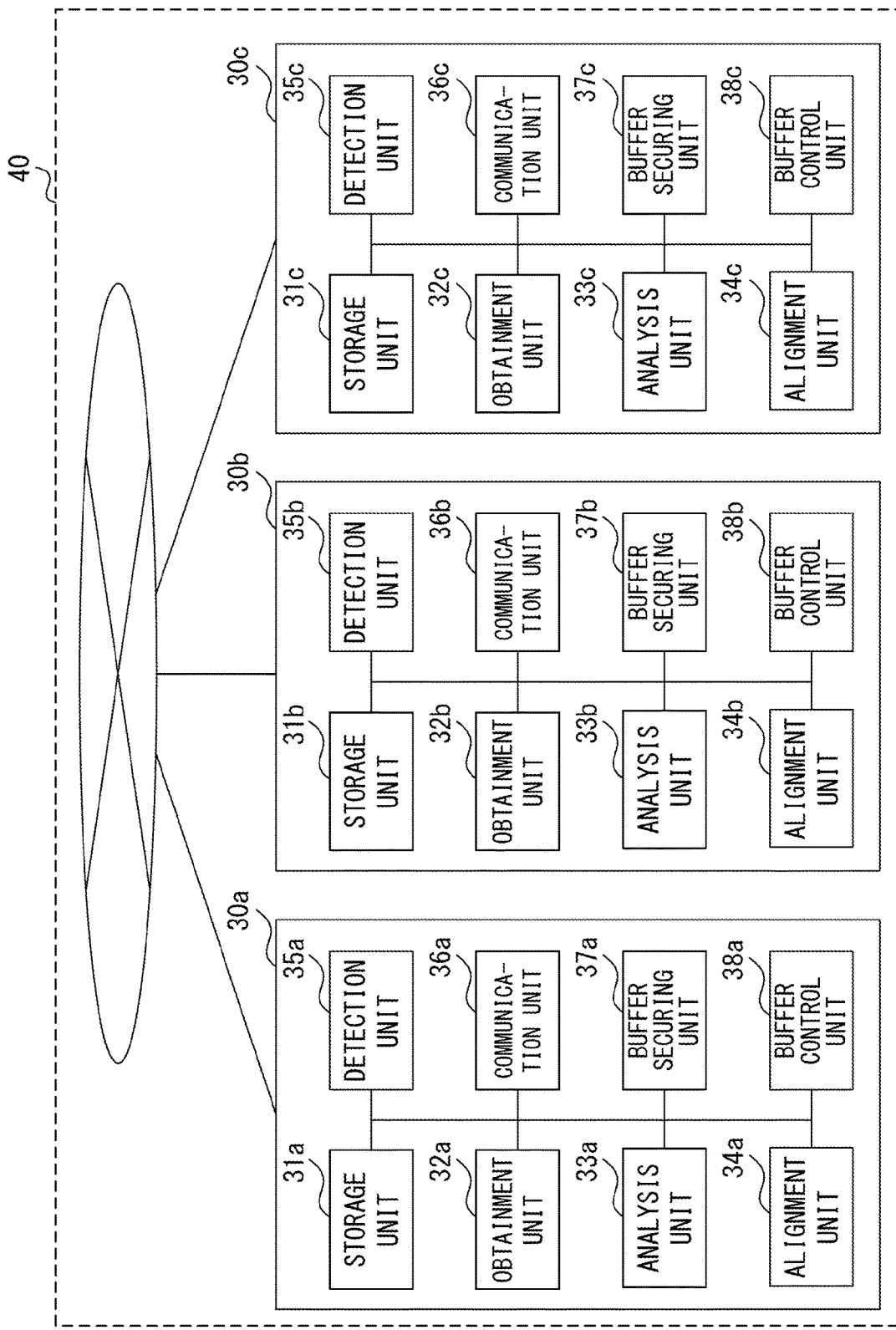
FIG. 24 illustrates an example of a configuration of a communication system according to the embodiment.

FIG. 24 illustrates an example of a configuration of a communication system according to the embodiment. In FIG. 24, a communication system 40 includes a plurality of nodes 30 (30a through 30c). Nodes 30 are connected to each other via a communication network such as interconnect, a Local Area Network (LAN), etc.

In the communication system 40, pieces of data placed in a virtual global space defined by a programming language and pieces of data that have been arranged over storages using striping technology etc. are abstracted as a global arrays that have been distributedly arranged in a virtual multidimensional node array. Communications in the communication system 40 can be expressed as substitution between whole arrays or partial arrays of transmission-side global array A and reception side global array B. A global array may be distributed over the entire or part of a node group included in the communication system 40 or may also be placed in a single node.

Communications between nodes in the communication system 40 can be expressed by using for example the following forall syntax of Fortran.

$$forall(j[1]=0:N[1]-1, \ldots , j[D]=0:N[D]-1)$$

$$B(g_1(j), \ldots , g_T(j))=A(f_1(j), \ldots , f_U(j))$$

Node array P that corresponds to global array A is defined in such a manner that it has as many dimensions as global array A has and that the association between the dimensions is identical. Similarly, an Q that corresponds to global array B is defined in such a manner that it has as many dimensions as global array B and that the association between the dimensions is identical. Although these node arrays P and Q are not always the same as node arrays described in a program as distribution destinations of global arrays A and B, they can easily be converted by the dimensional expansion and the axial rotation. Nodes that belong to node arrays P and Q may be the same physically, partially or entirely.

In the communication system 40, one distribution type is selected for each dimension from among six types, which consist of the five distribution types plus a process that is not distribution. Note that the types of distribution are not limited to these six types.

The processors of not all nodes of both node array P and node array Q are active, and there are three execution statuses for the nodes in the communication system 40 as described above. In the communication system 40, a Put communication from node array P is used when node array P is active while a Get communication is from node array Q is used when node array Q is active. When both of them are active, any of a two-sided communication, a Put communication and a Get communication may be used in a communication system according to the embodiment.

In a non-buffered communication according to the embodiment, a node that conducts communications skips buffering so as to reduce communication latency. Also, in a non-buffered communication according to the embodiment, anode that conducts communications accurately detects intervals that are continuous commonly between transmission-side data and a reception-side data, and thereby increases the amount of data that is communicated at one time.

In a buffered communication according to the embodiment, a node that conducts communications conducts buffering so as to increase the amount of data that is communicated at one time. Also, in a buffered communication according to the embodiment, a node that conducts communications accurately detects intervals that are continuous with data in the node itself corresponding to the communication partner, and thereby increases the speed in buffering.

In a communication system according to the embodiment, five types of communications are conducted in accordance with the execution statuses of a program and with whether or not buffering is conducted. The types of communications according to the embodiment are a non-buffered Put communication, a buffered Put communication, a non-buffered Get communication, a buffered Get communication and a buffered two-sided communication.

In the explanations below, "evaluation" in the implementation by using a runtime library means obtaining the value thereof, while "evaluation" in the implementation by using a compiler means generating or simplifying a numerical expression of the internal expression.

When a communication is expressed in a form of substitution between global array A and global array B, each node 30 is included in one or both of node arrays P and Q. In other words, each node 30 stores a local array that corresponds to one or both of global arrays A and B.

The respective nodes 30 include storage units 31 (31a through 31c), obtainment units 32 (32a through 32c), analysis units 33 (33a through 33c), alignment units 34 (34a through 34c), detection units 35 (35a through 35c) and communication units 36 (36a through 36c). Further, the respective nodes 30 include buffer securing units 37 (37a through 37c) and buffer control units 38 (38a through 38c).

The nodes 30 are examples of the information processing apparatus 11 and the information processing apparatus 22. Also, the nodes 30 are examples of the second node 12 and the second node 22. The storage units 31 are examples of the storage unit 13 of the information processing apparatus 11 and the storage unit 23 of the information processing apparatus 22. The obtainment units 32 are examples of the obtainment unit 14 of the information processing apparatus 11 and the obtainment unit 24 of the information processing apparatus 22. The detection units 35 are examples of the detection unit 15 of the information processing apparatus 11 and the detection unit 25 of the information processing apparatus 22. The communication units 36 are examples of the transmission unit 16 of the information processing apparatus 11 and the requesting unit 26 and the reception unit 27 of the information processing apparatus 22. The buffer securing units 37 are examples of the securing unit 17 of the information processing apparatus 11 and the securing unit 28 of the information processing apparatus 22. The buffer control units 38 are examples of the transmission unit 16 of the information processing apparatus 11 and the reception unit 27 of the information processing apparatus 22.

The storage unit 31 stores data that is a communication target of data communications between a plurality of nodes (referred to as communication data hereinafter). Specifically, when a communication is expressed in a form of substitution between global arrays A and B, the storage unit 31 stores a local array to which the entity of one or both of global arrays A and B have been allocated in a divided manner. Communication data is an example of a target local data.

Also, the storage unit 31 stores a communication information table. A communication information table includes storage area information. A communication information table stores information related to an area that stores communication data in a transmission node and a reception node. In other words, when a communication is expressed in a form of substitution between global arrays A and B, a communication information table stores information related to a node array and a local array of global array A and information related to a node array and a local array of global array B. Communication information tables will be explained later in detail.

The obtainment unit 32 obtains an instruction to conduct data communications between a plurality of nodes. Specifically, the obtainment unit 32 receives a program in which an instruction to conduct a communication has been described. An instruction to conduct a communication is expressed in a form of for example substitution between global arrays such as between global array A and global array B. In such an instruction to conduct a communication, a local array corresponding to one of the communication-target global arrays is stored in the storage unit 31. Also, a local array corresponding to the other of the communication-target global arrays is stored in a different node that is connected to the node 30.

The analysis unit 33 collects pieces of information related to a communication that corresponds to the instruction received by the obtainment unit 32, and stores the collection results in a communication information table. Specifically, the analysis unit 33 conducts analysis of a program in which the instruction to communicate received by the obtainment unit has been described, and thereby collects pieces of information related to a communication on which attention is focused. The analysis unit 33 conducts analysis of a program that corresponds to a combination of the execution statuses of the reception node and the reception node.

The alignment unit 34 rearranges indexes of communication data. Indexes of communication data are indexes of an array in a case when communication data is expressed by an array. A different method of rearrangement is employed for each type of communication. In a non-buffered Put communication and a non-buffered Get communication, the alignment unit 34 rearranges indexes of communication data in such a manner that accesses to primary side data or secondary side data are as continuous as possible. In a buffered Put communication and a buffered Get communication, the alignment unit 34 rearranges indexes of communication data in such a manner that accesses to secondary side data are as continuous as possible and that accesses to lower indexes of primary side data are as rectangular as possible. In a buffered two-sided communication, the alignment unit 34 rearranges the indexes of two pieces of communication data in such a manner that accesses to lower indexes on the transmission side and reception side are as rectangular as possible. "Rectangular accesses" used herein are accesses for which subscripts are expressed by intervals, a combination of the three or scalar in a case when data that is an access target is expressed by subscript expressions of an array. Note that data that can be expressed by a subscript expression in an interval is continuous data in the embodiment.

The detection unit 35 detects a data unit that is common between the transmission side and the reception side in data communications between a plurality of nodes. A data unit that is common between the transmission and reception sides differs depending upon the type of communication. In a non-buffered Put communication and a non-buffered Get communication, the detection unit 35 detects, on the basis of information in the communication information table, a data unit that is continuous commonly between the primary side and the secondary side. In a buffered Put communication and a buffered Get communication, the detection unit 35 detects, on the basis of information in the communication information table, a data unit that is rectangular on the primary side and that is continuous on the secondary side. A rectangular data unit is an index range (referred to as a communication index range hereinafter in some cases) of communication data that is expressed by an interval, a combination of the three or scalar. In a buffered two-sided communication, the detection unit 35 detects a rectangular data unit that is common on the transmission and reception sides (referred to as a common rectangular data unit hereinafter in some cases) on the basis of information in the communication information table. Note that a data unit that is common on the primary and secondary sides may be over dimensions. Common rectangular data is data that is rectangular both on the primary and secondary sides.

The communication unit 36 conducts transmission and reception of data. Units of data transmission and reception differ depending upon the types of communications, and the communication unit 36 conducts transmission and reception of data in data units detected by the detection unit 35. As described above, by communicating data at one time in data units that are common on the transmission and reception sides, it is possible to increase the communication efficiency.

The buffer securing unit 37 secures a transmission buffer that corresponds to a node index on the reception side for a common rectangular data unit in a buffered two-sided communication. Also, the buffer securing unit 37 secures a reception buffer that corresponds to a node index on the transmission side for a common rectangular data unit. By securing buffers in accordance with common rectangular data units, it is possible to reduce the size of secured buffers to the minimum size that is used for a communication. Also, runtime overhead for avoiding buffer overflows does not occur while securing buffers. As a result of this, because buffers only for partner nodes with which a communication are actually conducted are secured even when the communication is conducted highly parallelly, it is possible to reduce the amount of memories used for buffer areas in respective nodes.

In a buffered Put communication, the buffer control unit 38 collects (packs) pieces of local data, corresponding to the rectangular data units, of the node of the buffer control unit 38 into a transmission buffer. Also, the buffer control unit 38 distributes (unpacks) pieces of data in the reception buffer to local data areas corresponding to the rectangular data units of the node of the buffer control unit 38. Further, in a buffered two-sided communication, the buffer control unit generates a code for collecting (packing) pieces of transmission data of common rectangular data units into a transmission buffer. Also, in a buffered two-sided communication, the buffer control unit 38 unpacks pieces of reception data of the common rectangular data units from the reception buffer. As described above, the buffer control unit 38 executes a packing process or an unpacking process on the basis of the continuity of data in a memory. Thereby, it is possible to increase the speed of a packing process or an unpacking process. Also, the buffer control unit 38 repeatedly executes a packing process and an unpacking process in data units in a communication data range that is not global but local. Accordingly, even when communications are conducted highly parallelly, it is possible to reduce the cost of unnecessarily repeated processes and determination (Non-Buffered Put Communication)

In a non-buffered Put communication according to the embodiment, communication data is transmitted from primary side node x to secondary side node y. A range in which pieces of data corresponding to each other between the primary side and the secondary side is treated as a communication data unit that is to be put at one time. Data is divided for each communication data unit, and a Put communication is conducted without using buffers on the primary side or the secondary side. As a communication data unit, interval Jcc that is commonly continuous for x and y is selected.

Figure 25:
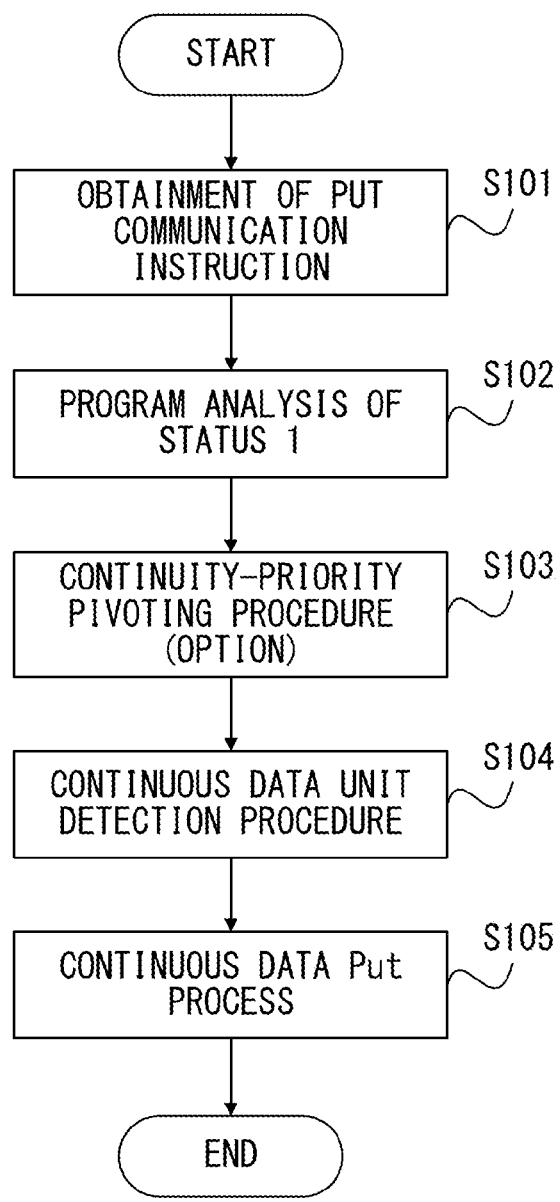
FIG. 25 illustrates an example of a flowchart that explains the process of a non-buffered Put communication according to the embodiment.

FIG. 25 illustrates an example of a flowchart that explains the process of a non-buffered Put communication according to the embodiment.

In FIG. 25, the obtainment unit 32 first receives an instruction of a Put communication (S101). This instruction of a Put communication is a program that expresses the communication in status 1. Specifically, this program is expressed in a form of for example substitution between global arrays.

Next, the analysis unit 33 conducts analysis of the status-1 program (S102). By conducting analysis of the status-1 program, the analysis unit 33 stores, in a communication information table, information related to the communication on which attention is focused. The analysis of the status-1 program and communication information tables will be explained later in detail.

Next, the alignment unit 34 executes the continuity-priority pivoting procedure (S103). By executing the continuity-priority pivoting procedure, the alignment unit 34 rearranges indexes of communication data so that accesses to the primary-side data or the secondary side data are as continuous as possible. The continuity-priority pivoting procedure will be explained later in detail. It is not always necessary to execute S103.

Next, the detection unit 35 executes a continuous data unit detection procedure (S104). The detection unit 35 detects the range (continuous data unit) of communication indexes that are continuous over dimensions of the primary side node of the detection unit 35 by conducting the continuous data unit detection procedure. Thereby, the detection unit 35 obtains lower index $Jc=(jc[1], \ldots, jc[Dc])$ and the number of dimensions $Dc(0 \leq Dc \leq D)$ of the continuous data unit. At the same time, the detection unit 35 obtains lower local index range $Ic=(ic[1], \ldots, ic[Uc])$ on the primary side and the number of dimensions $Uc(0 \leq Uc \leq U)$ that correspond to Jc and Dc. A different value is obtained for each node on the primary side by this procedure.

Next, the communication unit 36 executes a continuous-data Put process (S105). Specifically, the communication unit 36 repeatedly executes a process for each data unit that is continuous on the primary side.

FIG. 26 illustrates a detailed example of a continuous-data Put process. In FIG. 26, a continuous-data Put procedure is being executed in each loop. A continuous-data Put procedure will be explained later. The depth of the nest of this multiple loop is determined at the execution, and accordingly it may be implemented by using a recursive procedure call.

In FIG. 26, the communication unit 36 obtains jx1[d], jx2[d], jx3[d] ($Dc+1 \leq d \leq D$) from the communication information table. When there is no setting in this communication information table, the communication unit 36 repeatedly executes the process (u=DtoU[d]) for all jx[d] having jx[d] mapped onto the node of the communication unit 36, i.e., $gtop(f_u(jx[d]))$ identical to the u-th node index of the node of the communication unit 36.

When the execution of the continuous-data Put process has been completed, the process is terminated.

(Communication Information Table)

Next, explanations will be given for a communication information table. FIG. 27 through FIG. 30 illustrate examples (first through fourth) of configurations of a communication information table. Note that FIG. 27 through FIG. 30 may be treated as one communication information table. Also, the communication information tables are not limited to the form of a table as long as the correspondence relationships between the respective items are held.

In FIG. 27, the communication information table includes the following data items that are related to communication data. Specifically, the communication information table includes the number of dimensions D of communication data. Also, the communication information table includes dimension N[d], loop variable name j[d], dimension of corresponding primary side data u=DtoU[d] and dimension of corresponding secondary side data v=DtoV[d]. Also, the communication information table includes the following data items that are related to the primary side. Specifically, the communication information table includes the number of dimensions U of a primary side node array. Also, the communication information table includes the size of a global array, the allocation size of a local array, size X[u] of a node, a distribution type, a distribution parameter, global subscript expression k[u]=$f_u$, and dimension of corresponding communication data d=UtoD[u] for respective dimensions u=1, . . . , U of a primary side node array. Further, the communication information table includes a type ("scalar", "interval", "combination of the three" or "others") of a global subscript and global subscript combination-of-the-three parameters k1[u], k2[u], k3[u] for respective dimensions u=1, . . . , U of the primary side node array. Size X[v] of a node is the size of the v-th dimension of a primary side node array.

In FIG. 28, the communication information table include the following data items related to communication data. Specifically, the communication information table includes node index p. Also, the communication information table includes combination-of-the-three parameters jx1[d], jx2[d], jx3[d] that correspond to the self-node data for respective dimensions d=1, . . . , D of communication data.

In FIG. 29, the communication information table includes the following data items related to the primary side. Specifically, the communication information table includes node index p. Also, the communication information table includes the type of a local array subscript ("scalar", "interval", "combination of the three" or "others") for dimensions u=1, . . . , U of a primary side local array. Further, the communication information table includes fullSpan[u], local array subscript combination-of-the-three parameters i1[u], i2[u], i3[u] and global subscript combination-of-the-three parameters kx1[u], kx2[u], kx3[u] for dimensions u=1, . . . , U of a primary side local array. fullSpan[u] indicates whether or not a local array subscript covers the entire allocation size.

In FIG. 30, the communication information table includes the following data items related to the secondary side. Specifically, the communication information table includes number of dimensions V of a secondary side node array. Also, the communication information table includes the size of a global array, the allocation size of a local array of a node, size Y[v] of a node, a distribution type, a distribution parameter and global subscript expression k'[v]=$g_v$, for respective dimensions v=1, . . . , V of a secondary side node array. Further, the communication information table includes dimension d=VtoD[v] of corresponding communication data and a type ("scalar", "interval", "combination of the three" or "others") of a global subscript. Also the communication information table includes global subscript combination-of-the-three parameters k1'[v], k2'[v], k3'[v]. Size Y[v] of a node is the size of the v-th dimension of a secondary side node array.

The storage area information includes at least information for identifying data to which a communication target local array corresponds in a global array. Specifically, the storage area information at least includes for example size Y[v] of a node, a distribution type, and global subscript combination-of-the-three k1'[v], k2'[v], k3'[v] for dimensions v=1, . . . , V of a secondary-side node array. The process will be explained later specifically and in detail by referring to FIG. 73 through FIG. 79 as an example.

In the embodiment, the three parameters X1, X2 and X3 express the subscripts in a case when the types of the subscripts are "scalar", "interval" or "combination of the three". When the type is "combination of the three", it represents subscript combination-of-the-three X1:X2:X3. When the type is "interval", it represents an interval whose lower limit is X1 and whose upper limit is X2, and X3 does not have a meaning. When the type is "scalar", it represents scalar value X1, and X2 and X3 do not have a meaning.

(Analysis of Status-1 Program)

First, explanations will be given for analysis of the status-1 program. In analysis of the status-1 program, a process is conducted for storing, in a communication information table, information related to a communication on which attention is focused. The analysis unit 33 conducts analysis of the status-1 program by using, as inputs, a program that describes the communication in status 1 obtained by the obtainment unit 32. Note that in the analysis of status-1 program, the transmission node and the reception node are treated as the primary side and the secondary side, respectively.

FIG. 31 through FIG. 33 illustrate examples (first through third) of an algorithm for analyzing the state-1 program. The analysis unit 33 executes the process of the analysis algorithm of the state-1 program illustrated in FIG. 31 through FIG. 33 so as to obtain a communication information table that has stored information related to a communication on which attention is focused.

(Continuity-Priority Pivoting Procedure)

Next, a continuity-priority pivoting procedure will be explained. The alignment unit 34 starts the process of the continuity-priority pivoting procedure by using, as inputs, information indicating which of the primary and secondary sides is to be given priority and the communication information table.

As an output of the continuity-priority pivoting procedure, the alignment unit 34 obtains a communication information table in which the D pieces of communication data have been sorted. Specifically, in a communication information table to be output, D pieces of communication data have been sorted so that pieces of local data that have been given priority are accessed in ascending order as often as possible and the values of conversion tables UtoD and VtoD are also converted so that they correspond to the sorted pieces.

In the continuity-priority pivoting procedure, the alignment unit 34 first conducts sorting so that items N, j, DtoU, DtoV, jx1, jx2, jx3 for communication data dimension d in the communication information table are in the ascending order by using the values in DtoU when the priority has been given to the primary side and by using the values in DtoV when the priority has been given to the secondary side. When the value of the key is zero or a negative number, which means that there is no data dimension that corresponds in a one-to-one manner, the alignment unit 34 treats that key as a key of a high value and moves the key to the tail. Then, the alignment unit 34 generates old and new tables that represent how position d has changed between before and after the sorting.

Then, the alignment unit 34 refers the generated old and new tables and changes values d in UtoD and VtoD to new values.

(Continuous Data Unit Detection Procedure)

Next, explanations will be given for a continuous data unit detection procedure. The detection unit 35 executes a continuous data unit detection procedure by using the communication information table as an input.

FIG. 34 illustrates an example of an algorithm of a continuous data unit detection procedure. The detection unit 35 executes the process of the algorithm of the continuous data unit detection procedure illustrated in FIG. 34, and thereby obtains the following pieces of information as outputs. Specifically, the detection unit 35 obtains local index range Ic=(ic[1], . . . , ic[Uc]) in which the primary side data is continuous over dimensions and the number of dimensions Uc(0≤Uc≤U) of Ic as outputs of the continuous data unit detection procedure. Further, the detection unit 35 obtains a continuous data unit, i.e., communication data index range Jc=(jc[1], . . . , jc[Dc]) that corresponds to Ic, the number of dimensions Dc(0≤Dc≤D, Dc≤Uc) of Jc and size Lc of Ic. In this example, ic[u] is scalar ic1[u] or interval ic1[u]:ic2[u] (1≤u≤Uc).

A result of the continuous data unit detection procedure is a result of determination for each node. In other words, a different output value (returned value) may be obtained for each node.

(Continuous Data Unit Put Procedure)

Next, explanations will be given for a continuous data unit Put procedure. The communication unit 36 starts the continuous data unit Put procedure by using, as inputs, a continuous data unit list (also referred to as Jc-list hereinafter), the number of continuous dimensions Dc(0≤Dc≤D) of Jc and a communication information table.

A Jc-list is a list of continuous data units Jc (the initial state has a single element). In each Jc, subscripts are expressed by scalar, an interval or a combination of the three jc[d]=jc1[d]:jc2[d]:jc3[d] (1≤d≤Dc) for a lower Dc dimension, and higher dimension jc[d] (Dc+1≤d≤D) is scalar. In each Jc, primary side data is continuous over dimensions in the arrangement order of array elements, and the primary side data is continuous between Jcs in the arrangement order.

FIG. 35 illustrates an example of an algorithm of the continuous data unit Put procedure. By executing the algorithm illustrated in FIG. 35, the communication unit 36 conducts a Put communication on all Jcs included in Jc-list.

Figure 36:
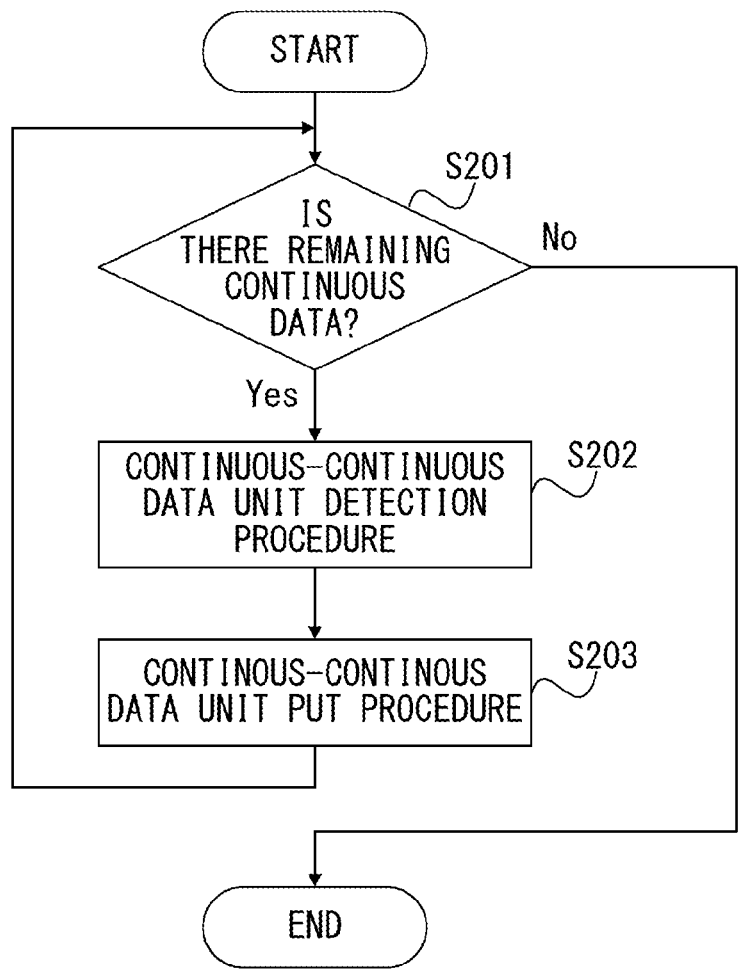
FIG. 36 illustrates an example of a flowchart that explains the process of the continuous data unit Put procedure.

FIG. 36 illustrates an example of a flowchart that explains the process of the continuous data unit Put procedure. In FIG. 36, the communication unit 36 first determines whether or not there exists continuous data that has not been processed in the continuous data unit Put procedure (S201). Specifically, the communication unit 36 determines whether or not Jc-list is vacant. When it has been determined that there does not exist continuous data that has not been processed (NO in S201), the process is terminated.

When it has been determined by the communication unit 36 that there exists continuous data that has not been processed (YES in S201), the detection unit 35 executes a continuous-continuous data unit detection procedure (S202). Through the continuous-continuous data unit detection procedure, the detection unit 35 detects a data unit that is commonly continuous on the primary side and the secondary side. Specifically, the detection unit 35 obtains partial array Jcc of Jc that has the same origination as Jc and that is continuous over dimensions both on the primary side and the secondary side, and also obtains the number of dimensions of the communication data (continuous-continuous dimension) Dcc (0≤Dcc≤Dc). At the same time, the detection unit 35 obtains partial Jcr-list, which is a result of removing Jcc from Jc. The continuous-continuous data unit detection procedure will be explained later in detail.

Next, the communication unit 36 executes the continuous-continuous data unit Put procedure (S203). In this example, the communication unit 36 treats Jcc as a communication data unit. Through the continuous-continuous data unit Put procedure, the communication unit 36 puts a communication data unit from the primary side to the secondary side. Specifically, the communication unit 36 puts data from the primary side to the secondary side in units of data that is continuous commonly on the transmission side and the reception side. Thereby, it is possible to increase the efficiency in communications. The continuous-continuous data unit Put procedure will be explained later in detail.

Next, the communication unit 36 adds Jcr-list to the top of Jc-list. Then, the communication unit 36 again executes the process in S201.

(Continuous-Continuous Data Unit Detection Procedure)

Next, explanations will be given for a continuous-continuous data unit detection procedure. The detection unit 35 starts the process of the continuous-continuous data unit detection procedure by using, as inputs, continuous data unit Jc=(jc[1], . . . , jc[D]), the number of continuous dimensions Dc(0≤Dc≤D) of Jc and a communication information table. In this example, continuous data unit Jc is a communication data index range in which the corresponding primary side data is continuous over dimensions.

FIG. 37 and FIG. 38 illustrate examples of algorithms of the continuous-continuous data unit detection procedure (first and second). By executing the algorithms of the continuous-continuous data unit detection procedure illustrated in FIG. 37 and FIG. 38, the detection unit 35 obtains the following information as output. Specifically, the detection unit 35 obtains continuous-continuous data unit Jcc=(jcc[1], . . . , jcc[D]), continuous-continuous data unit residual list Jcr-list=( ) or (Jcr), and length Lcc of the continuous-continuous data unit. Further, the detection unit 35 obtains continuous-continuous data unit number of dimensions Dcc of communication data, secondary side node index ycc=(ycc[1], . . . , ycc[V]), and secondary side local index origination Icc1'=(icc1'[1], . . . , icc1'[V]).

Continuous-continuous data unit Jcc=(jcc[1], . . . , jcc[D]) is a partial array of Jc, shares origination (jc1[1], . . . , jc1[D]), and is an index range in which pieces of local data on the corresponding primary side and the secondary side are both continuous. Local data on the corresponding secondary side may be continuous over dimensions. However, local data on the corresponding secondary side is not over a plurality of secondary side nodes. jcc[d] is expressed by scaler jcc1[d], an interval or a combination of the three jcc1[d]:jcc2[d]:jcc3[d] (1≤d≤Dc).

Dimension Dcc (1≤Dcc≤Dc) exists and jcc1[d]=jc1[d], jcc2[d]=jc2[d], jcc3[d]=jc3[d] are satisfied when d<Dcc is satisfied. Also, when d=Dcc is satisfied, jcc1[d]=jc1[d], jc1[d]≤jcc2[d]≤jc2[d], jcc3[d]=jc3[d] are satisfied. Also, when d>Dcc is satisfied, jcc[d] is scalar and jcc1[d]=jc1[d] is satisfied.

Continuous-continuous data unit residual list Jcr-list=( ) or (Jcr) is a portion remaining after removing Jcc from Jc. The number of elements of continuous-continuous data unit residual list Jcr-list=( ) or (Jcr) is zero or one.

Figure 39:
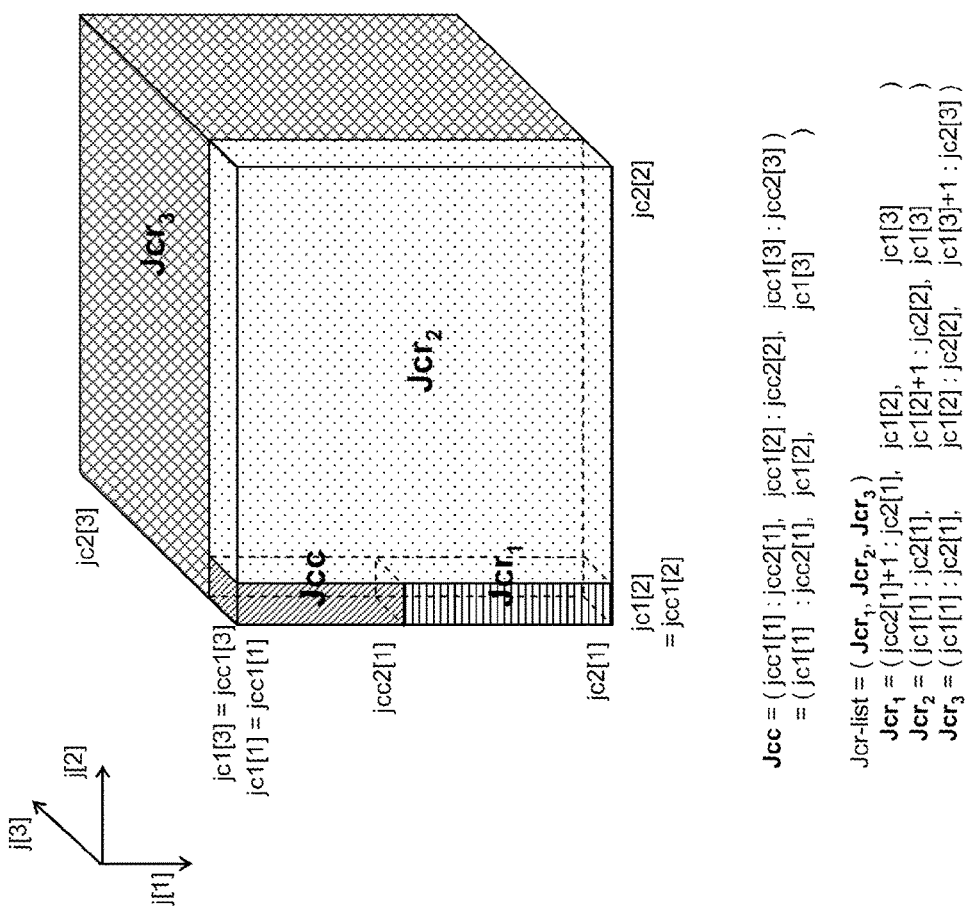
FIG. 39 illustrates the process of obtaining Jcr-list.

FIG. 39 illustrates the process of "4. Obtain Jcr-list" in FIG. 38. FIG. 39 illustrates a case where jc3[1]=jc3[2]=jc3[3]=1 is satisfied when Dc=3, Dcc=1 are satisfied, and three multidimensional rectangles that are to generate a communication next are set in Jcr-list by repeating dd=1 through 3.

(Continuous-Continuous Data Unit Put Procedure)

Next, explanations will be given for a continuous-continuous data unit Put procedure. The communication unit 36 starts the process of the continuous-continuous data unit Put procedure by using the following data items as inputs. The inputs are communication data unit Jcc=(jcc[1], . . . , jcc[D]), the number of continuous-continuous dimensions Dcc and secondary side (reception side) node index ycc= (ycc[1], . . . , ycc[V]). In addition to these, the inputs are the origination of secondary side local index icc1'= (icc1'[1], . . . , icc1'[V]), length Lcc of a communication data unit, and a communication information table.

FIG. 40 illustrates an example of a continuous-continuous data unit Put procedure algorithm. By executing the process of the algorithm illustrated in FIG. 40, the communication unit 36 puts data from a primary node to a secondary node in continuous-continuous data units.

(Buffered Put Communication)

In a buffered Put communication according to the present embodiment, communication data is transmitted from primary side node x to secondary side node y. A communication data unit, which is put at one time, is a range in which highly efficient buffering is possible on the primary side and data is continuous on the secondary side. Data is divided for each communication data unit, and receives Put communications via buffering on the primary side and not via buffering on the secondary side. As communication data units, an area expressed by a combination of the three is selected on the primary side and Jtc, which is a continuous area, is selected on the secondary side.

Figure 41:
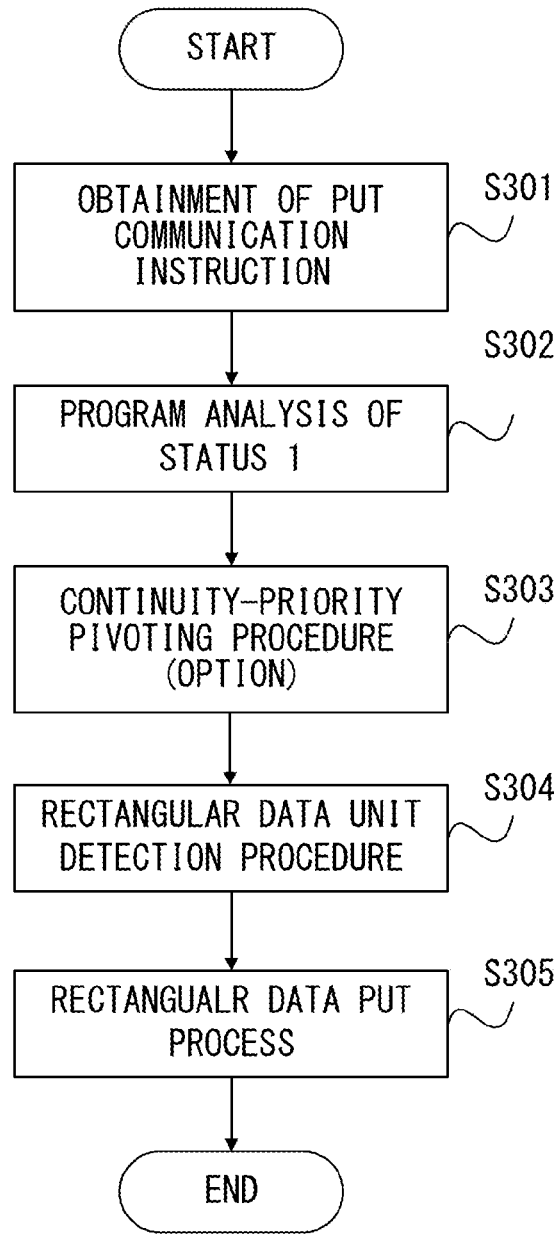
FIG. 41 is an example of a flowchart that explains the process of a buffered Put communication according to the embodiment.

FIG. 41 is an example of a flowchart that explains processes of a buffered Put communication according to the present embodiment.

In FIG. 41, the obtainment unit 32 first receives an instruction of a Put communication (S301). This instruction of a Put communication is a program that expresses a communication in status 1. Specifically, this program is expressed in a form of for example substitution between global arrays.

Next, the analysis unit 33 conducts analysis of the status-1 program (S302). By conducting analysis of the status-1 program, the analysis unit 33 stores, in a communication information table, information related to the communication on which attention is focused. The analysis of the status-1 program is similar to the explanations given for the non-buffered Put communication according to the present embodiment.

Next, the alignment unit 34 executes the continuity-priority pivoting procedure (S303). By executing the continuity-priority pivoting procedure, the alignment unit 34 rearranges indexes of communication data so that accesses to the secondary side data are as continuous as possible and accesses to lower indexes of primary side data are as rectangular as possible. Note that the alignment unit 34 may rearrange indexes of communication data preferentially. Also, it is not always necessary to execute S303. This continuity-priority pivoting procedure is similar to the explanations given for the non-buffered Put communication according to the present embodiment.

Next, the detection unit 35 executes a rectangular data unit detection procedure (S304). The detection unit 35 detects the range (rectangular data unit) of communication indexes that can be expressed by a combination of the three or scalar in the node of the detection unit 35 on the primary side. Thereby, the detection unit 35 obtains lower index Jt=(jt[1], . . . , jt[Dt]) and the number of dimensions Dt(0≤Dt≤D) of the rectangular data unit. At the same time, the detection unit 35 obtains lower local index range It=(it[1], . . . , it[Ut]) and the number of dimensions Ut (0≤Ut≤U), on the primary side, that correspond to Jt and Dt. By this procedure, a different value is obtained for each node on the primary side.

Next, the communication unit 36 executes a rectangular data Put communication (S305). Specifically, the communication unit 36 repeatedly executes a process for each rectangular data unit. FIG. 42 illustrates an example of a rectangular data Put communication. In FIG. 42, in each loop, a rectangular data unit Put procedure is being executed. The rectangular data unit Put procedure will be explained later. The depth of the nest of this multiple loop is determined at the execution, and accordingly it may be implemented by using a recursive procedure call.

In FIG. 42, the communication unit 36 obtains jx1[d], jx2[d], jx3[d] (Dt+1≤d≤D) from the communication information table. When there is no setting in this communication information table, the communication unit 36 repeatedly executes the process (u=DtoU[d]) for all jx[d] having jx[d] mapped onto the node of the communication unit 36, i.e., gtop($f_u$(jx[d])) identical to the u-th node index of the node of the communication unit 36.

When the execution of the rectangular data process has been completed, the process is terminated.

(Rectangular Data Unit Detection Procedure)

Next, explanations will be given for a rectangular data unit detection procedure. The detection unit 35 starts the process of the rectangular data unit detection procedure by using a communication information table as an input.

FIG. 43 illustrates an example of an algorithm of the rectangular data unit detection procedure. The detection unit 35 executes the process of the algorithm of the rectangular data unit detection procedure illustrated in FIG. 43, and thereby obtains the following pieces of information as outputs. Specifically, the detection unit 35 obtains local index range It=(it[1], . . . , it[Ut]) in which the primary side data is rectangular and the number of dimensions Ut(0≤Ut≤U) of It, as outputs of the rectangular data unit detection procedure. Further, the detection unit 35 obtains a rectangular data unit, i.e., communication data index range Jt=(jt[1], . . . , jt[Dt]) that corresponds to It, the number of dimensions Dt(0≤Dt≤D) of Jt and size Lt of It. In this example, it[u] is scalar it[u], interval or a combination of the three it1[u]:it2[u]:it3[u] (1≤u≤Ut).

A result of the rectangular data unit detection procedure is a result of determination for each node. In other words, a different output value (returned value) may be obtained for each node.

(Rectangular Data Unit Put Procedure)

Next, explanations will be given for a rectangular data unit Put procedure. The communication unit 36 starts the rectangular data unit Put procedure by using, as inputs, a rectangular data unit list (also referred to as Jt-list hereinafter), the number of rectangular dimensions Dt(0≤Dt≤D) of Jt and a communication information table.

Jt-list, serving as an input, is a list of rectangular data units Jt in the rectangular data unit Put procedure (the initial state has a single element). In each Jt, subscripts are expressed by scalar, an interval or a combination of the three jt[d]=jt1[d]: jt2[d]:jt3[d] (1≤d≤Dt) for a lower Dt dimension, and higher dimension jt[d] (Dt+1≤d×D) is scalar.

FIG. 44 illustrates an example of an algorithm of the rectangular data unit Put procedure. By executing the rectangular data unit Put procedure illustrated in FIG. 44, the communication unit 36 conducts a Put communication on all Jts included in Jt-list.

Figure 45:
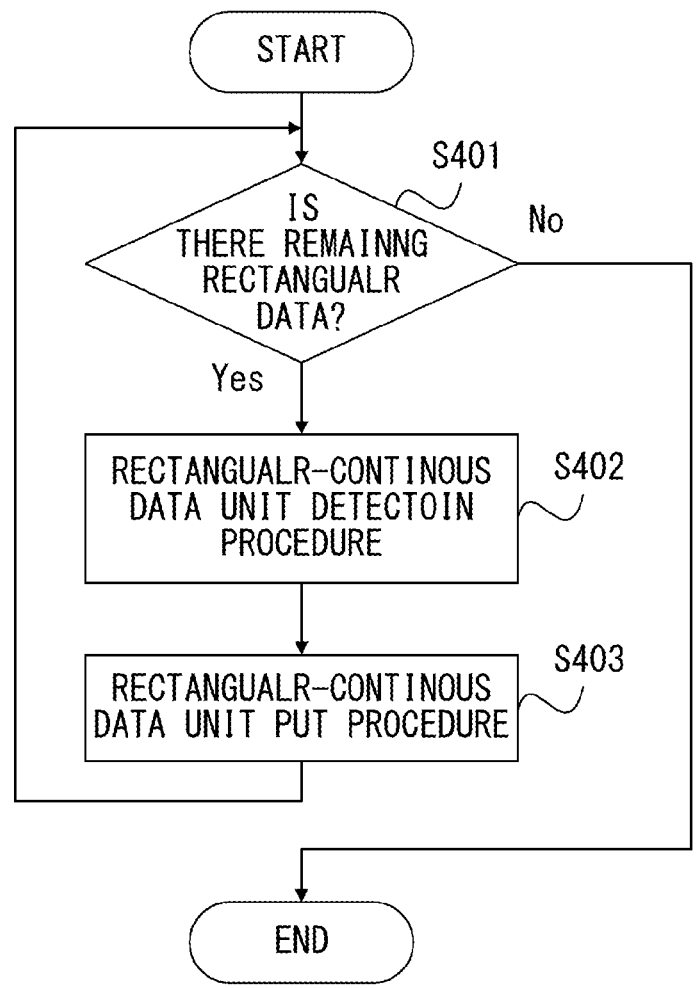
FIG. 45 illustrates an example of a flowchart that explains the process of the rectangular data unit Put procedure.

FIG. 45 illustrates an example of a flowchart that explains the process of the rectangular data unit Put procedure. In FIG. 45, the communication unit 36 first determines whether or not there exists rectangular data that has not been processed in the rectangular data unit Put procedure (S401). Specifically, the communication unit 36 determines whether or not Jt-list is vacant. When it has been determined that there does not exist rectangular data that has not been processed (NO in S401), the process is terminated.

When it has been determined by the communication unit that there exists rectangular data that has not been processed (YES in S401), the detection unit 35 executes an element of Jt-list from the top of Jt-list, and treats it as Jt. The detection unit 35 executes a rectangular-continuous data unit detection procedure on extracted Jt (S402). Through the rectangular-continuous data unit detection procedure, the detection unit 35 detects a data unit that is rectangular on the primary side and is continuous on the secondary side. Specifically, the detection unit 35 obtains partial array Jtc of Jt that has the same origination as Jt and that is continuous over dimensions on the secondary side, and also obtains the number of dimensions of the communication data (rectangular-continuous dimension) Dtc(0≤Dtc≤Dt). At the same time, the detection unit 35 obtains partial Jtr-list, which is a result of removing Jtc from Jt. The rectangular-continuous data unit detection procedure will be explained later in detail.

Next, the communication unit 36 executes the rectangular-continuous data unit Put procedure (S403). In this example, the communication unit 36 treats Jtc as a communication data unit. Through the rectangular-continuous data unit put procedure, the communication unit 36 buffers data on the primary side. Thereafter, the communication unit 36 puts data to the secondary side in units of communication data from the buffer. The communication unit 36 detects continuous interval on the secondary side in advance and conducts simple memory copying between the area having stored the data and the buffer, making it possible to increase efficiency in communications. Also, the communication unit 36 puts data from the primary side to the secondary side in units of data that is continuous on the reception side. Thereby, it is possible to transmit data of a large size in one communication, increasing the efficiency in communications. The rectangular-continuous data unit Put procedure will be explained later in detail.

Next, the communication unit 36 adds Jtr-list to the top of Jt-list. Then, the communication unit 36 again executes the process in S401.

(Rectangular-Continuous Data Unit Detection Procedure)

Next, explanations will be given for a rectangular-continuous data unit detection procedure. The detection unit 35 starts the process of the rectangular-continuous data unit detection procedure by using, as inputs, rectangular data unit Jt=(jt[1], . . . , jt[D]), the number of dimensions Dt(0≤Dt≤D) of Jt, higher index of Jt (jt[Dt+1], . . . , jt[D]) and the communication information table. In this example, rectangular data unit Jt is a communication index range in which the corresponding primary side data is expressed by an interval, a combination of the three or scalar.

FIG. 46 and FIG. 47 illustrate examples of algorithms of the rectangular-continuous data unit detection procedure (first and second). By executing the rectangular-continuous data unit detection procedure illustrated in FIG. 46 and FIG. 47, the detection unit 35 obtains the following information as the output. Specifically, the detection unit 35 obtains rectangular-continuous data unit Jtc=(jtc[1], . . . , jtc[D]), rectangular-continuous data unit residual list Jtr-list, and a length Ltc of the rectangular-continuous data unit. Further, the detection unit 35 obtains the rectangular-continuous data unit number of dimensions Dtc of communication data, a secondary side node index ytc=(ytc[1], . . . , ytc[V]), and secondary side local index origination Itc1'=(itc1'[1], . . . , itc1'[V]).

Rectangular-continuous data unit Jtc=(jtc[1], . . . , jtc[D]) is a partial array of Jt, shares an origination (jt1[1], . . . , jt1[D]), and is an index range in which pieces of local data in the corresponding primary side node and the secondary side node are both continuous. Local data on the corresponding secondary side may be continuous over different dimensions. However, local data on the corresponding secondary side is not over a plurality of secondary side nodes. jcc[d] is expressed by scaler jcc1[d], an interval or a combination of the three jcc1[d]:jcc2[d]:jcc3[d] (1≤d≤Dc).

Dimension Dtc(1≤Dtc≤Dt) exists and jtc1[d]=jt1[d], jtc2[d]=jt2[d], jtc3[d]=jt3[d] are satisfied when d<Dtc. Also, when d=Dtc, jtc1[d]=jt1[d], jt1[d]≤jtc2[d]≤jt2[d], jtc3[d] is a multiple of jt3[d]. Also, when d>Dtc, jtc[d] is scalar and jtc1[d]=jt1[d] is satisfied.

Rectangular-continuous data unit residual list Jtr-list is a portion remaining after removing Jtc from Jt. The number of elements of rectangular-continuous data unit residual list Jtr-list is equal to or greater than zero.

(Rectangular-Continuous Data Unit Put Procedure)

Next, explanations will be given for a rectangular-continuous data unit Put procedure. The communication unit 36 starts the process of the rectangular-continuous data unit Put procedure by using the following data items as inputs. The inputs are communication data unit Jtc=(jtc[1], . . . , jtc[D]), the number of rectangular-continuous dimensions Dtc and a secondary side (reception side) node index ytc=(ytc[1], . . . , ytc[DtoV[Dtc]]). In addition to these, the inputs are the origination of secondary side local index itc1'=(itc1'[1], . . . , itc1'[DtoV[Dtc]]), the length Ltc of a communication data unit, and a communication information table.

In the rectangular-continuous data unit Put procedure, the communication unit 36 puts data from the primary side node to the secondary side node in units of rectangular-continuous data. FIG. 48 illustrates an example of a flowchart explaining the process of the rectangular-continuous data unit Put procedure.

In FIG. 48, the communication unit 36 first obtains a secondary side node index and higher indexes of an origination of the secondary side local index (S411). In other words, the communication unit 36 obtains higher indexes of ytc and itc1'. Specifically, the communication unit 36 executes the following processes on all of v=DtoV[Dtc]+1, . . . , V.

$$ytc[v]=gtop_B(g_v(jtc1))$$

$$itc1'[v]=gtol_B(g_v(jtc1))$$

Next, the buffer securing unit 37 secures transmission buffer SendBuf of a length Ltc (S412). Next, the buffer control unit 38 collects, to SendBuf, pieces of primary side local data that corresponds to Jtc by using the rectangular data unit pack procedure (S413). The rectangular data unit pack procedure will be explained later in detail.

Next, the communication unit 36 uses an MPI library etc. so as to put continuous data, having a length Ltc, from the top of SendBuf to a continuous area from b(itc1') of node ytc.

Next, the buffer securing unit 37 release the area of the transmission buffer SendBuf secured in S412 (S415). Then, the process is terminated.

(Rectangular Data Unit Pack Procedure)

Next, a rectangular data unit pack procedure will be explained. The buffer control unit 38 starts the process of the rectangular data unit pack procedure by using the following data items as inputs. The inputs are rectangular data unit Jt=(jt[1], . . . , jt[Dt]), the number of rectangular dimensions Dt, a higher order (jt[Dt+1], . . . , jt[D]), the initial address of transmission buffer SendBuf and a communication information table. However, rectangular data unit Jt=(jt[1], . . . , jt[Dt]) in which each dimension can be expressed by the combination-of-the-three parameter corresponds to one transmission destination node.

FIG. 49 illustrates an example of an algorithm of the rectangular data unit pack procedure. By executing the rectangular data unit pack procedure illustrated in FIG. 49, the buffer control unit 38 collects (packs) pieces of local data, corresponding to the rectangular data units, of the node of the buffer control unit 38 into a transmission buffer. Also, the buffer control unit 38 has executed memory copying that has taken into consideration the continuity of local data, making it possible to increase the speed of the packing process. Also, in FIG. 49, the buffer control unit 38 executes the packing process on the primary side data repeatedly for each continuous interval having the length Lc, making it possible to increase the speed of the packing process.

(Non-Buffered Get Communication)

In a non-buffered Get communication according to the embodiment, primary side node x receives data from secondary side node y. A range in which pieces of data corresponding to each other between the primary side and the secondary side is treated as a communication data unit that is to be got at one time. Data is divided for each communication data unit, and a Get communication is conducted without using buffers on the primary side or the secondary side. As a communication data unit, interval Jcc that is commonly continuous for x and y is used.

Figure 50:
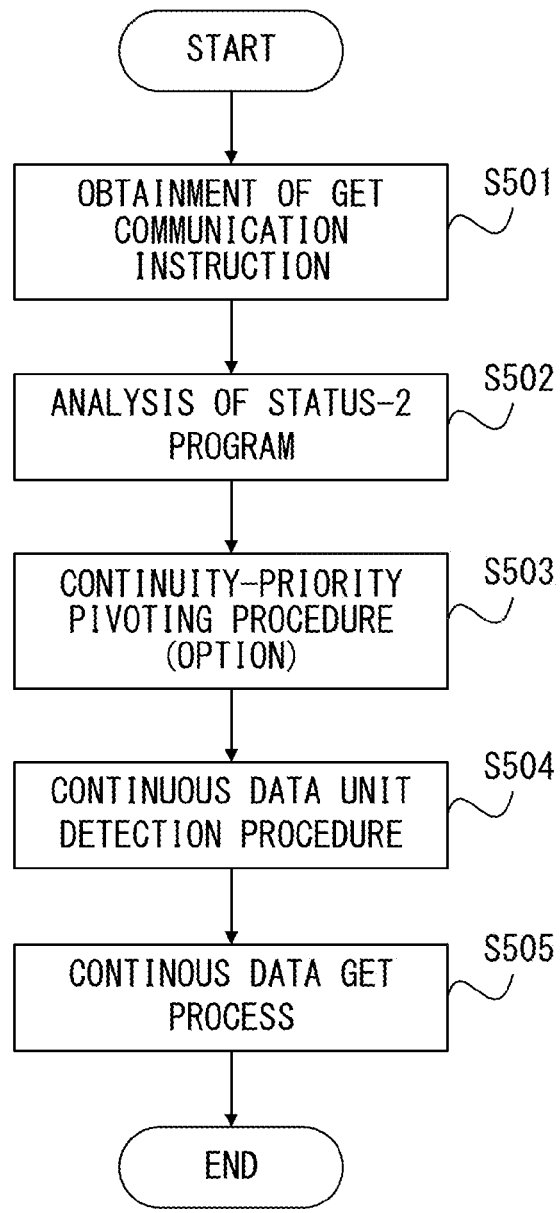
FIG. 50 illustrates an example of a flowchart that explains the process of a non-buffered Get communication according to the embodiment.

FIG. 50 illustrates an example of a flowchart that explains the process of a non-buffered Get communication according to the embodiment.

In FIG. 50, the obtainment unit 32 first receives an instruction of a Get communication (S501). This instruction of a Get communication is a program that expresses the communication in status 2. Specifically, this program is expressed in a form of for example substitution between global arrays.

Next, the analysis unit 33 conducts analysis of the status-2 program (S502). By conducting analysis of the status-2 program, the analysis unit 33 stores, in a communication information table, information related to the communication on which attention is focused. The analysis of the status-2 program will be explained later in detail.

Next, the alignment unit 34 executes the continuity-priority pivoting procedure (S503). By executing the continuity-priority pivoting procedure, the alignment unit 34 rearranges indexes of communication data so that accesses to the primary-side data or the secondary side data are as continuous as possible. Also, it is not always necessary to execute S303. The continuity-priority pivoting procedure is similar to the explanations given for the non-buffered Put communication according to the present embodiment.

Next, the alignment unit 34 executes the continuity-priority pivoting procedure (S503). By executing the continuity-priority pivoting procedure, the detection unit 35 detects a communication index range (continuous data unit) that is continuous over dimensions in the primary side self node. Thereby, the detection unit 35 obtains lower index Jc=(jc[1], . . . , jc[Dc]) and the number of dimensions Dc($0 \leq Dc \leq D$) of a continuous data unit. At the same time, the detection unit 35 obtains lower local index range Ic=(ic[1], . . . , ic[Uc]) and the number of dimensions Uc($0 \leq Uc \leq U$) that correspond to Jc and Dc. By this procedure, a different value is obtained for each node on the primary side. This continuous data unit detection procedure is similar to the explanations given for the non-buffered Put communication according to the embodiment.

Next, the communication unit 36 executes a continuous data Get procedure (S505). Specifically, the communication unit 36 repeatedly executes the process for each data unit that is continuous on the primary side. FIG. 51 illustrates a detailed example of the continuous data Get procedure. In FIG. 51, in each loop, a continuous data Get procedure is being executed. The continuous data unit Get procedure will be explained later. The depth of the nest of this multiple loop is determined at the execution, and accordingly it may be implemented by using a recursive procedure call.

In FIG. 51, the communication unit 36 obtains jx1[d], jx2[d], jx3[d] (Dc+$1 \leq d \leq D$) from the communication information table. When there is no setting in this communication information table, the communication unit 36 repeatedly executes the process (u=DtoU[d]) for all jx[d] having jx[d] mapped onto the node of the communication unit 36, i.e., gtop($f_u$(jx[d])) identical to the u-th node index of the node of the communication unit 36.

When the execution of the get process has been completed, the process is terminated.

(Analysis of Status-2 Program)

First, explanations will be given for analysis of the status-2 program. In analysis of the status-2 program, a process is conducted for storing, in a communication information table, information related to a communication on which attention is focused. The analysis unit 33 conducts analysis of the status-2 program by using, as an input, a program that describes the communication in status 1 obtained by the obtainment unit 32. Note that in the analysis of status-2 program, the reception node and the transmission node are treated as the primary side and the secondary side, respectively.

As an output of the analysis of the status-2 program, the analysis unit 33 obtains a communication information table that has stored information related to a communication on which attention is focused.

The algorithm of the analysis of the status-2 program is similar to the algorithm of the analysis of the status-1 program, which was explained by referring to FIG. 31 and FIG. 32. However, the reception node and the transmission node are treated as the primary side and the secondary side, respectively.

(Communication Data Unit Get Procedure)

The continuous data unit Get procedure will be explained. The communication unit 36 starts the process of the continuous data unit Get procedure by using, as inputs, communication data unit list Jc-list, the number of continuous dimensions of Jc Dc($0 \leq Dc \leq D$) and a communication information table.

Jc-list is a list of continuous data units Jc (the initial state has a single element). In each Jc, subscripts are expressed by a combination of the three jc[d]=jc1[d]:jc2[d]:jc3[d] ($1 \leq d \leq Dc$) for a lower Dc dimension, and higher dimension jc[d] (Dc+$1 \leq d \leq D$) is scalar. In each Jc, primary side data is continuous over different dimensions in the arrangement order of array elements, and the primary side data is continuous between Jcs in the arrangement order.

FIG. 52 illustrates an example of an algorithm of the continuous data unit Get procedure. By executing the continuous data unit Get procedure illustrated in FIG. 52, the communication unit 36 conducts a Get communication on all Jcs included in Jc-list.

Figure 53:
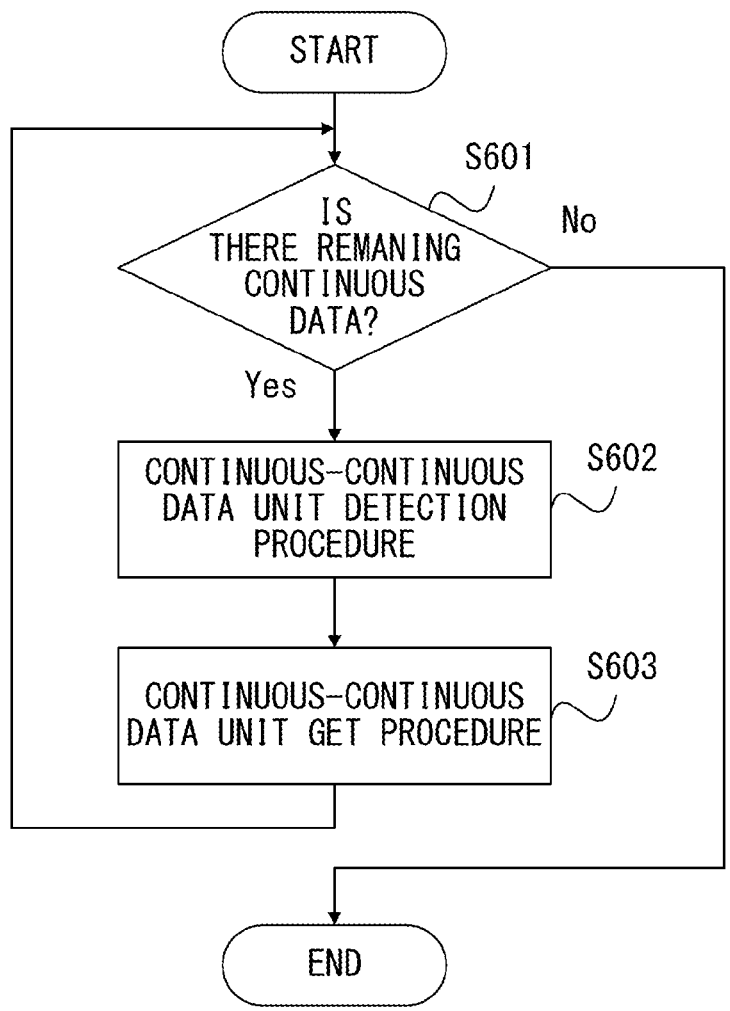
FIG. 53 illustrates an example of a flowchart that explains the process of the continuous data unit Get procedure.

FIG. 53 illustrates an example of a flowchart that explains the process of the continuous data unit Get procedure. In FIG. 53, the communication unit 36 first determines whether or not there exists continuous data that has not been processed in the continuous data unit Get procedure (S601). Specifically, the communication unit 36 determines whether or not Jc-list is vacant. When it has been determined that there does not exist continuous data that has not been processed (NO in S601), the process is terminated.

When it has been determined by the communication unit 36 that there exists continuous data that has not been processed (YES in S601), the detection unit 35 executes a continuous-continuous data unit detection procedure (S602). Through the continuous-continuous data unit detection procedure, the detection unit 35 detects a data unit that is commonly continuous on the primary side and the secondary side. Specifically, the detection unit 35 obtains partial array Jcc of Jc that has the same origination as Jc and that is continuous over dimensions both on the primary side and the secondary side, and also obtains the number of dimensions of the communication data (continuous-continuous dimension) Dcc ($0 \leq Dcc \leq Dc$). At the same time, the detection unit 35 obtains partial Jcr-list, which is a result of removing Jcc from Jc. This continuous-continuous data unit detection procedure is similar to the explanations given for the non-buffered Put communication according to the embodiment.

Next, the communication unit 36 executes the continuity-priority data unit Get procedure (S603). In this example, the communication unit 36 treats Jcc as a communication data unit. Through the continuous-continuous data unit Get procedure, the communication unit 36 gets a communication data unit from the secondary side to the primary side. Specifically, the communication unit 36 gets data from the secondary side to the primary side in units of data that is continuous commonly on the transmission side and the reception side. Thereby, it is possible to increase the efficiency in communications. The continuous-continuous data unit Get procedure will be explained later in detail.

Next, the communication unit 36 adds Jcr-list to the top of Jc-list. Then, the communication unit 36 again executes the process in S601.

(Continuous-Continuous Data Unit Get Procedure)

Next, explanations will be given for a continuous-continuous data unit Get procedure. The communication unit 36 starts the process of the continuous-continuous data unit Get procedure by using the following data items as inputs. The inputs are communication data unit Jcc=(jcc[1], . . . , jcc[D]), the number of continuous-continuous dimensions Dcc and secondary side (reception side) node index ycc=(ycc[1], . . . , ycc[V]). In addition to these, the inputs are the origination of secondary side local index icc1'=(icc1'[1], . . . , icc1'[V]), length Lcc of a communication data unit and a communication information table.

In the continuous-continuous data unit Get procedure, the communication unit 36 gets data from the secondary node to the primary node in units of data that is commonly continuous in the transmission side and the reception side.

FIG. 54 illustrates an example of the algorithm of the continuous-continuous data unit Get procedure. The communication unit 36 first obtains the origination icc1=(icc1[1], . . . , icc1[U]) of a primary side local index that corresponds to Jcc. Specifically, the communication unit 36 executes the following processes on all u=1, . . . , DtoU[Dcc].

$d = UtoD[u]$ $icc1[u] = i1[u] + jcc1[U]*i3[u]$

Next, the communication unit 36 executes the following processes on all u=DtoU[Dcc]+1, . . . , U.

$icc1[u] = gtol_A(f_u(jcc1))$

In the above manner, when the origination icc1 of the primary side local index, the communication unit 36 uses an MPI library etc. and gets continuous data, having length Lcc, from an array element b(icc1') of node ycc to a continuous area from an array element a(icc1) of the node of the communication unit 36. Then, the process is terminated.

(Buffered Get Communication)

In a buffered Get communication according to the embodiment, primary side node x receives data from secondary side node y. A range in which pieces of data corresponding to each other between the primary side and the secondary side is treated as a communication data unit that is to be got at one time. Data is divided for each communication data unit, and a Get communication is conducted without using buffers on the primary side or the secondary side. As communication data units, an area that can be expressed by a combination of the three is selected on the primary side and area Jtc, which is continuous, is selected on the secondary side.

Figure 55:
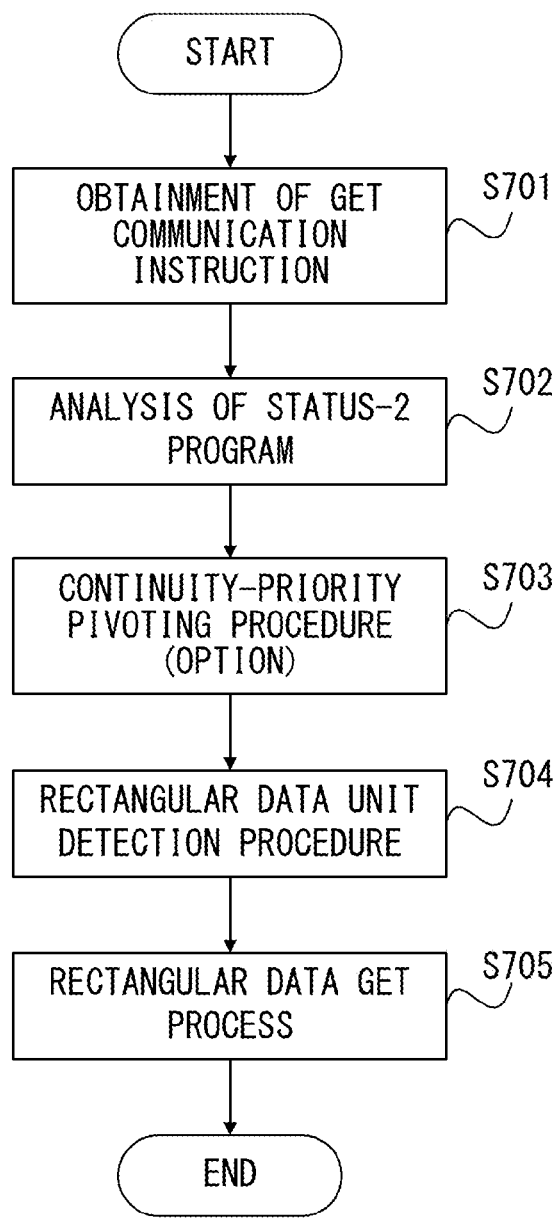
FIG. 55 illustrates an example of a flowchart that explains the process of a buffered Get communication according to the embodiment.

FIG. 55 illustrates an example of a flowchart that explains the process of a buffered Get communication according to the embodiment.

In FIG. 55, the obtainment unit 32 first receives an instruction of a Get communication (S701). This instruction of a Get communication is a program that expresses the communication in status 2. Specifically, this program is expressed in a form of for example substitution between global arrays. Next, the analysis unit 33 conducts analysis of the status-2 program (S702). By conducting analysis of the status-2 program, the analysis unit 33 stores, in a communication information table, information related to the communication on which attention is focused. The analysis of the status-2 program is similar to the explanations given for the non-buffered Get communication according to the embodiment.

Next, the alignment unit 34 executes the continuity-priority pivoting procedure (S703). By executing the continuity-priority pivoting procedure, the alignment unit 34 rearranges indexes of communication data so that accesses to secondary side data is as continuous as possible and that accesses to indexes of primary side data are as rectangular as possible. Note that the alignment unit 34 may rearrange indexes of communication data preferentially. Also, it is not always necessary to execute S703. The continuity-priority pivoting procedure is similar to the explanations given for the non-buffered Put communication according to the present embodiment.

Next, the detection unit 35 executes a rectangular data unit detection procedure (S704). By executing the rectangular data unit detection procedure, the detection unit 35 detects the range (rectangular data unit) of communication indexes that can be expressed by a combination of the three or scalar in the node of the detection unit 35 on the primary side. Thereby, the detection unit 35 obtains lower index Jt=(jt[1], . . . , jt[Dt]) and the number of dimensions Dt($0 \leq Dt \leq D$) of the rectangular data unit. At the same time, the detection unit 35 obtains lower local index range It=(it[1], . . . , it[Ut]) and the number of dimensions Ut($0 \leq Ut \leq U$), on the primary side, that correspond to Jt and Dt. This rectangular data unit detection procedure is similar to the explanations given for the buffered Put communication according to the embodiment.

Next, the communication unit 36 executes a rectangular data Get communication (S705). Specifically, the communication unit 36 repeatedly executes a process for each rectangular data unit. FIG. 56 illustrates a detailed example of a rectangular data Get process. In FIG. 56, in each loop, a rectangular data unit Get communication is being executed. The rectangular data unit Get procedure will be explained later. The depth of the nest of this multiple loop is determined at the execution, and accordingly it may be implemented by using a recursive procedure call.

In FIG. 56, the communication unit 36 obtains jx1[d], jx2[d], jx3[d] (Dt+1≤d≤D) from the communication information table. When there is no setting in this communication information table, the communication unit 36 repeatedly executes the process (u=DtoU[d]) for all jx[d] having jx[d] mapped onto the node of the communication unit 36, i.e., gtop($f_u$(jx[d])) identical to the u-th node index of the node of the communication unit 36.

When the execution of the get process has been completed, the process is terminated.

(Rectangular Data Unit Get Procedure)

The rectangular data unit Get procedure will be explained. The communication unit 36 starts the process of the rectangular data unit Get procedure by using, as inputs, communication data unit list Jt-list, the number of continuous dimensions of Jt Dt(0≤Dt≤D and the communication information table.

Jt-list is a list of rectangular data units Jt (the initial state has a single element). In each Jt, subscripts are expressed by a combination of the three jt[d]=jt1[d]:jt2[d]:jt3[d (1≤d≤Dt) for a lower Dt dimension, and higher dimension jt[d] (Dt+1≤d≤D) is scalar.

FIG. 57 illustrates an example of an algorithm of the rectangular data unit Get procedure. By executing the rectangular data unit Get procedure illustrated in FIG. 57, the communication unit 36 conducts a Get communication on all Jts included in Jt-list.

FIG. 58 illustrates an example of a flowchart that explains the process of the rectangular data unit Get procedure. In FIG. 58, the communication unit 36 first determines whether or not there exists rectangular data that has not been processed in the rectangular data unit Get procedure (S801). Specifically, the communication unit 36 determines whether or not Jt-list is vacant. When it has been determined that there does not exist rectangular data that has not been processed (NO in S601), the process is terminated.

When it has been determined by the communication unit that there exists rectangular data that has not been processed (YES in S801), the detection unit 35 extracts an element of Jt-list from the top of Jt-list, and treats the element as Jt. Then, the detection unit 35 executes a rectangular-continuous data unit detection procedure (S802) on extracted Jt (S802). Through the rectangular-continuous data unit detection procedure, the detection unit 35 detects a data unit that is rectangular on the primary side and that is continuous on the secondary side. Specifically, the detection unit 35 obtains partial array Jtc of Jt that has the same origination as Jt and that is continuous over dimensions both on the secondary side, and also obtains the number of dimensions of the communication data (rectangular-continuous dimension) Dtc(0≤Dtc≤Dt). At the same time, the detection unit 35 obtains partial Jtr-list, which is a result of removing Jtc from Jt. This rectangular-continuous data unit detection procedure is similar to the explanations given for the buffered Put communication according to the embodiment.

Next, the communication unit 36 executes the rectangular-continuous data unit Get procedure (S803). In this example, the communication unit 36 treats Jtc as a communication data unit. Through the rectangular-continuous data unit Get procedure, the communication unit 36 gets data from the secondary side to the reception buffer on the primary side in units of communication data. The communication unit 36 detects continuous interval on the secondary side in advance and conducts simple memory copying between the data and the buffer, making it possible to increase efficiency in communications. Also, the communication unit 36 gets data from the secondary side to the primary side in units of data that is continuous on the transmission side. Thereby, it is possible to increase efficiency in communications. The rectangular-continuous data unit Get procedure will be explained later in detail.

Next, the communication unit 36 adds Jtr-list to the top of Jt-list. Then, the communication unit 36 again executes the process in S801.

(Rectangular-Continuous Data Unit Get Procedure)

Next, explanations will be given for a rectangular-continuous data unit Get procedure. The detection unit 35 starts the process of the rectangular-continuous data unit Get procedure by using the following data items as inputs. The inputs are communication data unit Jtc=(jtc[1], . . . , jtc[D]), the number of rectangular-continuous dimensions Dtc and secondary side (transmission side) node index ytc=(ytc[1], . . . , ytc[DtoV[Dtc]]). In addition to these, the inputs are the origination of secondary side local index itc1'=(itc1'[1], . . . , itc1'[DtoV[Dtc]]), the length Ltc of a communication data unit and a communication information table.

In the rectangular-continuous data unit Get procedure, the communication unit 36 gets data from the secondary node to the primary node in units of rectangular-continuous data.

Figure 59:
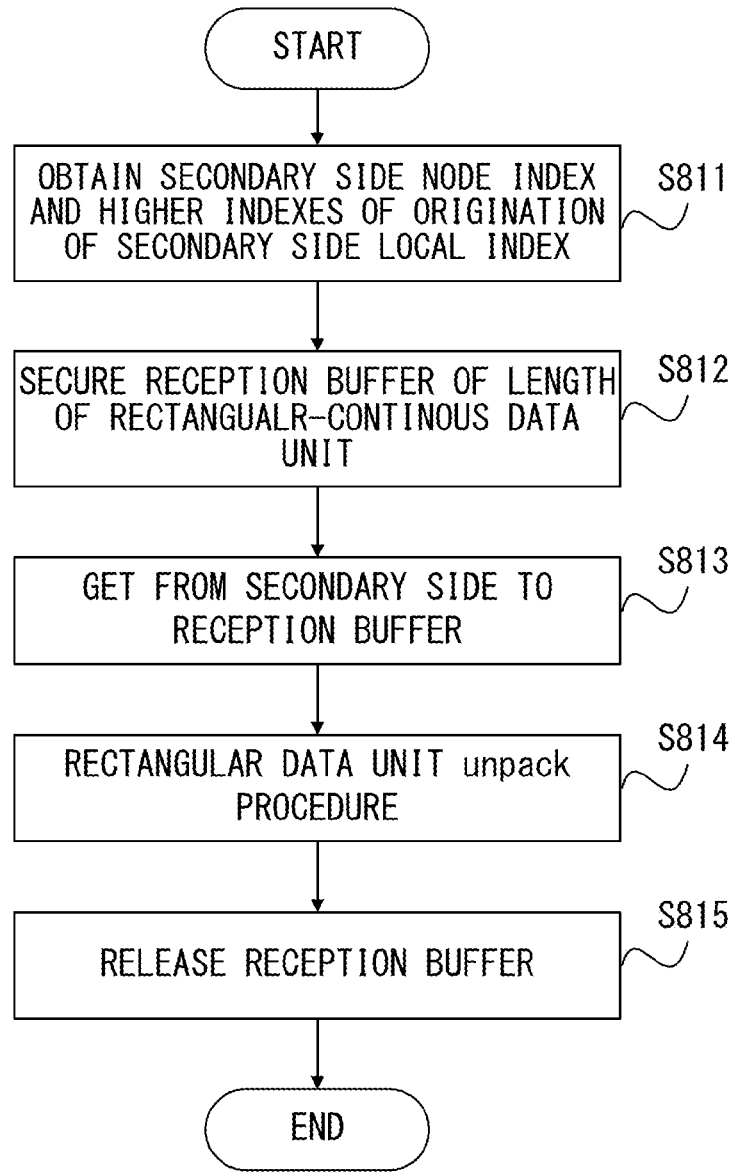
FIG. 59 illustrates an example of a flowchart that explains the process of a rectangular-continuous data Get procedure.

FIG. 59 illustrates an example of a flowchart that explains the process of a rectangular-continuous data Get procedure. The communication unit 36 first obtains a secondary side node index and higher indexes of an origination of the secondary side local index (S811). In other words, the communication unit 36 obtains higher indexes of ytc and itc1'. Specifically, the communication unit 36 executes the following processes on all of v=DtoV[Dtc]+1, . . . , V.

$$ytc[v]=gtop_B(g_v(jtc1))$$

$$itc1'[v]=gtol_B(g_v(jtc1))$$

Next, the buffer securing unit 37 secures reception buffer RecvBuf of a length Ltc (S812). Next, the communication unit 36 uses an MPI library etc. so as to get continuous data of a length Ltc from b(itc1') of node ytc to a continuous area from the top of RecvBuf (S813).

Next, the buffer control unit 38 unpacks continuous data of a length Ltc from RecvBuf to pieces of primary side local data that corresponds to Jtc by using a rectangular data unit unpack procedure (S814). The rectangular data unit unpack procedure will be explained later in detail.

Next, the buffer securing unit 37 release the area of the reception buffer RecvBuf secured in S812 (S815). Then, the process is terminated.

(Rectangular Data Unit Unpack Procedure)

Next, a rectangular data unit unpack procedure will be explained. The buffer control unit 38 starts the process of the rectangular data unit unpack procedure by using the following data items as inputs. The inputs are rectangular data unit Jt=(jt[1], . . . , jt[Dt]) in which each dimension can be expressed by the combination-of-the-three parameter, the number of rectangular dimensions Dt, a higher order (jt[Dt+1], . . . , jt[D]), the initial address of reception buffer RecvBuf and a communication information table. However, rectangular data unit Jt=(jt[1], . . . , jt[Dt]) in which each dimension can be expressed by the combination-of-the-three parameter corresponds to one transmission destination node.

FIG. 60 illustrates an example of an algorithm of the rectangular data unit unpack procedure. By executing the rectangular data unit pack procedure illustrated in FIG. 60, the buffer control unit 38 unpacks pieces of data in the reception buffer into a local data area, corresponding to the rectangular data units, of the node of the buffer control unit 38. Also, the buffer control unit 38 has executed memory copying that has taken into consideration the continuity of local data, making it possible to increase the speed of the unpacking process. Also, the buffer control unit 38 executes a process of storing data in a local array from the reception buffer repeatedly for each continuous interval, and thereby can increase the speed of the unpacking process.

(Buffered Two-Sided Communication)

In a buffered two-sided communication according to the embodiment, a range in which buffering accompanied by highly efficient packing is possible on the transmission side and unbuffering accompanied by highly efficient unpacking is possible on the reception side is treated as a communication data unit that is transmitted and received at one time. Data is divided for each communication data unit, and a two-sided communication is conducted by using buffers both on the transmission side and the reception side. As a communication data unit, area Jt that is expressed by an interval or a combination of the three is selected.

FIG. 61 illustrates a flowchart explaining the process of the buffered two-sided communication according to the embodiment. Note that all of transmission side nodes x and reception side nodes y executes the process in FIG. 61. A node that executes the process illustrated in FIG. 61 (also referred to as a self node) belong to one or both of the transmission side and the reception side.

In FIG. 61, the obtainment unit 32 first receives an instruction of a two-sided communication (S901). This instruction of a two-sided communication is a program that expresses the communication in status 3. Specifically, this program is expressed in a form of for example substitution between global arrays.

Next, the analysis unit 33 conducts analysis of the status-3 program (S902). By conducting analysis of the status-3 program, the analysis unit 33 stores, in two communication information tables that are respectively on the transmission and reception sides, information related to the communication on which attention is focused. The analysis of the status-3 program will be explained later in detail.

Next, the alignment unit 34 executes the rectangularity-priority pivoting procedure (S903). By executing the rectangularity-priority pivoting procedure, the alignment unit 34 rearranges indexes of two pieces of communication data so that accesses to lower indexes on the transmission and reception sides are as continuous as possible. Also, it is not always necessary to execute S903. The rectangularity-priority pivoting procedure will be explained later in detail.

Next, through a common rectangular data unit detection procedure, the detection unit 35 detects a range that is common in the transmission and reception sides and that can be expressed by an interval, a combination of the three or scalar (common rectangular data unit) (S904). Thereby, the detection unit 35 obtains lower index Jt=(jt[1], . . . , jt[Dt]) and the number of dimensions Dt(0≤Dt≤D) of a common rectangular data unit. Jt and Dt obtained in this process have the same value in all nodes.

Next, the communication unit 36 determines whether or not the self node is a transmission node that transmits communication data in a buffered two-sided communication (S905). When it has been determined that the self node is a transmission node (YES in S905), the communication unit 36 makes the process proceed to S906. When it has been determined that the self node is not a transmission node, i.e., that the self node is a reception node (NO in S905), the communication unit 36 makes the process proceed to S907.

In S906, the communication unit 36 executes a transmission process. Specifically, the communication unit 36 repeatedly executes a send process for each common rectangular data unit. FIG. 62 illustrates a detailed example of a transmission process. In FIG. 62, in each loop, a common rectangular data unit transmission process is being executed. The common rectangular data unit transmission process will be explained later. The depth of the nest of this multiple loop is determined at the execution, and accordingly it may be implemented by using a recursive procedure call.

In FIG. 62, the communication unit 36 obtains $jx1_A[d]$, $jx2_A[d]$, $jx3_A[d]$ (Dt+1≤d≤D) from the communication information table for transmission. When there is no setting in this communication information table, the communication unit 36 repeatedly executes the process (u=DtoU[d]) for jx[d] mapped onto the node of the communication unit 36, i.e., $gtop(f_u(jx[d]))$ identical to the u-th node index of the node of the communication unit 36 among all jx[d]=1, . . . , N[d]−1.

When the execution of the get process has been completed, the process is terminated.

In S907, the communication unit 36 executes a reception process. Specifically, the communication unit 36 repeatedly executes a receive process for each common rectangular data unit. FIG. 63 illustrates a detailed example of a reception process. In FIG. 63, in each loop, a common rectangular data unit reception process is being executed. The common rectangular data unit reception process will be explained later. The depth of the nest of this multiple loop is determined at the execution, and accordingly it may be implemented by using a recursive procedure call.

In FIG. 62, the communication unit 36 obtains $jx1_B[d]$, $jx2_B[d]$, $jx3_B[d]$ (Dt+1≤d≤D) from the communication information table for reception. When there is no setting in this communication information table, the communication unit 36 repeatedly executes the process (u=DtoU[d]) for jx[d] mapped onto the node of the communication unit 36, i.e., $gtop(f_u(jx[d]))$ identical to the u-th node index of the node of the communication unit 36 among all jx[d]=1, . . . , N[d]−1.

When the execution of the reception process has been completed, the process is terminated.

(Analysis of Status-3 Program)

First, explanations will be given for analysis of the status-3 program. In analysis of the status-3 program, a process is conducted for storing, in a communication information table, information related to a communication on which attention is focused. The analysis unit 33 conducts analysis of the status-3 program by using, as an input, a program that describes the communication in status 3 obtained by the obtainment unit 32.

As an output of the analysis of the status-3 program, the analysis unit 33 obtains a communication information table on the transmission side and a communication information table on the reception side that have stored information related to a communication on which attention is focused.

The process of the analysis of the status-3 program includes two processes, i.e., the generating process of a communication information table on the transmission side and the generating process of a communication information table on the reception side. In the generating process of a communication information table on the transmission side, the analysis unit 33 executes a procedure similar to the analysis of the status-1 program that was explained by referring to FIG. 31 through FIG. 33, by using the transmission side and the reception side as the primary side and the secondary side, respectively. In the generating process of a communication information table on the reception side, the analysis unit 33 executes a procedure similar to the analysis of the status-1 program explained by referring to FIG. 31 through FIG. 33, by using the reception side and the transmission side as the primary side and the secondary side, respectively.

Note that the transmission side communication information table and the reception side communication information table have roughly the same information, the analysis unit 33 may omit part of the generating procedures by copying one of them to the other. The correspondence between the transmission side communication information table and the reception side communication information table is as follows. Specifically, the number of dimensions D of communication data, size N[d] and the loop variable name j[d] are common. Also, UtoD and DtoU of one of them are respectively similar to VtoD and DtoV of the other. Also, the primary side information of one is similar to the secondary side information of the other. However, the information of primary side local array subscript exists only in a node having that data.

(Rectangularity-Priority Pivoting Procedure)

Next, explanations will be given for a rectangularity-priority pivoting procedure. The alignment unit 34 starts the process of the rectangularity-priority pivoting procedure by using, as an input, the communication information tables on the transmission side and the reception side.

FIG. 64 illustrates an example of an algorithm of the rectangularity-priority pivoting procedure. By executing the rectangularity-priority pivoting procedure, the alignment unit 34 obtains two identical communication information tables of the transmission and reception sides in which D pieces of information of communication data have been sorted. Specifically, in the communication information table to be output, D pieces of information of communication data have been sorted in such a manner that pieces of local data that have been given priority are accessed in ascending order as often as possible and the values of conversion tables UtoD and VtoD have also been converted so that they correspond to the sorted pieces.

(Common Rectangular Data Unit Detection Procedure)

Next, explanations will be given for a common rectangular data unit detection procedure. The detection unit 35 starts the process of the common rectangular data unit detection procedure by using the communication information tables on the transmission and reception sides as inputs.

The common rectangular data unit detection procedure returns a value that is common for all nodes on the transmission and reception sides. FIG. 65 illustrates an example of an algorithm of the common rectangular data unit detection procedure. By executing the common rectangular data unit detection procedure illustrated in FIG. 65, the detection unit obtains the number of dimensions $Dt(0 \leq Dt \leq D)$ of the communication data index range in which the intersection of the transmission side data and the reception side data can be expressed by an interval or the combination of the three.

(Common Rectangular Data Unit Transmission Process)

Next, explanations will be given for a common rectangular data unit transmission process. The communication unit 36 executes the common rectangular data unit transmission process by using, as inputs, common rectangular unit Jt=(jt [1], . . . , jt[D]), the number of common rectangular dimensions of Jt and the communication information table on the transmission side. The number of common rectangular dimensions is the number of rectangular dimensions of lower indexes $Dt(0 \leq Dt \leq D)$.

In a common rectangular data unit transmission process, the communication unit 36 transmits, for each common rectangular data unit, data to all corresponding reception nodes via a buffer secured in the node of the communication unit 36.

In the embodiment, it is assumed that all transmission nodes and all reception nodes collectively conduct the common rectangular data unit send procedure and the common rectangular data unit recv procedure respectively for each same common rectangular data unit.

Figure 66:
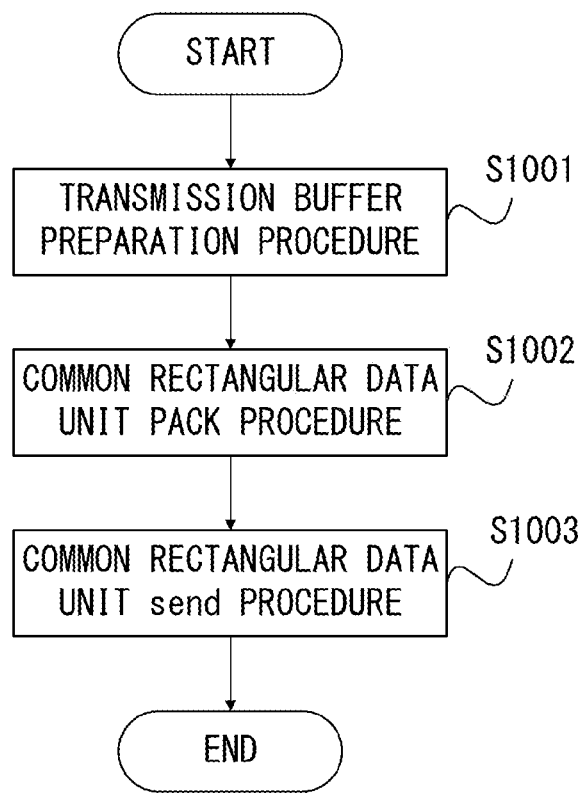
FIG. 66 illustrates an example of a flowchart that explains the contents of a common rectangular data unit transmission process.

FIG. 66 illustrates an example of a flowchart that explains the contents of the common rectangular data unit transmission process.

In FIG. 66, the buffer securing unit 37 first obtains information on as many transmission buffers as the number specified by Y[DtoV[1]] * . . . * Y[DtoV[Dt]] and on an access pattern for transmitting data from the node of the buffer securing unit 37 to the secondary side node by the transmission buffer preparation procedure in response to a common rectangular data unit (S1001). The transmission buffer preparation procedure will be explained later in detail.

Next, the buffer control unit 38 packs pieces of local data to the transmission buffer through the common rectangular data unit pack procedure (S1002). The common rectangular data unit pack procedure will be explained later in detail.

The communication unit 36 transmits data from the transmission buffer to the secondary side through the common rectangular data unit send procedure (S1003). The common rectangular data unit sent procedure will be explained later in detail. Then, the buffer securing unit 37 releases the transmission buffer area and terminates the process.

(Transmission Buffer Preparation Procedure)

Next, explanations will be given for a transmission buffer preparation procedure. In the transmission buffer preparation procedure, the transmission side and the reception side are treated as the primary side and the secondary side, respectively. The buffer securing unit 37 executes the transmission buffer preparation procedure by using, as inputs, the number of common rectangular dimensions and the primary side communication information table. The number of common rectangular dimensions is the number of rectangular dimensions of lower indexes communication data $Dt(0 \leq Dt \leq D)$.

FIG. 67 illustrates an example of an algorithm of a transmission buffer preparation procedure. By executing the transmission buffer preparation procedure illustrated in FIG. 67, the buffer securing unit 37 obtains, an output, a list y_countList[Dt] of a buffering pattern that corresponds to a common rectangular data unit. Then, by executing the transmission buffer preparation procedure, the buffer securing unit 37 secures as many transmission buffers SendBuf as specified by Y[DtoV[1]] * . . . * Y[DtoV[Dt]] that correspond to secondary side node indexes for a common rectangular data unit. As described above, by securing buffers in response to a common rectangular data unit, the buffer securing unit 37 can reduce the size of secured buffers to a size minimum for the use in communications.

(Common Rectangular Data Unit Pack Procedure)

Next, explanations will be given for a common rectangular data unit pack procedure. The buffer control unit 38 executes the common rectangular data unit pack procedure by using as, inputs, common rectangular data unit Jt=(jt[1], . . . , jt[D]), the number of common rectangular dimensions, a list y_countList[Dt] of a buffering pattern and the communication information table on the primary side (transmission side). The number of common rectangular dimensions is the number of rectangular dimensions of lower indexes $Dt(0 \leq Dt \leq D)$.

FIG. 68 illustrates an example of an algorithm of the common rectangular data unit pack procedure. By executing the common rectangular data unit pack procedure illustrated in FIG. 68, the buffer control unit 38 collects (packs) pieces of transmission data in units of common rectangular data units to a transmission buffer in the common rectangular data unit pack procedure. Specifically, the buffer control unit 38 extracts transmission data from a local array in units of common rectangular data, and stores it in the transmission buffer. As described above, the buffer control unit 38 executes a packing process on the basis of the continuity of data on memory, making it possible to increase the speed of the packing process.

In FIG. 68, the innermost loop can further increase the speed by using the rectangular data unit pack procedure. Also, in FIG. 68, the buffer control unit 38 can also extract the continuity of multi dimensions.

(Common Rectangular Data Unit Send Procedure)

Next, a common rectangular data unit send procedure will be explained. The communication unit 36 starts the process of the common rectangular data unit send procedure by using the following data items as inputs. The inputs are the number of common rectangular dimensions $Dt(0 \leq Dt \leq D)$, rectangular data unit $Jt=(jt[1], \ldots, jt[D])$ and the communication information table on the transmission side. In addition to these, the inputs are a transmission buffer SendBuf[Y[DtoV[1]]] . . . [Y[DtoV[Dt]]] on the primary side (transmission side), and size bufExtent[d][y[DtoV[d]]] that corresponds to each reception node index of dimension d of the transmission buffer.

FIG. 69 illustrates an example of an algorithm of the common rectangular data unit send procedure. By executing the common rectangular data unit send procedure illustrated in FIG. 69, the communication unit 36 transmits (sends) data from the transmission buffer of the communication unit 36 to the secondary side node in units of common rectangular data unit.

As illustrated in FIG. 69, the communication unit 36 issues send from the transmission buffer of the node of the communication unit 36 to the secondary side node for all transmission buffers. This send communication is associated with a recv (receive) communication having the same tag.

In FIG. 69, it is assumed that the tag is one integral value in the calculation of $(jt[Dt+1]+N[Dt+1]*(jt[Dt+2]+N[Dt+2]*(\ldots jt[D])\ldots))$ mod m, where m is a value that is high enough to be able to guarantee that passing of a greater value does not occur for a send-receive communication between the same transmission-reception nodes.

(Common Rectangular Data Unit Reception Procedure)

Next, a common rectangular data unit reception procedure will be explained. The communication unit 36 executes the common rectangular data unit reception procedure by using, as inputs, common rectangular data unit $Jt=(jt[1], \ldots, jt[D])$, the number of rectangular dimensions and the communication information table on the reception side. The number of rectangular dimensions is the number of rectangular dimensions of lower indexes $Dt(0 \leq Dt \leq D)$.

In the common rectangular data unit reception procedure, the communication unit 36 receives a common rectangular data unit from all corresponding transmission nodes via a buffer secured in the node of the communication unit 36.

In the embodiment, it is assumed that all transmission nodes and all reception nodes collectively conduct the common rectangular data unit send procedure and the common rectangular data unit recv procedure respectively for each same common rectangular data unit.

Figure 70:
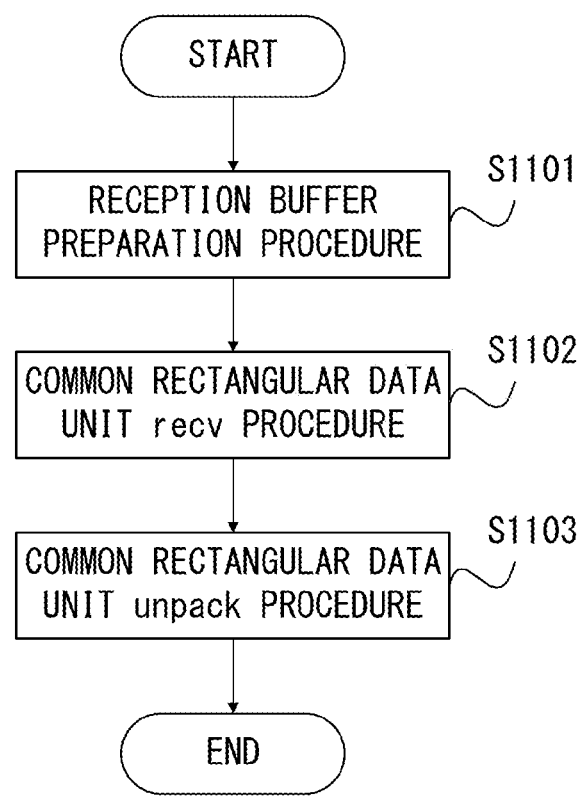
FIG. 70 illustrates an example of a flowchart that explains the contents of a common rectangular data unit reception process.

FIG. 70 illustrates an example of a flowchart that explains the contents of the common rectangular data unit reception process. In FIG. 70, the buffer securing unit 37 first obtains information on as many reception buffers as the number specified by Y[DtoV[1]] * . . . * Y[DtoV[Dt]] and on an access pattern for receiving data to the node of the buffer securing unit 37 from the secondary side node by the reception buffer preparation procedure in response to a common rectangular data unit (S1101). The reception buffer preparation procedure will be explained later in detail.

Next, by the common rectangular data unit reception procedure the communication unit 36 receives, to the reception buffer, data transmitted from the secondary side (S1102). The common rectangular data unit receive procedure will be explained later in detail.

The buffer control unit 38 distributes data in the reception buffer to local data through the common rectangular data unit unpack procedure (S1103). The common rectangular data unit unpack procedure will be explained later in detail. Then, the buffer securing unit 37 releases the reception buffer area and terminates the process.

(Reception Buffer Preparation Procedure)

Next, explanations will be given for a reception buffer preparation procedure. In the reception buffer preparation procedure, the reception side and the transmission side are treated as the primary side and the secondary side, respectively. The buffer securing unit 37 executes the reception buffer preparation procedure by using, as inputs, the number of common rectangular dimensions and the primary side communication information table. The number of common rectangular dimensions is the number of rectangular dimensions of lower indexes of communication data $Dt(0 \leq Dt \leq D)$.

As an output of the reception buffer preparation procedure, the buffer securing unit 37 obtains a list y_countList [Dt] of a buffering pattern that corresponds to the common rectangular data unit. Then, by executing the reception buffer preparation procedure, the buffer securing unit 37 secures as many reception buffers RecvBuf as specified by Y[DtoV[1]] * . . . * Y[DtoV[Dt]] that corresponds to the secondary side node indexes for common rectangular data units. As described above, by securing buffers in response to a common rectangular data unit, the buffer securing unit 37 can reduce the size of secured buffers to a size minimum for the use in communications.

The algorithm of the reception buffer preparation procedure is similar to the algorithm of the transmission buffer preparation procedure illustrated in FIG. 67. However, in the algorithm of the reception buffer preparation procedure, SendBuf has been replaced by RecvBuf in FIG. 67.

(Common Rectangular Data Unit Reception Procedure)

Next, explanations will be given for a common rectangular data unit reception procedure. The communication unit 36 starts the common rectangular data unit reception procedure by using the following data items as inputs. The inputs are the number of common rectangular dimensions $Dt(0 \leq Dt \leq D)$, communication data unit $Jt=(jt[1], \ldots, jt[D])$, and the communication information table on the reception side. In addition to these, the inputs are reception buffer RecvBuf[Y[DtoV[1]]] . . . [Y[DtoV[Dt]]] on the primary side (reception side) and size bufExtent[d] [y[DtoV[d]]] corresponding to each transmission node index of dimension d of the reception buffer.

FIG. 71 illustrates an example of an algorithm of a common rectangular data unit reception procedure. The communication unit 36 executes the common rectangular data unit reception procedure illustrated in FIG. 71, and thereby receives a common rectangular data unit from the secondary node corresponding to the reception buffer of the self node.

In FIG. 71, it is assumed that the tag is one integral value in the calculation of (jt[Dt+1]+N[Dt+1]*(jt[Dt+2]+ N[Dt+2]*( . . . jt[D]) . . . )) mod m, where m is a value that is high enough to be able to guarantee that passing of a greater value does not occur for a send-receive communication between the same transmission-reception nodes.

(Common Rectangular Data Unit Unpack Procedure)

Next, explanations will be given for a common rectangular data unit unpack procedure. The buffer control unit 38 starts the common rectangular data unit unpack procedure by using as inputs, common rectangular data unit Jt=(jt[1], . . . , jt[Dt]), the number of common rectangular dimensions, a list of y_countList[Dt] of a buffering pattern, and the communication information table on the primary side (reception side). In this example, the number of common rectangular dimensions is the number of rectangular dimensions of lower indexes Dt(0≤Dt≤D).

FIG. 72 illustrates an example of an algorithm of the common rectangular data unit unpack procedure. By executing the common rectangular data unit unpack procedure illustrated in FIG. 72, the buffer control unit 38 distributes (unpack) pieces of reception data from a local buffer in units of common rectangular units. Specifically, the buffer control unit 38 extracts reception data of the reception buffer and stores in the local array in units of common rectangular data. The buffer control unit 38 executes unpacking process on the basis of the continuity of data on a memory, and thereby can increase the speed of the unpacking process.

In FIG. 72, the innermost loop can further increase the speed by using the rectangular data unit unpack procedure. Also, in FIG. 72, the buffer control unit 38 can also extract the continuity of multi dimensions.

Explanations will be given for a process of non-buffered Put communication by using an example of an actual communication program. FIG. 73 illustrates an example of a communication that is expressed by a gmove syntax of a XcalableMP program, which is a type of a parallel language. In this example, an example is illustrated in which non-buffered Put has been executed by using nodes P(1,1), p(2,1), p(1,2), p(2,2), p(1,3), p(2,3) as primary side nodes in the communication illustrated in FIG. 73. A and P are on the transmission side on the primary side while B and Q are on the reception side on the secondary side. n2 is a variable that is determined at execution.

First, the obtainment unit 32 obtains a communication program illustrated in FIG. 73. Then, the analysis unit 33 analyzes the status-1 program. As a result of this, the analysis unit 33 obtains the communication information tables illustrated in FIG. 27 through FIG. 30. Because this example employs an array substitution statement, a loop variable name does not exist, tentative names $1 and $2 have been given. A node array Q has been normalized with Q(1,1,4) so that it has as many dimensions as global array B has. Note that in FIG. 27 through FIG. 30, an expression may be evaluated at execution of a runtime library or may also be output and generated as an output of a compiler as it is an expression.

Figure 74:
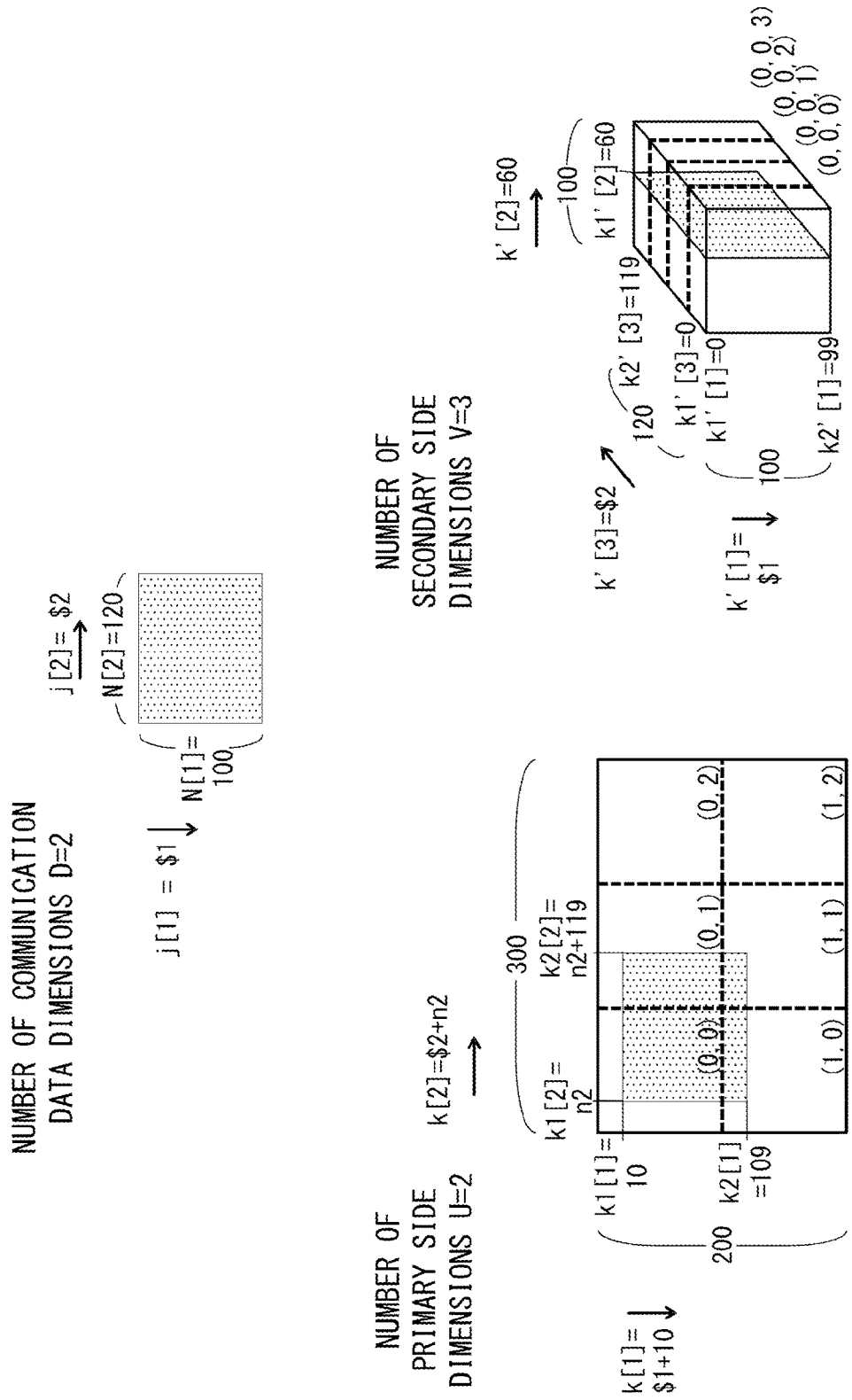
FIG. 74 illustrates contents of a communication information table obtained through the analysis of the status-1 program.
Figure 75:
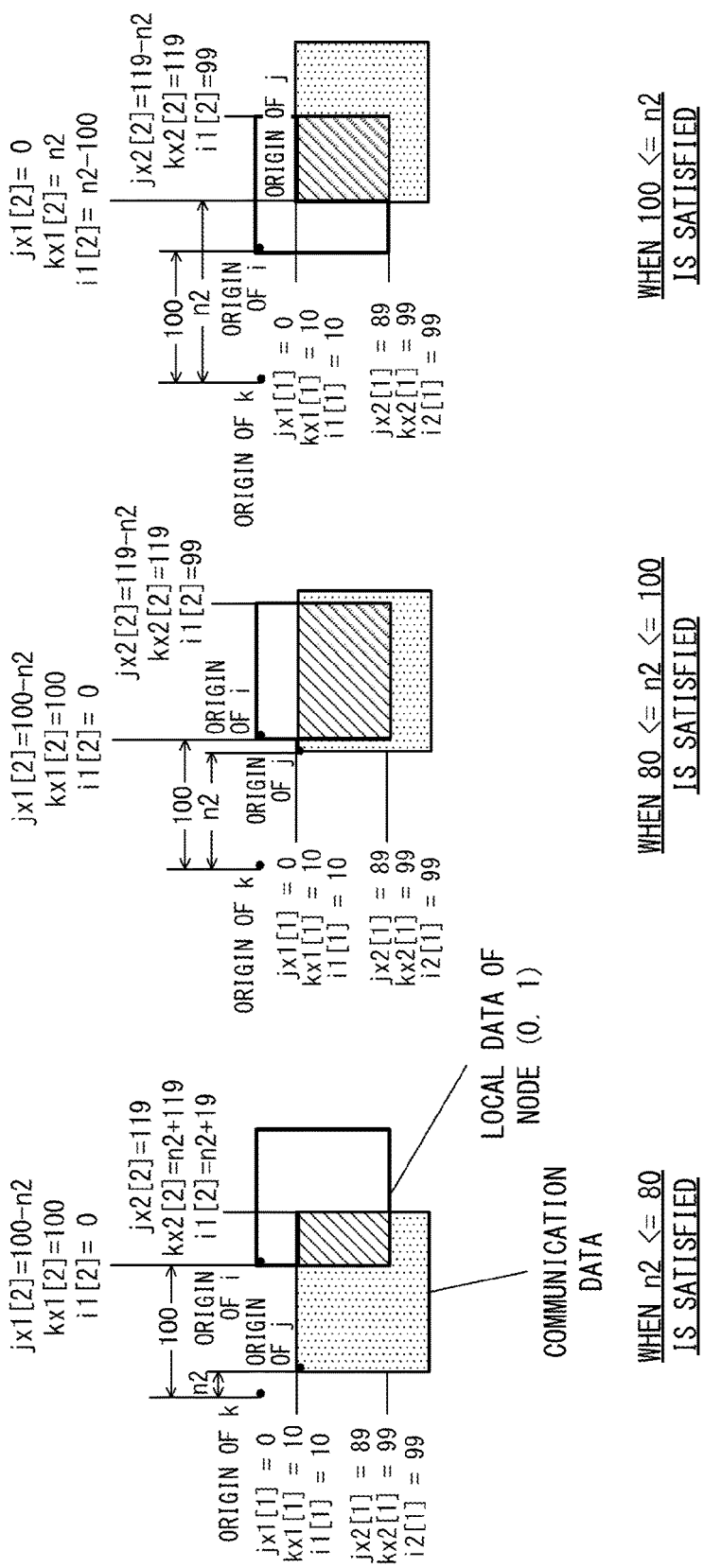
FIGS. 75A-75C illustrate the contents of a communication information table in node (0, 1) obtained through the analysis of the status-1 program and relationships between communication data and local data.

FIG. 74 illustrates contents of a communication information table obtained through the analysis of the status-1 program. In FIG. 74, the dotted portions are communication data to be transmitted and received and the dashed lines are boundaries of data distribution.

Results of the substitution of the result of procedure 6 of the algorithm illustrated in FIG. 32 in the analysis of status-1 program are illustrated in FIG. 28 and FIG. 29. The communication information tables have values different depending upon nodes, however, in the communication information tables illustrated in FIG. 28 and FIG. 29, the information of primary side nodes (0,0), (1,0), (0,1) are illustrated as an example. Note that these nodes respectively correspond to nodes P(1,1), P(2,1), P(1,2) of a input program. In order to reduce the cost at execution, it is better to make numerical expressions as simple as possible.

FIGS. 75A-75C illustrate the contents of a communication information table in node (0, 1) obtained through the analysis of the status-1 program and relationships between communication data and local data. The communication information table expresses communication patters differing depending upon variables that are determined at execution (variable"n2" in the example illustrated in FIG. 73). FIG. 75A illustrates relationships between communication data and local data when n2≤80 is satisfied. FIG. 75B illustrates relationships between communication data and local data when 80≤n2≤100 is satisfied. FIG. 75C illustrates relationships between communication data and local data when 100≤n2 is satisfied.

In the example illustrated in FIG. 73, because both DtoU and DtoV are in ascending order from the beginning, the continuity-priority pivoting procedure is not effective. When the gmove syntax is not an array substitution statement and is given in a form of the following forall statement: forall (i=0:99, j=0:119) B(i,60,j)=A(i+10,j+n2) it is better for the alignment unit 34 to conduct sorting so that a loop variable i that can become a continuous data access comes first and a loop variable j, different from a loop variable i, comes later.

Next, the detection unit 35 executes the continuous data unit detection procedure. FIG. 76 illustrates the execution of the continuous data unit detection procedure.

In the following explanations, operations of a primary side node (0, 1) will be described. It is assumed that a variable n2 in the program was evaluated as 20.

In FIG. 76, it has been determined that the continuous data unit is 360 bytes on the primary side data. The interval 10:99 of the first dimension of the primary side data corresponds to 0:89 of the first dimension of the communication data array, and accordingly the list of continuous data list that should receive a put communication by the node (0,1) is as follows, where jx1[2], jx2[2], jx3[2] are obtained from a communication information table.

((0:89, jx1[2]), (0:89, jx1[2]+jx3[2]), (0:89, jx1[2]+2*jx3[2]), . . . , (0:89, jx2[2]))

Next, the communication unit 36 repeatedly executes the process of following loop 1. Because D=2 are Dc=1 satisfied, the process is a single loop.

(loop 1)

```
for jx[2] = jx1[2] to jx2[2] step jx3[2]
    Jc-list = ((0:89))
    call continuous data unit Put procedure
end for
```

When it is determined that n2=20 is satisfied at execution, it is evaluated that jx1[2]=max(0, 100−n2)=80, jx2[2]=min(119, 199−n2)=119, jx3[2]=1.

It is possible to employ a loop such as loop 1 when the type of the local array subscript is "interval" or "combination of the three". When it is "scalar", it is not necessary to employ a loop because a fixed value is used. In case of "others", in a loop, only indexes corresponding to the self node are selected and executed from among all intervals of the corresponding dimension of communication data.

The first repeating in loop 1 is as follows.

$jx[2]=jx1[2]=80$

Jc-list=((0:89,80))

Execute continuous data Unit Put procedure

FIG. 77 and FIG. 78 illustrate examples (first and second) of the processes of a continuous data unit Put procedure that is called in the first repeating in loop 1. Note that "Jc-list=((0:89, 80)), Dc=1" is included in loop 1 as an input of the continuous data unit Put procedure called in the first repeating.

In loop 1, the second repeating is as follows.

$jx[2]=jx[2]+jx3[2]=80+1=81$

Jc-list=((0:89,81))

execute continuous data unit Put procedure

In the following explanations, only a difference from the previous repeating is described. FIG. 79 illustrates an example of the process of a continuous data unit Put procedure that is called in the second repeating. Note that "Jc-list=((0:89, 81)), Dc=1" is included in loop 1 as an input of the continuous data unit Put procedure called in the second repeating.

Similarly, the communication unit 36 executes the process of loop 1. In loop 1, the 11-th repeating is as follows.

$jx[2]=90$

Jc-list=((0:89,90))

execute continuous data unit Put procedure

FIG. 80 illustrates an example of the process of the continuous data unit Put procedure that is called in the 11-th repeating. Note that Jc-list=((0:89, 90)), Dc=1 is included in loop 1 as an input of the continuous data unit Put procedure called in the second repeating.

Similarly, the communication unit 36 executes the process of loop 1, executes the repeating of jx[2]=jx2[2]=119 as the final stage, and puts data of 360 bytes from a (10, 39) to b(0,60,29) of node (0,0,3). Then, the process is terminated.

FIG. 81 illustrates a result of putting data from the primary side node (0,1) to the secondary side node (0,0,2) or (0,0,3). The thirty packets illustrated in FIG. 81 are put from the primary side node (0,1) to the secondary side node (0,0,2) or (0,0,3). The shaded areas in FIG. 75A correspond to this primary side local data. By executing this procedure at the same time in the other three primary side nodes, all communication data is communicated as a whole from the primary side to the secondary side.

Figure 82:
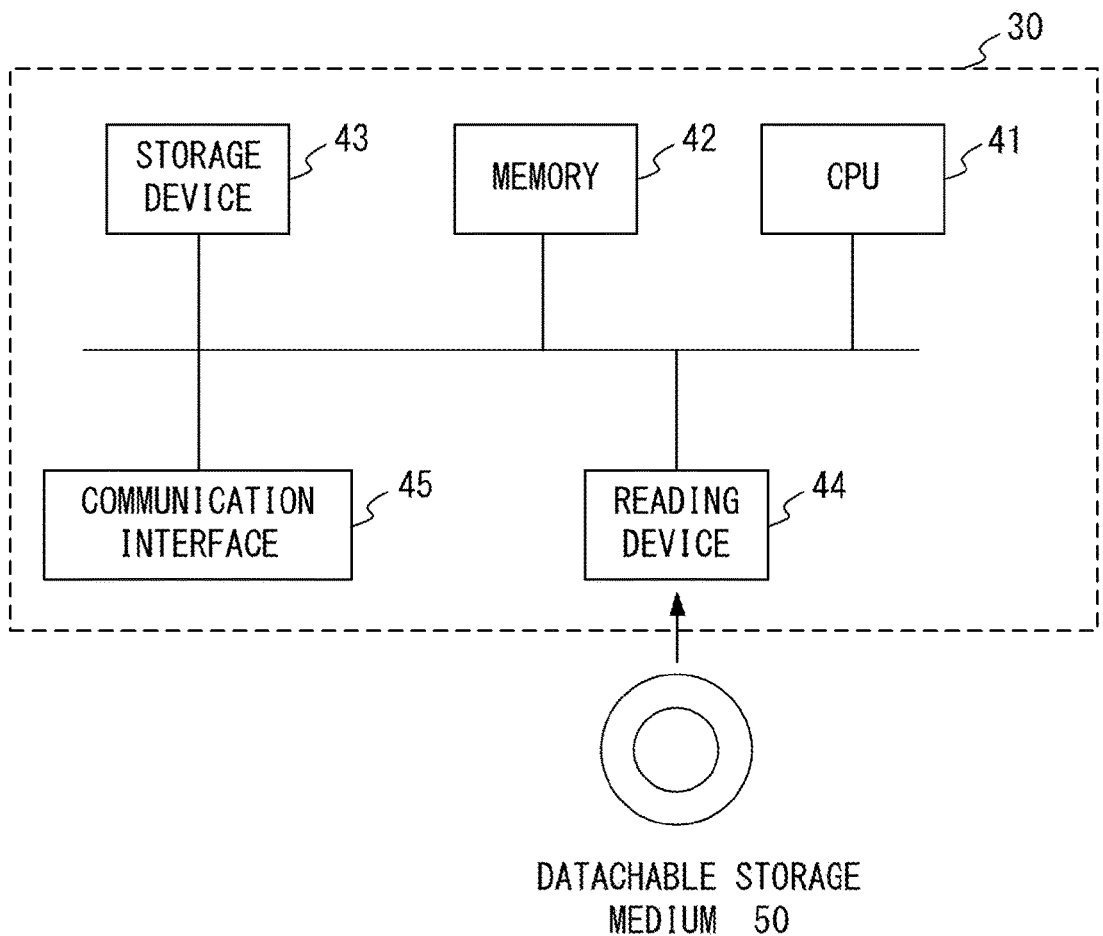
FIG. 82 illustrates an example of a hardware configuration of a node according to the embodiment.

Next, explanations will be given for an example of a hardware configuration of the node 30. FIG. 82 illustrates an example of a hardware configuration of a node according to the embodiment.

In FIG. 82, the node 30 includes a CPU 41, a memory 42, a storage device 43, a reading device 44 and a communication interface 45. The CPU 41, the memory 42, the storage device 43, the reading device 44 and the communication interface 45 are connected via a bus etc.

The CPU 41 uses the memory 42 to execute a program that has described the procedure of the above flowchart, and thereby provides part or all of the functions of the obtainment unit 32, the analysis unit 33, the alignment unit 34, the detection unit 35, the communication unit 36, the buffer securing unit 37 and the buffer control unit 38. The CPU 41 also provides the function of a compiler.

The memory 42 is for example a semiconductor memory and includes a Random Access Memory (RAM) area and a Read Only Memory (ROM) area. In the memory 42, a transmission buffer or a reception buffer is secured. The storage device 43 is for example a hard disk. Note that the storage device 43 may be a semiconductor memory such as a flash memory etc. The storage device 43 may be an external recording device. The storage device 43 provides part or all of the functions of the storage unit 31.

The reading device 44 accesses a detachable storage medium. 50 in accordance with instructions from the CPU 41. The detachable storage medium 50 is implemented by for example a semiconductor device (such as a USB memory etc.), a medium that information is input to and output from by means of magnetic effects (such as a magnetic disk etc.), a medium that information is input to and output from by means of optical effects (such as a CD-ROM, a DVD, etc.), etc. Note that it is not necessary that the reading device 44 be included in the node 30.

The communication interface 45 conducts communications with other nodes 30 in accordance with instructions from the CPU 41 via a communication network, interconnect, etc.

The program according to the embodiment is provided to the node 30 in for example the following form.

(1) The program has been installed in the storage device 43 in advance.

(2) The program is provided through the detachable storage medium 50.

(3) The program is provided via the communication interface 45 from a program server (not illustrated).

Further, part of the nodes according to the embodiment may be implemented by hardware. Alternatively, the nodes according to the embodiment may be implemented by a combination between software and hardware.

The second node 12 and the second node 22 may be a storage device including for example a hard disk or a semiconductor memory such as a flash memory etc.

The present embodiments are not limited to the above described embodiments, and various configurations or embodiments can be employed without departing from the spirit of the present embodiments.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus, among a plurality of information processing apparatuses, to which one of pieces of local data is assigned, the pieces of local data having been obtained by dividing global data shared by the plurality of information processing apparatuses, the information processing apparatus comprising:

a storage unit that includes a first storage area sectioned into prescribed units, and stores local data that is assigned to the information processing apparatus in the first storage area; and a processor that executes a process including:
  obtaining a writing instruction of target local data, which is a writing target on a different information processing apparatus from the information processing apparatus;
  detecting a plurality of sections to which the target local data is to be written in a second storage area that is sectioned into the prescribed units in a different storage unit included in the different information processing apparatus, on the basis of storage area information that identifies data to which the target local data corresponds in the global data, the plurality of sections are continuous sections and a tailing address of a first section of two continuous sections from among the plurality of sections and an initial address of a second section of the two continuous sections are continuous; and
  extracting as many pieces of local data stored in the first storage area as specified by the number of the plurality of sections and transmitting the extracted pieces of local data to the different information processing apparatus.

2. The information processing apparatus according to claim 1, wherein
  the storage area information includes information that identifies the target local data having been assigned to the information processing apparatus and information that identifies the target local data having been assigned to the different information processing apparatus, and
  the detecting detects a plurality of sections from among the plurality of sections of the second storage area on the basis of the storage area information, sections of the first storage area in which the target local data to be written has been stored being continuous.

3. The information processing apparatus according to claim 1, wherein the transmitting includes extracting, from the storage unit, as many pieces of local data stored in the first storage area as specified by the number of the plurality of sections, storing the pieces of local data in a prescribed buffer area, and transmitting the pieces of local data stored in the buffer area to the different information processing apparatus in prescribed units.

4. The information processing apparatus according to claim 3, the process further including securing the buffer area of a size in accordance with the number of the plurality of sections.

5. An information processing apparatus, among a plurality of information processing apparatuses, to which one of pieces of local data is assigned, the pieces of local data having been obtained by dividing global data shared by the plurality of information processing apparatuses, the information processing apparatus comprising:
  a storage unit that includes a first storage area sectioned into prescribed units, and is assigned local data that is assigned to the information processing apparatus; and
  a processor that executes a process including:
    obtaining a reading instruction of target local data, which is a reading target on the information processing apparatus from a different information processing apparatus;
    detecting a plurality of sections from which the target local data is to be read in a second storage area that is sectioned into the prescribed units in a different storage unit included in the different information processing apparatus, on the basis of storage area information that identifies data to which the target local data corresponds in the global data, the plurality of sections are continuous sections and a tailing address of a first section of two continuous sections from among the plurality of sections and an initial address of a second section of the two continuous sections are continuous;
    requesting that the different information processing apparatus extract as many pieces of local data stored in the second storage area as specified by the number of the plurality of sections and transmit the extracted pieces of local data to the information processing apparatus; and
    receiving the as many pieces of local data as specified by the number of the plurality of sections, transmitted from the different information processing apparatus in response to the request, and storing the received pieces of local data in the first storage area.

6. The information processing apparatus according to claim 5, wherein
  the storage area information includes information that identifies the target local data having been assigned to the information processing apparatus and the target local data having been assigned to the different information processing apparatus, and
  the detecting detects a plurality of sections from among the plurality of sections of the second storage area on the basis of the storage area information, sections of the first storage area in which data read from the detected plurality of sections is stored being continuous.

7. The information processing apparatus according to claim 5, wherein the receiving includes receiving the local data, storing the received data in a prescribed buffer area, extracting from the buffer area as many pieces of local data as specified by the number of the plurality of sections, and storing the extracted pieces of local data in the first storage area.

8. The information processing apparatus according to claim 7, the process further including securing the buffer area of a size in accordance with the number of the plurality of sections.

9. A communication method by using an information processing apparatus, among a plurality of information processing apparatuses, to which one of pieces of local data is assigned, the pieces of local data having been obtained by dividing global data shared by the plurality of information processing apparatuses, the communication method comprising:
  obtaining, by using the information processing apparatus, a writing instruction of target local data, which is a writing target on a different information processing apparatus from the information processing apparatus, from among pieces of local data having been assigned to the information processing apparatus;
  detecting, by using the information processing apparatus, a plurality of sections to which the target local data is to be written in a second storage area that has been sectioned into the prescribed units in a different storage unit included in the different information processing apparatus, on the basis of storage area information that identifies data to which the target local data corresponds in the global data, the plurality of sections are continuous sections and a tailing address of a first section of two continuous sections from among the plurality of sections and an initial address of a second section of the two continuous sections are continuous; and
  extracting, by using the information processing apparatus, as many pieces of local data stored in a first storage area sectioned into prescribed units as specified by the number of the plurality of sections and to transmit the extracted pieces of local data to the different information processing apparatus.

10. A communication method by using an information processing apparatus, among a plurality of information processing apparatuses, to which one of pieces of local data is assigned, the pieces of local data having been obtained by dividing global data shared by the plurality of information processing apparatuses, the communication method comprising:

obtaining, by using the information processing apparatus, a reading instruction of target local data, which is a reading target from a different information processing apparatus on the information processing apparatus;

detecting, by using the information processing apparatus, a plurality of sections from which the target local data is to be read in a second storage area that has been sectioned into the prescribed units in a different storage unit included in the different information processing apparatus, on the basis of storage area information that identifies data to which the target local data corresponds in the global data, the plurality of sections are continuous sections and a tailing address of a first section of two continuous sections from among the plurality of sections and an initial address of a second section of the two continuous sections are continuous;

requesting, by using the information processing apparatus, that the different information processing apparatus extract as many pieces of local data stored in the second storage area as specified by the number of the plurality of sections and transmit the extracted pieces of local data to the information processing apparatus; and receiving, by using the information processing apparatus, the as many pieces of local data as specified by the number of the plurality of sections, transmitted from the different information processing apparatus in response to the request, and storing the received pieces of local data in the first storage area sectioned into prescribed units.

11. A non-transitory computer-readable recording medium having stored therein a communication program for causing a computer of an information processing apparatus, among a plurality of information processing apparatuses, to which one of pieces of local data is assigned, the pieces of local data having been obtained by dividing global data shared by the plurality of information processing apparatuses, to execute a process comprising:

obtaining a writing instruction of target local data, which is a writing target on a different information processing apparatus from the information processing apparatus, from among pieces of local data having been assigned to the information processing apparatus;

detecting a plurality of sections to which the target local data is to be written in a second storage area that has been sectioned into the prescribed units in a different storage unit included in the different information processing apparatus, on the basis of storage area information that identifies data to which the target local data corresponds in the global data, the plurality of sections are continuous sections and a tailing address of a first section of two continuous sections from among the plurality of sections and an initial address of a second section of the two continuous sections are continuous; and extracting as many pieces of local data stored in a first storage area sectioned into prescribed units as specified by the number of the plurality of sections and transmitting the extracted pieces of local data to the different information processing apparatus.

12. A non-transitory computer-readable recording medium having stored therein a communication program for causing a computer of an information processing apparatus, among a plurality of information processing apparatuses, to which one of pieces of local data is assigned, the pieces of local data having been obtained by dividing global data shared by the plurality of information processing apparatuses, to execute a process comprising:

obtaining a reading instruction of target local data, which is a reading target from a different information processing apparatus on the information processing apparatus;

detecting a plurality of sections from which the target local data is to be read in a second storage area that has been sectioned into the prescribed units in a different storage unit included in the different information processing apparatus, on the basis of storage area information that identifies data to which the target local data corresponds in the global data, the plurality of sections are continuous sections and a tailing address of a first section of two continuous sections from among the plurality of sections and an initial address of a second section of the two continuous sections are continuous;

requesting that the different information processing apparatus extract as many pieces of local data stored in the second storage area as specified by the number of the plurality of sections and transmitting the extracted pieces of local data to the information processing apparatus; and receiving the as many pieces of local data as specified by the number of the plurality of sections, transmitted from the different information processing apparatus in response to the request, and storing the received pieces of local data in a first storage area sectioned into prescribed units.

13. An information processing system in which pieces of local data having been obtained by dividing global data shared by a plurality of information processing apparatuses have been distributed to a plurality of information processing apparatuses, the information processing system comprising:

a first information processing apparatus and a second information processing apparatus, the first information processing apparatus includes:
a storage unit that includes a first storage area sectioned into prescribed units, and stores local data that is assigned to the first information processing apparatus in the first storage area; and
a processor that executes a process including:
obtaining a writing instruction of target local data, which is a writing target on the second information processing apparatus from the first information processing apparatus;
detecting a plurality of sections to which the target local data is to be written in a second storage area that is sectioned into the prescribed units in a different storage unit included in the second information processing apparatus, on the basis of storage area information that identifies data to which the target local data corresponds in the global data, the plurality of sections are continuous sections and a tailing address of a first section of two continuous sections from among the plurality of sections and an initial address of a second section of the two continuous sections are continuous; and extracting as many pieces of local data stored in the first storage area as specified by the number of the plurality of sections, and transmitting the extracted pieces of local data to the second information processing apparatus, and the second information processing apparatus receives as many pieces of local data as specified by the number of the plurality of sections from the first information processing apparatus and stores the received pieces of local data in the second storage area.

14. An information processing system in which pieces of local data having been obtained by dividing global data shared by a plurality of information processing apparatuses have been distributed to a plurality of information processing apparatuses, the information processing system comprising:

a first information processing apparatus and a second information processing apparatus, the first information processing apparatus includes:

a storage unit that includes a first storage area sectioned into prescribed units, and is assigned local data that is assigned to the first information processing apparatus; and a processor that executes a process including:

obtaining a reading instruction of target local data, which is a reading target on the first information processing apparatus from the second information processing apparatus;

detecting a plurality of sections from which the target local data is to be read in a second storage area that is sectioned into the prescribed units in a different storage unit included in the second information processing apparatus, on the basis of storage area information that identifies data to which the target local data corresponds in the global data, the plurality of sections are continuous sections and a tailing address of a first section of two continuous sections from among the plurality of sections and an initial address of a second section of the two continuous sections are continuous;

requesting that the second information processing apparatus extract as many pieces of local data stored in the second storage area as specified by the number of the plurality of sections and transmit the extracted pieces of local data to the first information processing apparatus; and receiving the as many pieces of local data as specified by the number of the plurality of sections, transmitted from the second information processing apparatus in response to the request, and storing the received pieces of local data in the first storage area, and the second information processing apparatus extracts as many pieces of local data stored in the second storage area as specified by the number of the plurality of sections and transmits the extracted pieces of local data to the first information processing apparatus in response to the request from the first information processing apparatus.

* * * * *